(12) United States Patent
Takada et al.

(10) Patent No.: US 9,019,621 B2
(45) Date of Patent: Apr. 28, 2015

(54) OBJECTIVE OPTICAL SYSTEM AND OBSERVATION APPARATUS PROVIDED WITH THE SAME

(71) Applicant: Olympus Corporation, Tokyo (JP)

(72) Inventors: Keisuke Takada, Tokyo (JP); Keisuke Ichikawa, Tokyo (JP)

(73) Assignee: Olympus Corporation, Tokyo (JP)

( * ) Notice: Subject to any disclaimer, the term of this patent is extended or adjusted under 35 U.S.C. 154(b) by 249 days.

(21) Appl. No.: 13/673,258

(22) Filed: Nov. 9, 2012

(65) Prior Publication Data

US 2013/0163094 A1    Jun. 27, 2013

(30) Foreign Application Priority Data

Nov. 11, 2011 (JP) ................................. 2011-247521
Nov. 11, 2011 (JP) ................................. 2011-247522
Feb. 3, 2012  (JP) ................................. 2012-022133

(51) Int. Cl.
*G02B 15/14* (2006.01)
*G02B 23/24* (2006.01)

(52) U.S. Cl.
CPC ............ *G02B 15/14* (2013.01); *G02B 23/2438* (2013.01)

(58) Field of Classification Search
CPC .................................. G02B 15/14; G02B 15/22
USPC .......................................... 359/676, 684, 693
See application file for complete search history.

(56) References Cited

U.S. PATENT DOCUMENTS 6,353,504 B1 *  3/2002  Yamamoto .................... 359/686
8,081,380 B2    12/2011  McKinley

FOREIGN PATENT DOCUMENTS

JP    2007-155887    6/2007
JP    2007-233036    9/2007

\* cited by examiner

*Primary Examiner* — Joseph P Martinez
(74) *Attorney, Agent, or Firm* — Kenyon & Kenyon LLP

(57) ABSTRACT

An objective optical system of an embodiment according to the present invention is formed in such a way that: the objective optical system includes an immovable lens group which is arranged nearest to the object side, which is immovable in focusing, and which has negative power, and first and second movable lens groups at least one of which moves along the optical axis in focusing; and an amount of variation in magnification per movement of the first movable lens group is different from an amount of variation in magnification per movement of the second movable lens group.

42 Claims, 43 Drawing Sheets

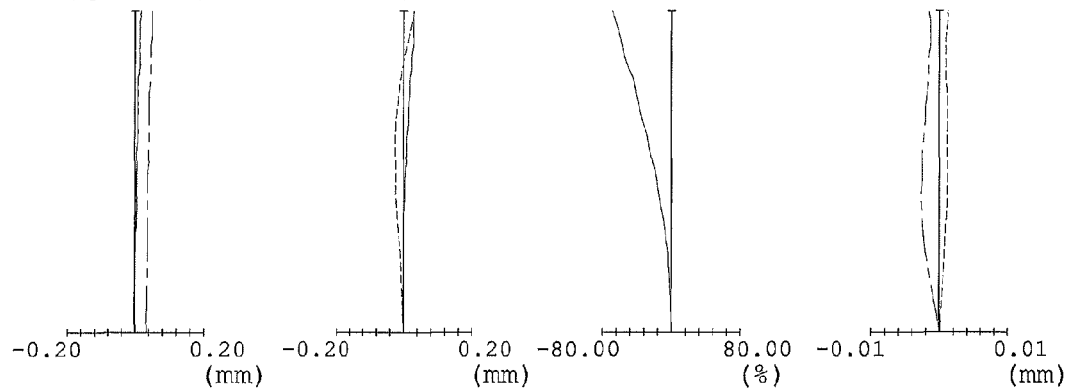

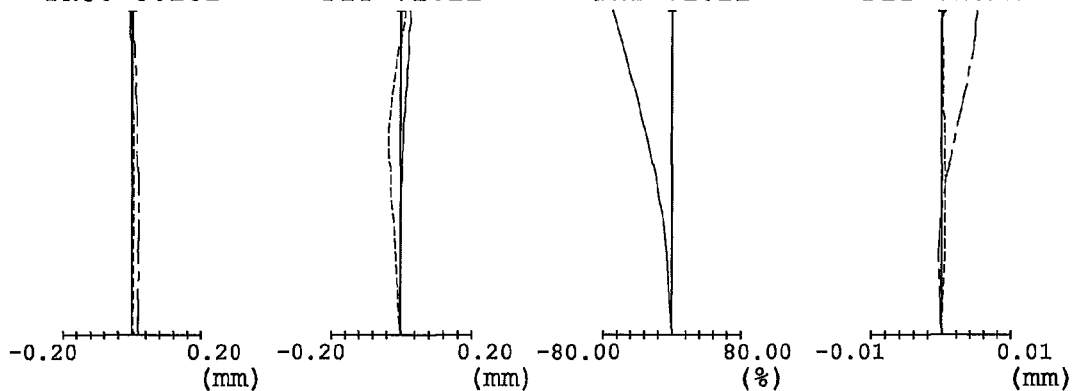
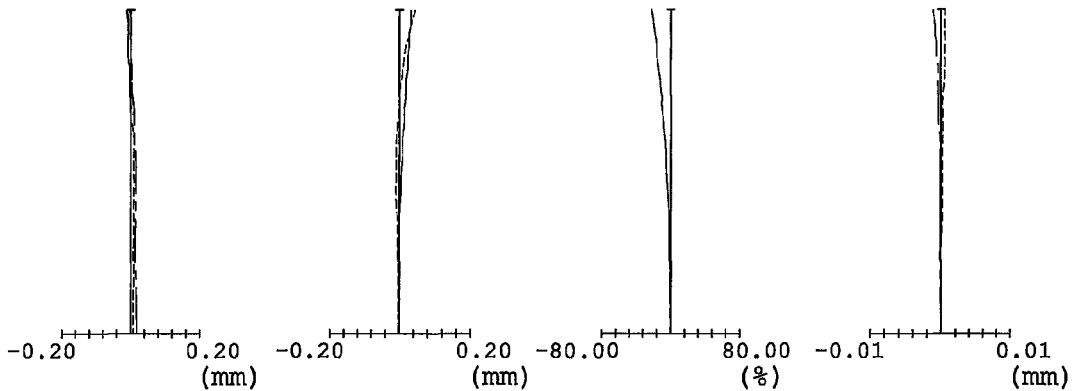
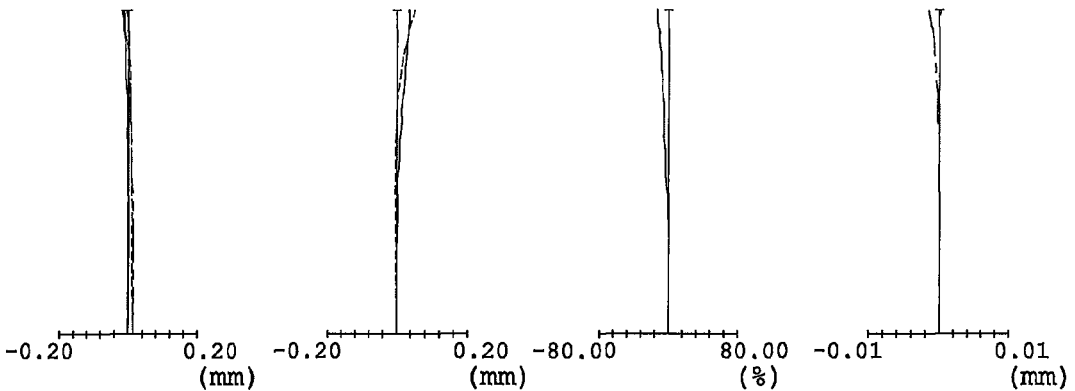

FIG.6A SPHERICAL ABERRATION FNO. 5.101
FIG.6B ASTIGMATISM FIY 71.22
FIG.6C DISTORTION FIY 71.22
FIG.6D CHROMATIC ABERRATION OF MAGNIFICATION FIY 71.22

FIG.6E SPHERICAL ABERRATION FNO. 5.480
FIG.6F ASTIGMATISM FIY 41.43
FIG.6G DISTORTION FIY 41.43
FIG.6H CHROMATIC ABERRATION OF MAGNIFICATION FIY 41.43

FIG.6I SPHERICAL ABERRATION FNO. 5.400
FIG.6J ASTIGMATISM FIY 34.77
FIG.6K DISTORTION FIY 34.77
FIG.6L CHROMATIC ABERRATION OF MAGNIFICATION FIY 34.77

435.84 ———  656.27 ---------  587.56 ———

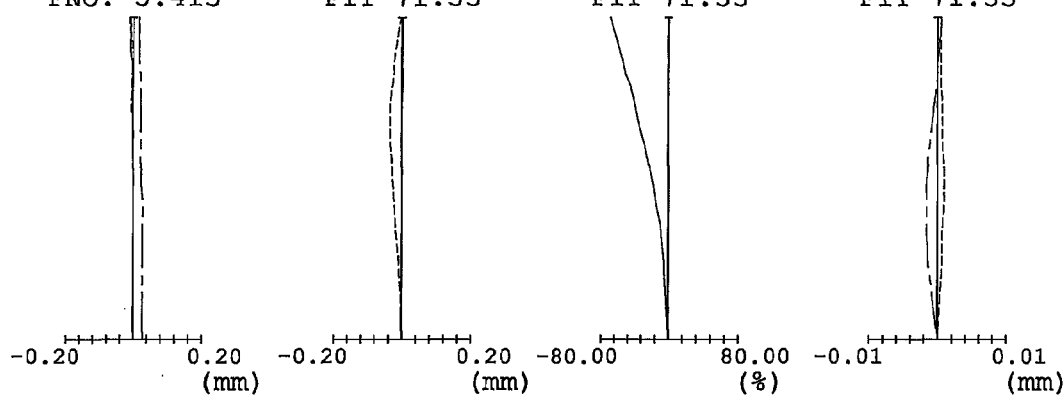
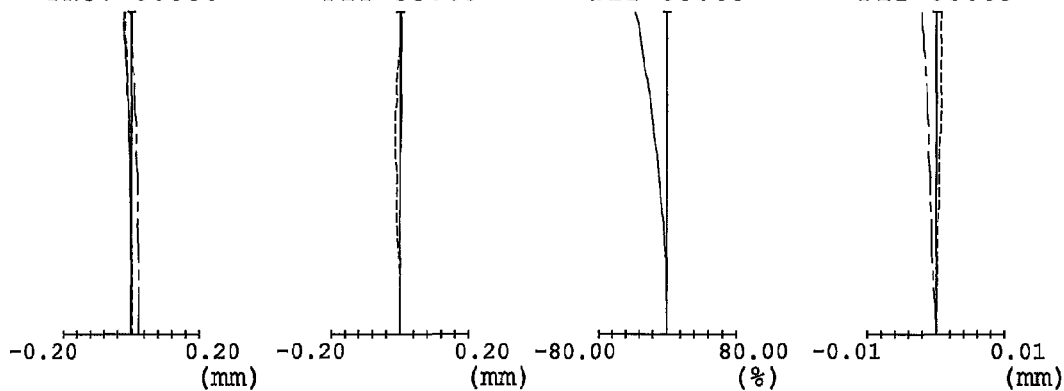
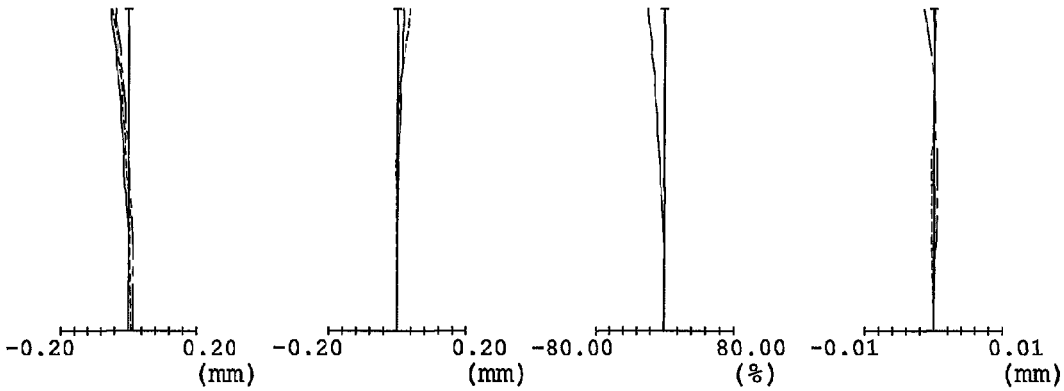

SPHERICAL ABERRATION  
FNO. 5.409

-0.20   0.20
(mm)

ASTIGMATISM  
FIY 71.34

-0.20   0.20
(mm)

DISTORTION  
FIY 71.34

-80.00   80.00
(%)

CHROMATIC ABERRATION OF MAGNIFICATION  
FIY 71.34

-0.01   0.01
(mm)

SPHERICAL ABERRATION  
FNO. 5.564

-0.20   0.20
(mm)

ASTIGMATISM  
FIY 51.32

-0.20   0.20
(mm)

DISTORTION  
FIY 51.32

-80.00   80.00
(%)

CHROMATIC ABERRATION OF MAGNIFICATION  
FIY 51.32

-0.01   0.01
(mm)

SPHERICAL ABERRATION  
FNO. 5.400

-0.20   0.20
(mm)

ASTIGMATISM  
FIY 38.77

-0.20   0.20
(mm)

DISTORTION  
FIY 38.77

-80.00   80.00
(%)

CHROMATIC ABERRATION OF MAGNIFICATION  
FIY 38.77

-0.01   0.01
(mm)

435.84 —  —  656.27 - - - - - -  587.56 ———

SPHERICAL
ABERRATION
FNO. 5.401

-0.20　　　0.20
　　　(mm)

ASTIGMATISM
FIY 71.36

-0.20　　　0.20
　　　(mm)

DISTORTION
FIY 71.36

-80.00　　　80.00
　　　(%)

CHROMATIC
ABERRATION OF
MAGNIFICATION
FIY 71.36

-0.01　　　0.01
　　　(mm)

SPHERICAL
ABERRATION
FNO. 5.566

-0.20　　　0.20
　　　(mm)

ASTIGMATISM
FIY 50.85

-0.20　　　0.20
　　　(mm)

DISTORTION
FIY 50.85

-80.00　　　80.00
　　　(%)

CHROMATIC
ABERRATION OF
MAGNIFICATION
FIY 50.85

-0.01　　　0.01
　　　(mm)

SPHERICAL
ABERRATION
FNO. 5.400

-0.20　　　0.20
　　　(mm)

ASTIGMATISM
FIY 38.28

-0.20　　　0.20
　　　(mm)

DISTORTION
FIY 38.28

-80.00　　　80.00
　　　(%)

CHROMATIC
ABERRATION OF
MAGNIFICATION
FIY 38.28

-0.01　　　0.01
　　　(mm)

435.84 ————　　656.27 --------　　587.56 ———

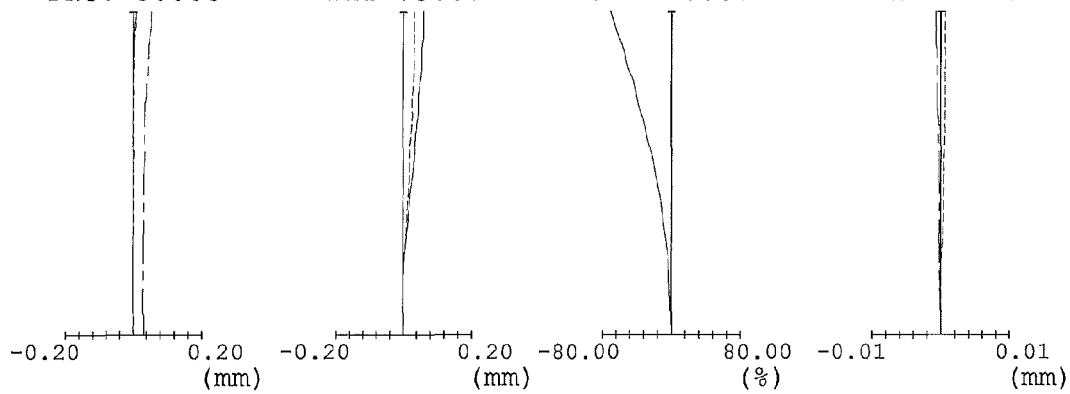
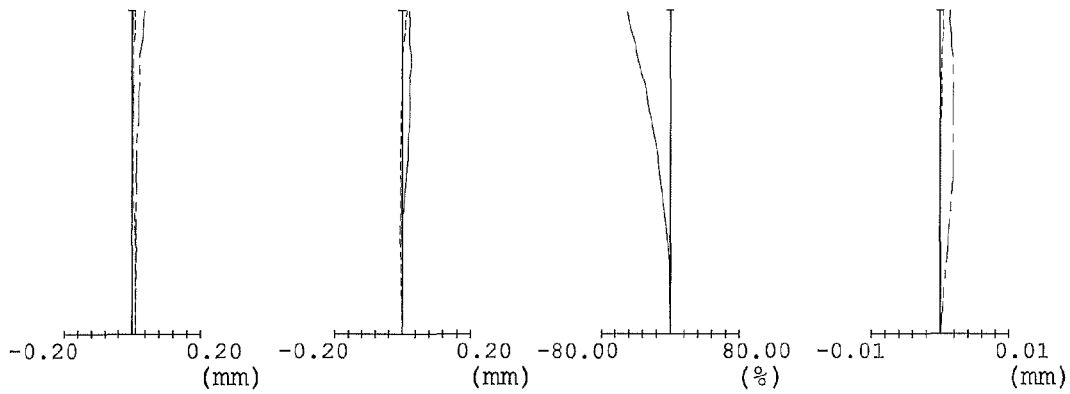
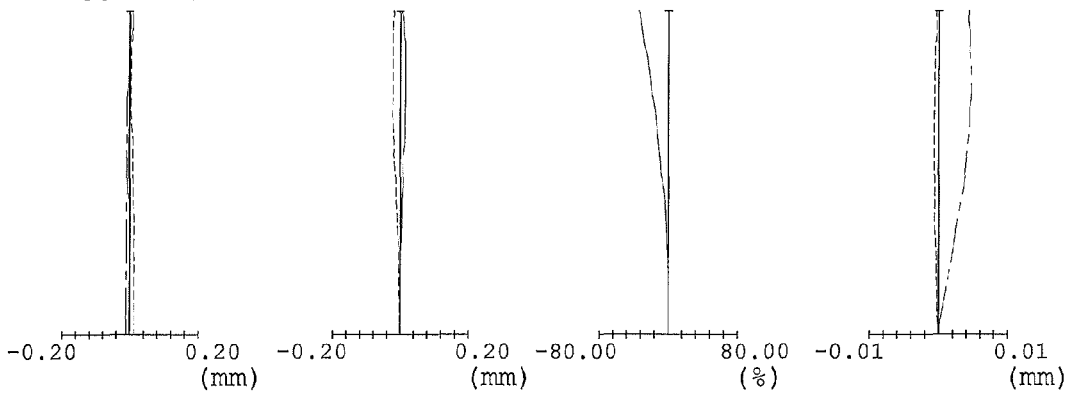

SPHERICAL
ABERRATION
FNO. 4.354

-0.20       0.20
     (mm)

ASTIGMATISM
FIY 71.93

-0.20       0.20
     (mm)

DISTORTION
FIY 71.93

-70.00     70.00
      (%)

CHROMATIC
ABERRATION OF
MAGNIFICATION
FIY 71.93

-0.01       0.01
     (mm)

SPHERICAL
ABERRATION
FNO. 4.543

-0.20       0.20
     (mm)

ASTIGMATISM
FIY 55.54

-0.20       0.20
     (mm)

DISTORTION
FIY 55.54

-70.00     70.00
      (%)

CHROMATIC
ABERRATION OF
MAGNIFICATION
FIY 55.54

-0.01       0.01
     (mm)

SPHERICAL
ABERRATION
FNO. 4.613

-0.20       0.20
     (mm)

ASTIGMATISM
FIY 49.59

-0.20       0.20
     (mm)

DISTORTION
FIY 49.59

-70.00     70.00
      (%)

CHROMATIC
ABERRATION OF
MAGNIFICATION
FIY 49.59

-0.01       0.01
     (mm)

435.84 — — —   656.27 ---------   587.56 ———

SPHERICAL
ABERRATION
FNO. 6.951

-0.20　　　0.20
(mm)

ASTIGMATISM
FIY 72.62

-0.20　　　0.20
(mm)

DISTORTION
FIY 72.62

-70.00　　　70.00
(%)

CHROMATIC
ABERRATION OF
MAGNIFICATION
FIY 72.62

-0.01　　　0.01
(mm)

SPHERICAL
ABERRATION
FNO. 7.219

-0.20　　　0.20
(mm)

ASTIGMATISM
FIY 49.98

-0.20　　　0.20
(mm)

DISTORTION
FIY 49.98

-70.00　　　70.00
(%)

CHROMATIC
ABERRATION OF
MAGNIFICATION
FIY 49.98

-0.01　　　0.01
(mm)

SPHERICAL
ABERRATION
FNO. 7.011

-0.20　　　0.20
(mm)

ASTIGMATISM
FIY 38.37

-0.20　　　0.20
(mm)

DISTORTION
FIY 38.37

-70.00　　　70.00
(%)

CHROMATIC
ABERRATION OF
MAGNIFICATION
FIY 38.37

-0.01　　　0.01
(mm)

435.84 ——— 　　656.27 --------- 　　587.56 ———

FIG.20A SPHERICAL ABERRATION FNO. 3.934
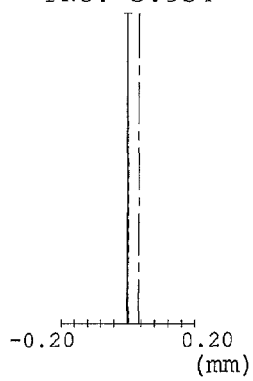

FIG.20B ASTIGMATISM FIY 72.37
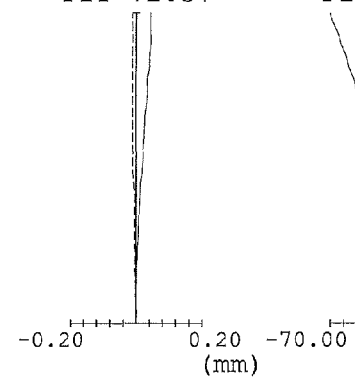

FIG.20C DISTORTION FIY 72.37

FIG.20D CHROMATIC ABERRATION OF MAGNIFICATION FIY 72.37
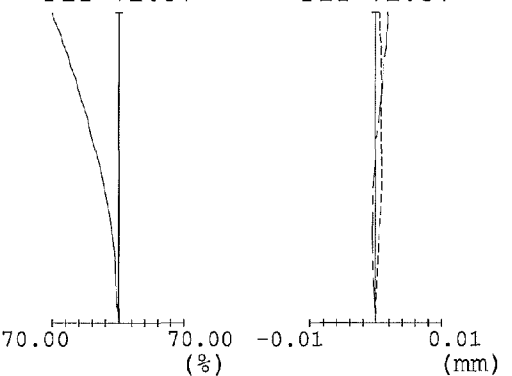

FIG.20E SPHERICAL ABERRATION FNO. 4.236
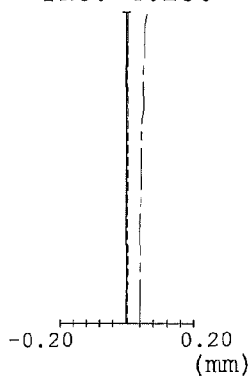

FIG.20F ASTIGMATISM FIY 49.02
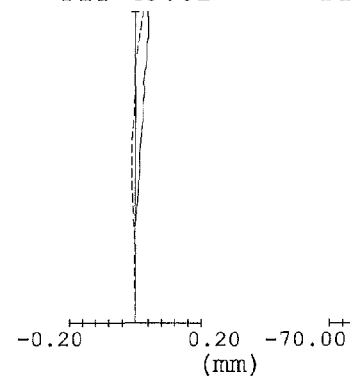

FIG.20G DISTORTION FIY 49.02

FIG.20H CHROMATIC ABERRATION OF MAGNIFICATION FIY 49.02
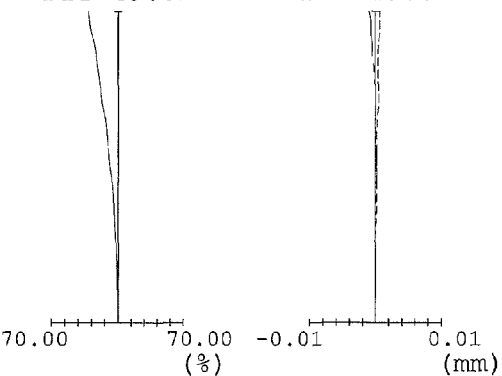

FIG.20I SPHERICAL ABERRATION FNO. 4.318
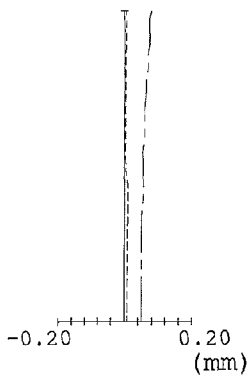

FIG.20J ASTIGMATISM FIY 36.31
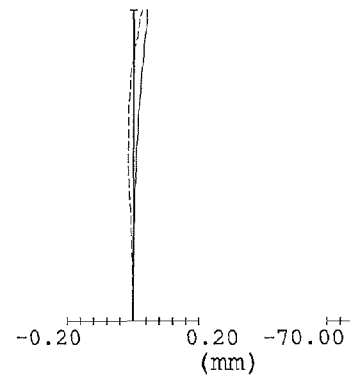

FIG.20K DISTORTION FIY 36.31

FIG.20L CHROMATIC ABERRATION OF MAGNIFICATION FIY 36.31
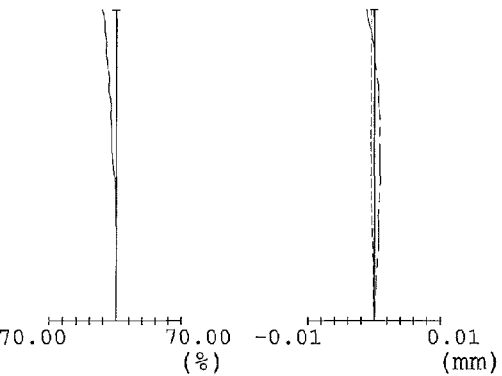

435.84 ——·—— 656.27 -------- 587.56 ———

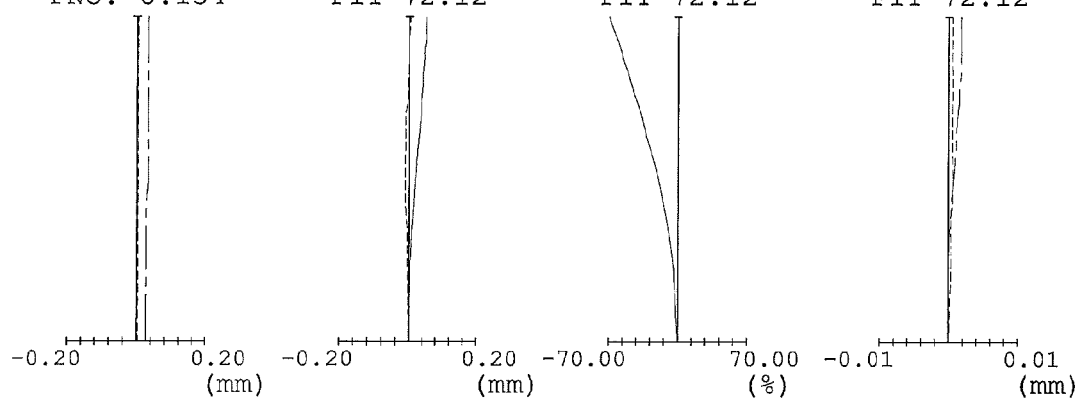
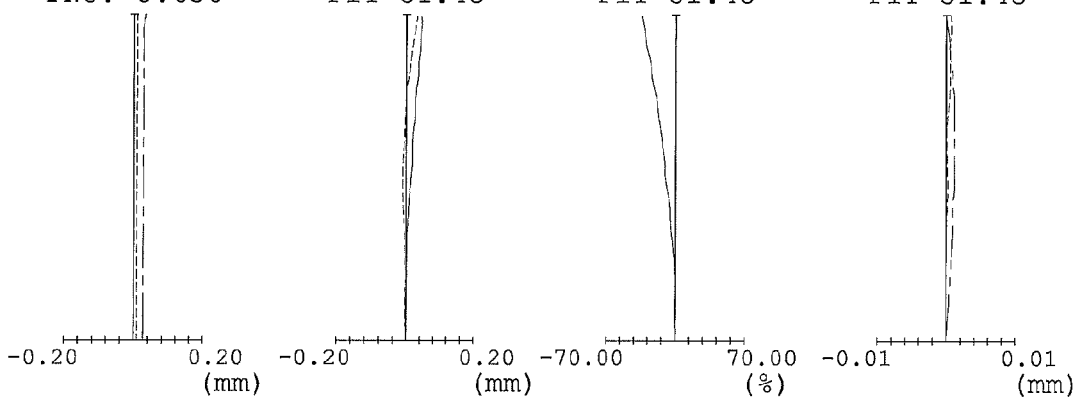
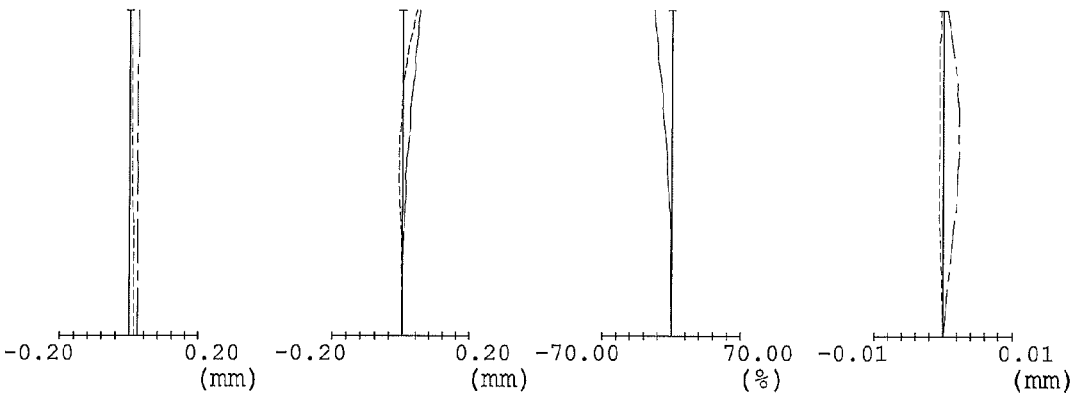

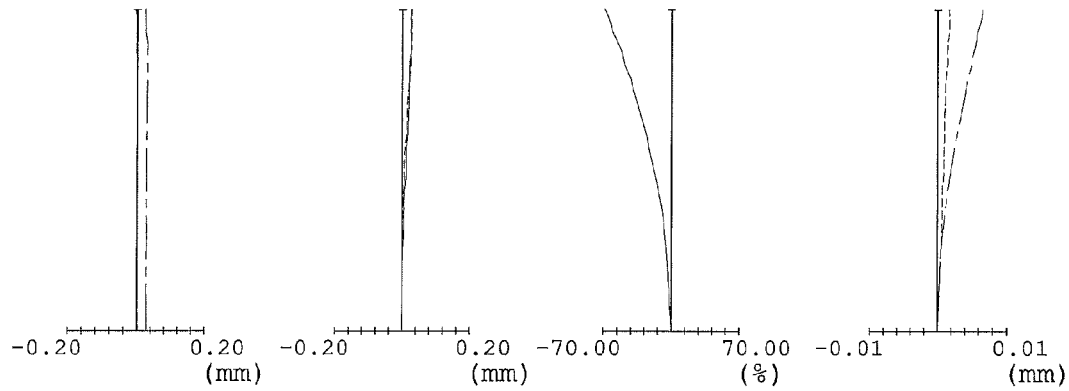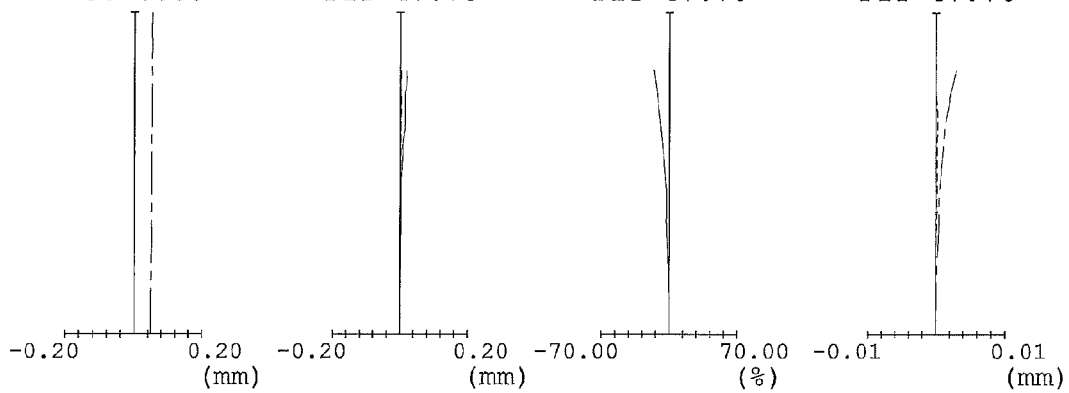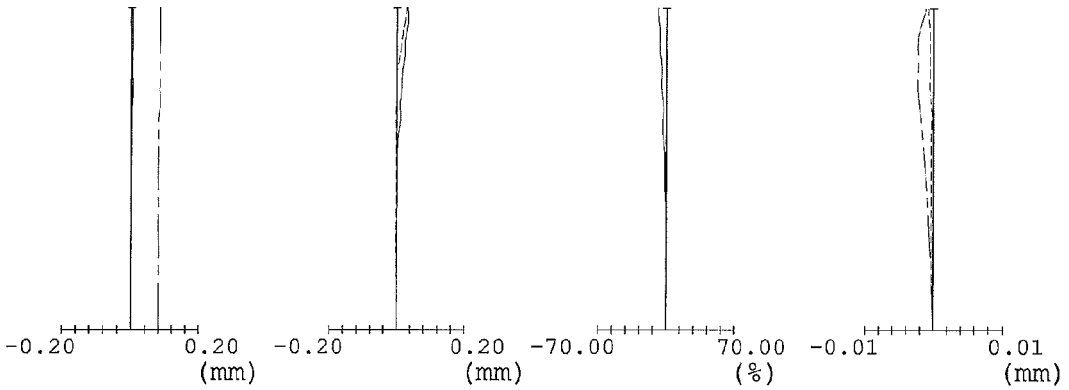

SPHERICAL
ABERRATION
FNO. 7.254

-0.20    0.20
       (mm)

ASTIGMATISM
FIY 72.52

-0.20    0.20
       (mm)

DISTORTION
FIY 72.52

-70.00    70.00
         (%)

CHROMATIC
ABERRATION OF
MAGNIFICATION
FIY 72.52

-0.01    0.01
       (mm)

SPHERICAL
ABERRATION
FNO. 7.492

-0.20    0.20
       (mm)

ASTIGMATISM
FIY 54.69

-0.20    0.20
       (mm)

DISTORTION
FIY 54.69

-70.00    70.00
         (%)

CHROMATIC
ABERRATION OF
MAGNIFICATION
FIY 54.69

-0.01    0.01
       (mm)

SPHERICAL
ABERRATION
FNO. 7.499

-0.20    0.20
       (mm)

ASTIGMATISM
FIY 43.86

-0.20    0.20
       (mm)

DISTORTION
FIY 43.86

-70.00    70.00
         (%)

CHROMATIC
ABERRATION OF
MAGNIFICATION
FIY 43.86

-0.01    0.01
       (mm)

435.84 — — —    656.27 - - - - - -    587.56 ———

FIG.28A SPHERICAL ABERRATION FNO. 6.666

FIG.28B ASTIGMATISM FIY 72.21

FIG.28C DISTORTION FIY 72.21

FIG.28D CHROMATIC ABERRATION OF MAGNIFICATION FIY 72.21

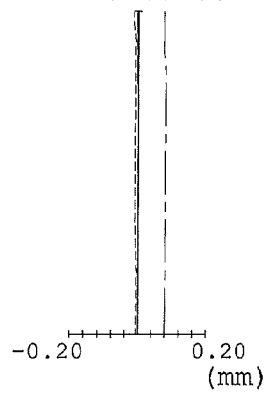
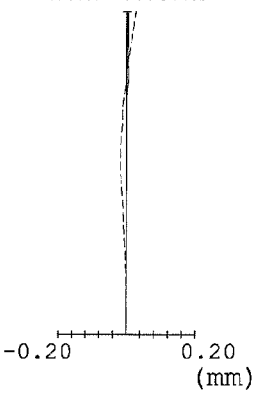
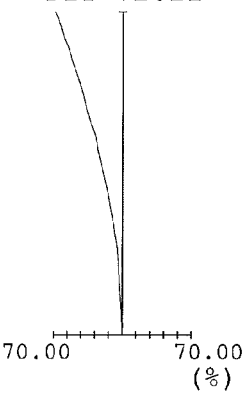
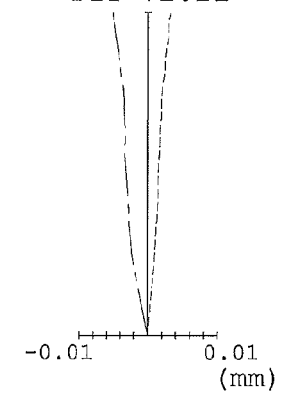

FIG.28E SPHERICAL ABERRATION FNO. 8.001

FIG.28F ASTIGMATISM FIY 35.92

FIG.28G DISTORTION FIY 35.92

FIG.28H CHROMATIC ABERRATION OF MAGNIFICATION FIY 35.92

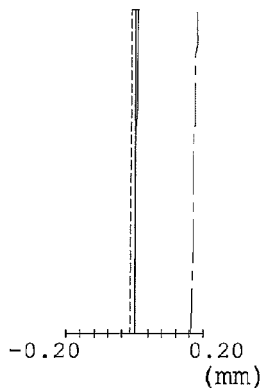
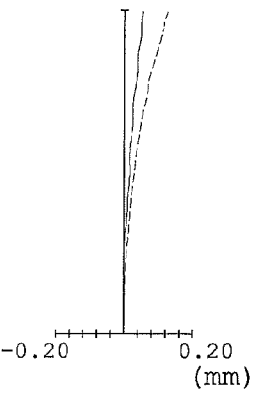
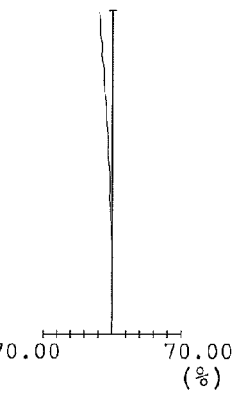
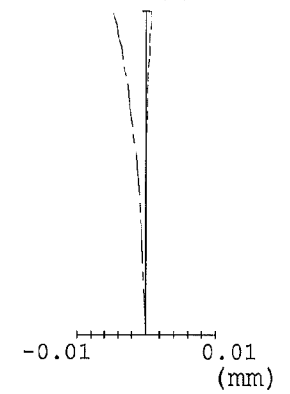

FIG.28I SPHERICAL ABERRATION FNO. 8.041

FIG.28J ASTIGMATISM FIY 26.98

FIG.28K DISTORTION FIY 26.98

FIG.28L CHROMATIC ABERRATION OF MAGNIFICATION FIY 26.98

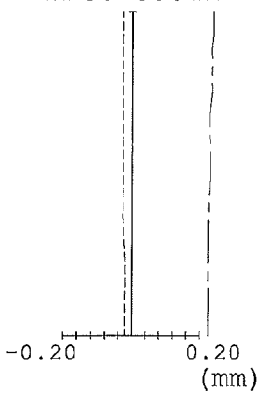
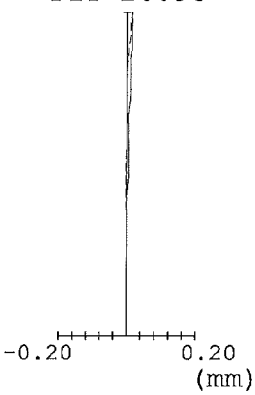
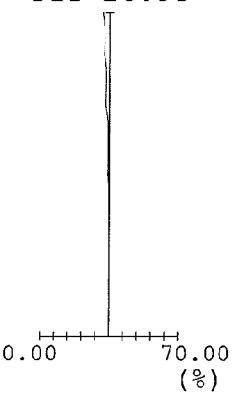
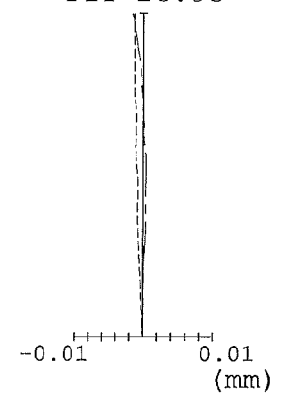

435.84 ——·—— 656.27 --------- 587.56 ———

SPHERICAL
ABERRATION
FNO. 7.694

ASTIGMATISM
FIY 71.91

DISTORTION
FIY 71.91

CHROMATIC
ABERRATION OF
MAGNIFICATION
FIY 71.91

SPHERICAL
ABERRATION
FNO. 8.138

ASTIGMATISM
FIY 47.48

DISTORTION
FIY 47.48

CHROMATIC
ABERRATION OF
MAGNIFICATION
FIY 47.48

SPHERICAL
ABERRATION
FNO. 8.012

ASTIGMATISM
FIY 36.43

DISTORTION
FIY 36.43

CHROMATIC
ABERRATION OF
MAGNIFICATION
FIY 36.43

435.84 ――――  656.27 ‒‒‒‒‒‒‒  587.56 ―――

SPHERICAL
ABERRATION
FNO. 8.367

ASTIGMATISM
FIY 72.30

DISTORTION
FIY 72.30

CHROMATIC
ABERRATION OF
MAGNIFICATION
FIY 72.30

SPHERICAL
ABERRATION
FNO. 9.172

ASTIGMATISM
FIY 48.22

DISTORTION
FIY 48.22

CHROMATIC
ABERRATION OF
MAGNIFICATION
FIY 48.22

SPHERICAL
ABERRATION
FNO. 9.518

ASTIGMATISM
FIY 35.88

DISTORTION
FIY 35.88

CHROMATIC
ABERRATION OF
MAGNIFICATION
FIY 35.88

435.84 ——— 656.27 --------- 587.56 ———

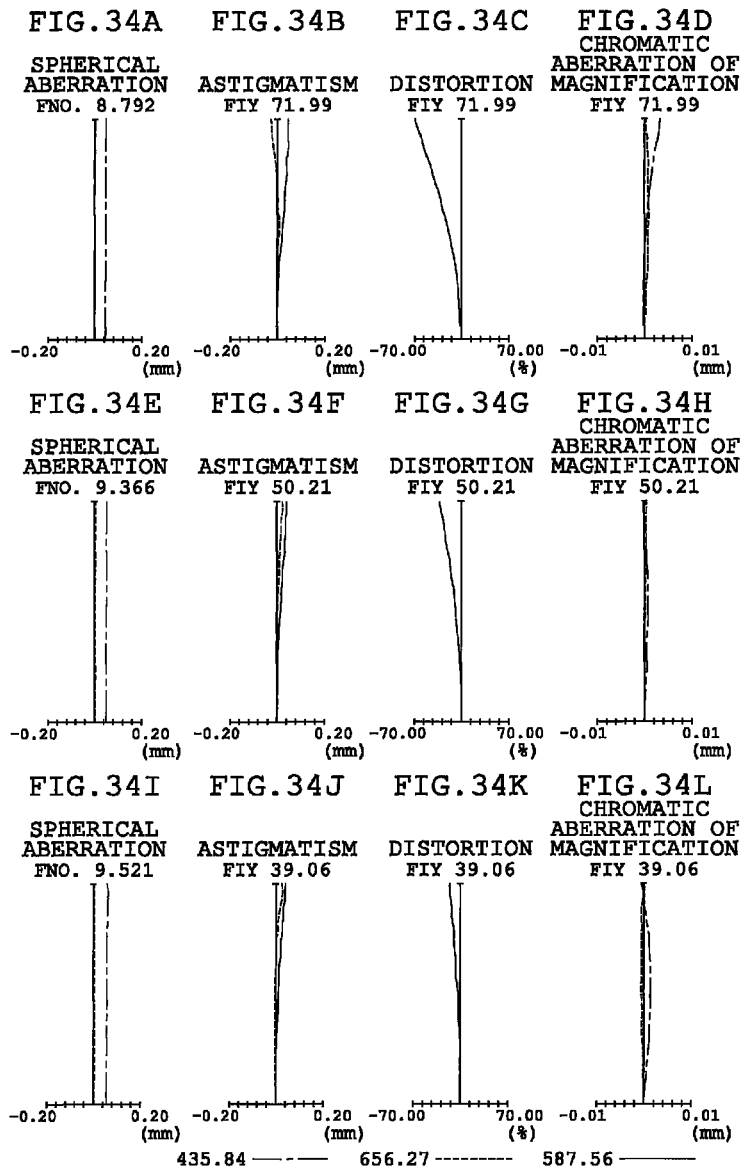

FIG.36A  FIG.36B  FIG.36C  FIG.36D
SPHERICAL                         CHROMATIC
                                  ABERRATION OF
ABERRATION ASTIGMATISM DISTORTION MAGNIFICATION
FNO. 9.067 FIY 72.19  FIY 72.19   FIY 72.19
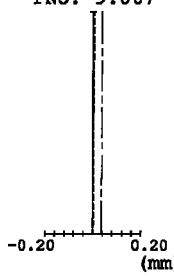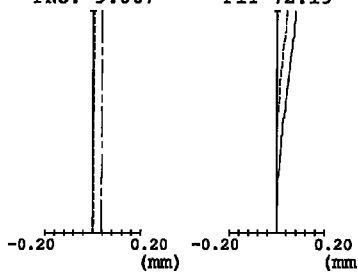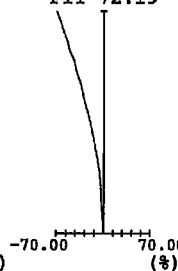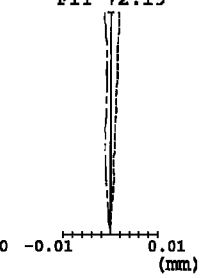
-0.20   0.20 -0.20   0.20 -70.00   70.00 -0.01   0.01
   (mm)        (mm)         (%)           (mm)
FIG.36E  FIG.36F  FIG.36G  FIG.36H
SPHERICAL                         CHROMATIC
                                  ABERRATION OF
ABERRATION ASTIGMATISM DISTORTION MAGNIFICATION
FNO. 9.353 FIY 49.15  FIY 49.15   FIY 49.15
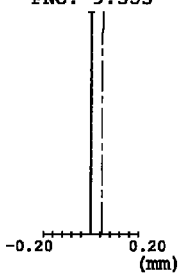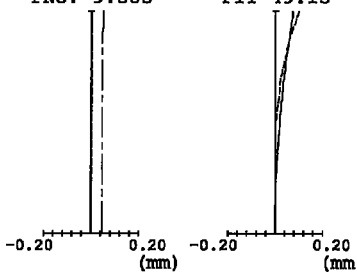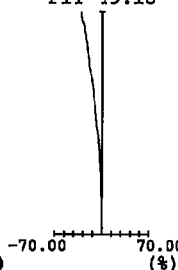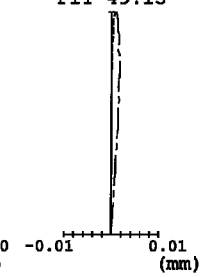
-0.20   0.20 -0.20   0.20 -70.00   70.00 -0.01   0.01
   (mm)        (mm)         (%)           (mm)
FIG.36I  FIG.36J  FIG.36K  FIG.36L
SPHERICAL                         CHROMATIC
                                  ABERRATION OF
ABERRATION ASTIGMATISM DISTORTION MAGNIFICATION
FNO. 9.014 FIY 38.42  FIY 38.42   FIY 38.42
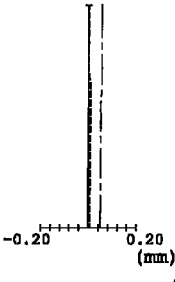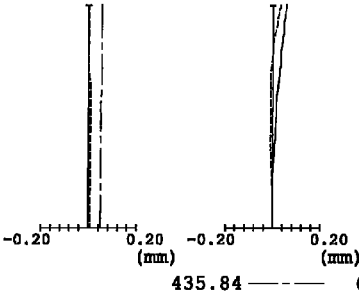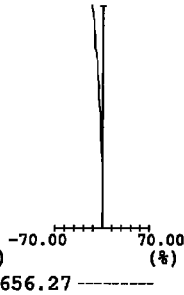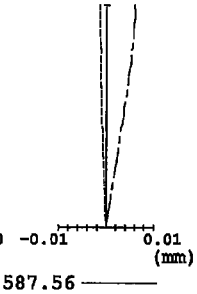
-0.20   0.20 -0.20   0.20 -70.00   70.00 -0.01   0.01
   (mm)        (mm)         (%)           (mm)
       435.84 ——— 656.27 -------- 587.56 ———

SPHERICAL
ABERRATION
FNO. 9.106

ASTIGMATISM
FIY 72.08

DISTORTION
FIY 72.08

CHROMATIC
ABERRATION OF
MAGNIFICATION
FIY 72.08

SPHERICAL
ABERRATION
FNO. 9.372

ASTIGMATISM
FIY 49.01

DISTORTION
FIY 49.01

CHROMATIC
ABERRATION OF
MAGNIFICATION
FIY 49.01

SPHERICAL
ABERRATION
FNO. 9.014

ASTIGMATISM
FIY 38.46

DISTORTION
FIY 38.46

CHROMATIC
ABERRATION OF
MAGNIFICATION
FIY 38.46

435.84 ————  656.27 --------  587.56 ———

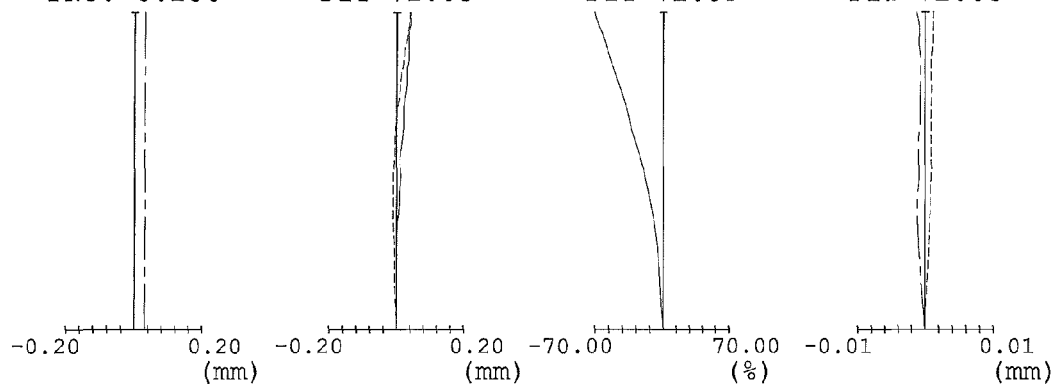
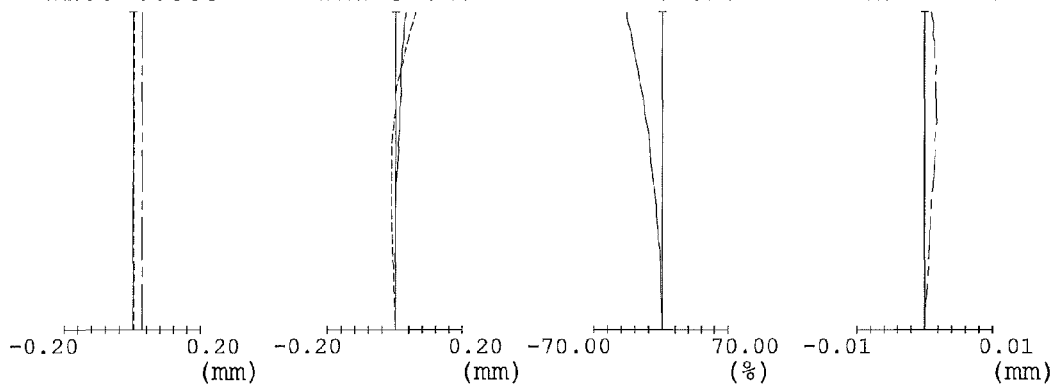
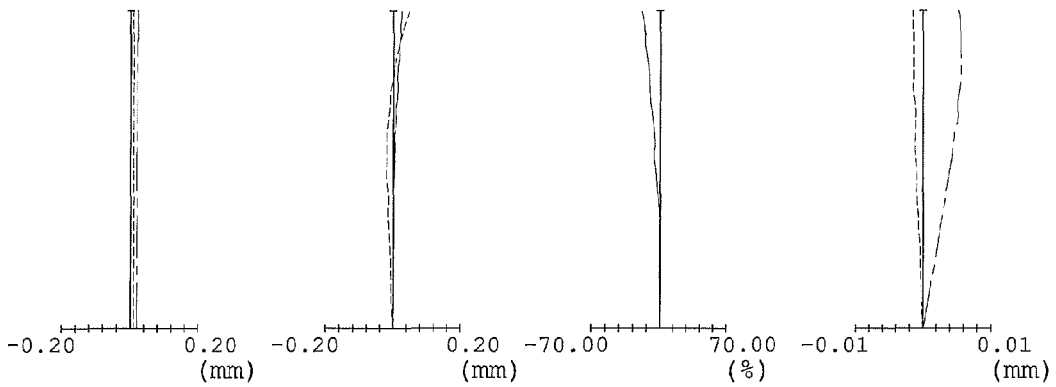

SPHERICAL
ABERRATION
FNO. 5.433

-0.20  0.20
(mm)

ASTIGMATISM
FIY 72.14

-0.20  0.20
(mm)

DISTORTION
FIY 72.14

-70.00  70.00
(%)

CHROMATIC
ABERRATION OF
MAGNIFICATION
FIY 72.14

-0.01  0.01
(mm)

SPHERICAL
ABERRATION
FNO. 5.470

-0.20  0.20
(mm)

ASTIGMATISM
FIY 63.25

-0.20  0.20
(mm)

DISTORTION
FIY 63.25

-70.00  70.00
(%)

CHROMATIC
ABERRATION OF
MAGNIFICATION
FIY 63.25

-0.01  0.01
(mm)

SPHERICAL
ABERRATION
FNO. 5.475

-0.20  0.20
(mm)

ASTIGMATISM
FIY 56.56

-0.20  0.20
(mm)

DISTORTION
FIY 56.56

-70.00  70.00
(%)

CHROMATIC
ABERRATION OF
MAGNIFICATION
FIY 56.56

-0.01  0.01
(mm)

435.84 — · —  656.27 - - - - -  587.56 ———

OBJECTIVE OPTICAL SYSTEM AND OBSERVATION APPARATUS PROVIDED WITH THE SAME

This application claims benefits of Japanese Applications No. 2011-247521 filed in Japan on Nov. 11, 2011, No. 2011-247522 filed in Japan on Nov. 11, 2011, and No. 2012-022133 filed in Japan on Feb. 3, 2012, the contents of which are incorporated herein by reference.

BACKGROUND OF THE INVENTION

1. Field of the Invention

This invention relates to an objective optical system which is provided with two movable lens groups moving along the optical axis, and relates to an observation apparatus having the same.

2. Description of Related Art

Objective optical systems having known up to now include an objective optical system in which a lens group is moved to change a state of the objective optical system suitable for normal observation (which is called "normal observation state" below) into a state of the objective optical system suitable for close-up observation (which is called "close-up observation state" below) so that the objective optical system is closed to a particular object optionally selected from a plurality of objects present in an observation area by an observer to make it possible to observe the particular object in detail.

Such objective optical systems include, for example, an objective optical system: which consists of a first lens group with negative power, a second lens group with positive power, a third lens group with negative power, a fourth lens group with positive power, and a fifth lens group with positive power, in that order from the object side; and in which focusing is performed by moving the second and third lens groups along the optical axis in the range from the normal observation state to the middle state and by moving the fifth lens group along the optical axis in the range from the middle state to the close-up observation state (refer to Japanese Patent Kokai No. 2007-155887).

In addition, there is also an objective optical system: which consists of a first lens group with positive power, a second lens group with negative power, and a third lens group with positive power, in that order from the object side; and in which a magnification is changed and focusing is performed by moving the second lens group (refer to Japanese Patent Kokai No. 2007-233036).

SUMMARY OF THE INVENTION

An objective optical system according to the present invention is characterized in that: the objective optical system includes an immovable lens group which is arranged nearest to the object side, which is immovable in focusing, and which has negative power, and first and second movable lens groups at least one of which moves along the optical axis in focusing; and an amount of variation in magnification per movement of the first movable lens group is different from an amount of variation in magnification per movement of the second movable lens group.

Also, an objective optical system according to the present invention, which can reversibly and continuously change its normal observation state into its close-up observation state by moving a predetermined lens group to change a magnification, is characterized in that: the objective optical system includes an immovable lens group which is arranged nearest to the object side, which is immovable in focusing and in the change from the normal observation state, and which has negative power, and first and second movable lens groups at least one of which moves along the optical axis in focusing; the first movable lens group is arranged nearer to the object side than the second movable lens group is arranged; an amount of variation in magnification per movement of the first movable lens group is smaller than an amount of variation in magnification per movement of the second movable lens group; and the change from the normal observation state is made by moving the second movable lens group.

Also, an observation apparatus according to the present invention is characterized in that the observation apparatus includes an above-described objective optical system and an autofocus mechanism for moving the first movable lens group.

Also, an objective optical system according to the present invention, which can reversibly and continuously change its normal observation state into its close-up observation state by moving a predetermined lens group to change a magnification, is characterized in that: the objective optical system includes an immovable lens group which is arranged nearest to the object side and which is immovable in changing magnification and in focusing, a magnification-changing group which moves along the optical axis at least in changing magnification, and a focusing group which moves along the optical axis at least in focusing; the immovable lens group includes a lens having negative power, the lens with negative power being located nearest to the object side; the magnification-changing group is arranged nearer to the object side than the focusing group is arranged; an amount of variation in magnification per movement of the magnification-changing group is larger than an amount of variation in magnification per movement of the focusing group; and a change in magnification is made by moving the magnification-changing group.

Also, an observation apparatus according to the present invention is characterized in that the observation apparatus includes the above-described objective optical system and an autofocus mechanism for moving the focusing group.

These and other features and advantages of the present invention will become apparent from the following detailed description of the preferred embodiments when taken in conjunction with the accompanying drawings.

BRIEF DESCRIPTION OF DRAWINGS

FIG. 1A shows the normal observation state of the optical system (in the farthest point state), FIG. 1B shows the middle state of the optical system (in the farthest point state), and FIG. 1C shows the close-up observation state of the optical system (in the farthest point state).

FIG. 2A shows the normal observation state of the optical system (in the farthest point state), FIG. 2B shows the middle state of the optical system (in the farthest point state), and FIG. 2C shows the close-up observation state of the optical system (in the farthest point state).

FIG. 3A shows the normal observation state of the optical system (in the farthest point state), FIG. 3B shows the middle state of the optical system (in the farthest point state), and FIG. 3C shows the close-up observation state of the optical system (in the farthest point state).

FIGS. 4A to 4L are aberration diagrams showing spherical aberration, astigmatism, distortion, and chromatic aberration of magnification in the optical system shown in FIGS. 3A-3C. To be specific, FIGS. 4A to 4D show the aberrations in the normal observation state of the optical system (in the farthest point state), FIGS. 4E to 4H show the aberrations in the middle state of the optical system (in the farthest point state), and FIGS. 4I to 4L show the aberrations in the close-up observation state of the optical system (in the farthest point state).

FIG. 5A shows the normal observation state of the optical system (in the farthest point state), FIG. 5B shows the middle state of the optical system (in the farthest point state), and FIG. 5C shows the close-up observation state of the optical system (in the farthest point state).

FIGS. 6A to 6L are aberration diagrams showing spherical aberration, astigmatism, distortion, and chromatic aberration of magnification in the optical system shown in FIGS. 5A-5C. To be specific, FIGS. 6A to 6D show the aberrations in the normal observation state of the optical system (in the farthest point state), FIGS. 6E to 6H show the aberrations in the middle state of the optical system (in the farthest point state), and FIGS. 6I to 6L show the aberrations in the close-up observation state of the optical system (in the farthest point state).

FIG. 7A shows the normal observation state of the optical system (in the farthest point state), FIG. 7B shows the middle state of the optical system (in the farthest point state), and FIG. 7C shows the close-up observation state of the optical system (in the farthest point state).

FIGS. 8A to 8L are aberration diagrams showing spherical aberration, astigmatism, distortion, and chromatic aberration of magnification in the optical system shown in FIGS. 7A-7C. To be specific, FIGS. 8A to 8D show the aberrations in the normal observation state of the optical system (in the farthest point state), FIGS. 8E to 8H show the aberrations in the middle state of the optical system (in the farthest point state), and FIGS. 8I to 8L show the aberrations in the close-up observation state of the optical system (in the farthest point state).

FIG. 9A shows the normal observation state of the optical system (in the farthest point state), FIG. 9B shows the middle state of the optical system (in the farthest point state), and FIG. 9C shows the close-up observation state of the optical system (in the farthest point state).

FIGS. 10A to 10D show the aberrations in the normal observation state of the optical system (in the farthest point state), FIGS. 10E to 10H show the aberrations in the middle state of the optical system (in the farthest point state), and FIGS. 10I to 10L show the aberrations in the close-up observation state of the optical system (in the farthest point state).

FIG. 11A shows the normal observation state of the optical system (in the farthest point state), FIG. 11B shows the middle state of the optical system (in the farthest point state), and FIG. 11C shows the close-up observation state of the optical system (in the farthest point state).

FIGS. 12A to 12D show the aberrations in the normal observation state of the optical system (in the farthest point state), FIGS. 12E to 12H show the aberrations in the middle state of the optical system (in the farthest point state), and FIGS. 12I to 12L show the aberrations in the close-up observation state of the optical system (in the farthest point state).

FIG. 13A is shows the normal observation state of the optical system (in the farthest point state), FIG. 13B shows the middle state of the optical system (in the farthest point state), and FIG. 13C shows the close-up observation state of the optical system (in the farthest point state).

FIGS. 14A to 14L are aberration diagrams showing spherical aberration, astigmatism, distortion, and chromatic aberration of magnification in the optical system shown in FIGS. 13A-13C. To be specific, FIGS. 14A to 14D show the aberrations in the normal observation state of the optical system (in the farthest point state), FIGS. 14E to 14H show the aberrations in the middle state of the optical system (in the farthest point state), and FIGS. 14I to 14L show the aberrations in the close-up observation state of the optical system (in the farthest point state).

FIG. 15A shows the normal observation state of the optical system (in the farthest point state), FIG. 15B shows the middle observation state of the optical system (in the farthest point state), and FIG. 15C show the close-up observation state of the optical system (in the farthest point state).

FIGS. 16A to 16D show the aberrations in the normal observation state of the optical system (in the farthest point state), FIGS. 16E to 16H show the aberrations in the middle observation state of the optical system (in the farthest point state), and FIGS. 16I to 16L show the aberrations in the close-up observation state of the optical system (in the farthest point state).

FIG. 17A shows the normal observation state of the optical system (in the farthest point state), FIG. 17B shows the middle observation state of the optical system (in the farthest point state), and FIG. 17C shows the close-up observation state of the optical system (in the farthest point state).

FIGS. 18A to 18D show the aberrations in the normal observation state of the optical system (in the farthest point state), FIGS. 18E to 18H show the aberrations in the middle observation state of the optical system (in the farthest point state), and FIGS. 18I to 18L show the aberrations in the close-up observation state of the optical system (in the farthest point state).

FIG. 19A shows the normal observation state of the optical system (in the farthest point state), FIG. 19B shows the middle observation state of the optical system (in the farthest point state), and FIG. 19C shows the close-up observation state of the optical system (in the farthest point state).

FIGS. 20A to 20L are aberration diagrams showing spherical aberration, astigmatism, distortion, and chromatic aberration of magnification in the optical system shown in FIGS. 19A-19C, where FIGS. 20A to 20D show the aberrations in the normal observation state of the optical system (in the farthest point state), FIGS. 20E to 20H show the aberrations in the middle observation state of the optical system (in the farthest point state), and FIGS. 20I to 20L show the aberrations in the close-up observation state of the optical system (in the farthest point state).

FIG. 21A shows the normal observation state of the optical system (in the farthest point state), FIG. 21B shows the middle observation state of the optical system (in the farthest point state), and FIG. 21C shows a view showing the close-up observation state of the optical system (in the farthest point state).

FIGS. 22A to 22L are aberration diagrams showing spherical aberration, astigmatism, distortion, and chromatic aberration of magnification in the optical system shown in FIGS. 21A-21C. To be specific, FIGS. 22A to 22D show the aberrations in the normal observation state of the optical system (in the farthest point state), FIGS. 22E to 22H show the aberrations in the middle observation state of the optical system (in the farthest point state), and FIGS. 22I to 22L show the aberrations in the close-up observation state of the optical system (in the farthest point state).

FIG. 23A shows the normal observation state of the optical system (in the farthest point state), FIG. 23B shows the middle observation state of the optical system (in the farthest point state), and FIG. 23C shows the close-up observation state of the optical system (in the farthest point state).

FIGS. 24A to 24L are aberration diagrams showing spherical aberration, astigmatism, distortion, and chromatic aberration of magnification in the optical system shown in FIGS. 23A-23C. To be specific, FIGS. 24A to 24D show the aberrations in the normal observation state of the optical system (in the farthest point state), FIGS. 24E to 24H show the aberrations in the middle observation state of the optical system (in the farthest point state), and FIGS. 24I to 24L show the aberrations in the close-up observation state of the optical system (in the farthest point state).

FIG. 25A shows the normal observation state of the optical system (in the farthest point state), FIG. 25B shows the middle observation state of the optical system (in the farthest point state), and FIG. 25C shows the close-up observation state of the optical system (in the farthest point state).

FIGS. 26A to 26D show the aberrations in the normal observation state of the optical system (in the farthest point state), FIGS. 26E to 26H show the aberrations in the middle observation state of the optical system (in the farthest point state), and FIGS. 26I to 26L show the aberrations in the close-up observation state of the optical system (in the farthest point state).

FIG. 27A shows the normal observation state of the optical system (in the farthest point state), FIG. 27B shows the middle observation state of the optical system (in the farthest point state), and FIG. 27C shows the close-up observation state of the optical system (in the farthest point state).

FIGS. 28A to 28L are aberration diagrams showing spherical aberration, astigmatism, distortion, and chromatic aberration of magnification in the optical system shown in FIGS. 27A-27C. To be specific, FIGS. 28A to 28D show the aberrations in the normal observation state of the optical system (in the farthest point state), FIGS. 28E to 28H show the aberrations in the middle observation state of the optical system (in the farthest point state), and FIGS. 28I to 28L show the aberrations in the close-up observation state of the optical system (in the farthest point state).

FIG. 29A shows the normal observation state of the optical system (in the farthest point state), FIG. 29B shows the middle observation state of the optical system (in the farthest point state), and FIG. 29C shows the close-up observation state of the optical system (in the farthest point state).

FIGS. 30A to 30D show the aberrations in the normal observation state of the optical system (in the farthest point state), FIGS. 30E to 30H show the aberrations in the middle observation state of the optical system (in the farthest point state), and FIGS. 30I to 30L show the aberrations in the close-up observation state of the optical system (in the farthest point state).

FIG. 31A shows the normal observation state of the optical system (in the farthest point state), FIG. 31B shows the middle observation state of the optical system (in the farthest point state), and FIG. 31C shows the close-up observation state of the optical system (in the farthest point state).

FIGS. 32A to 32D show the aberrations in the normal observation state of the optical system (in the farthest point state), FIGS. 32 to 32H show the aberrations in the middle observation state of the optical system (in the farthest point state), and FIGS. 32I to 32L show the aberrations in the close-up observation state of the optical system (in the farthest point state).

FIG. 33A shows the normal observation state of the optical system (in the farthest point state), FIG. 33B shows the middle observation state of the optical system (in the farthest point state), and FIG. 33C shows the close-up observation state of the optical system (in the farthest point state).

FIGS. 34A to 34L are aberration diagrams showing spherical aberration, astigmatism, distortion, and chromatic aberration of magnification in the optical system shown in FIGS. 33A-33C. To be specific, FIGS. 34A to 34D show the aberrations in the normal observation state of the optical system (in the farthest point state), FIGS. 34E to 34H show the aberrations in the middle observation state of the optical system (in the farthest point state), and FIGS. 34I to 34L show the aberrations in the close-up observation state of the optical system (in the farthest point state).

FIG. 35A shows the normal observation state of the optical system (in the farthest point state), FIG. 35B shows the middle observation state of the optical system (in the farthest point state), and FIG. 35C shows the close-up observation state of the optical system (in the farthest point state).

FIGS. 36A to 36L are aberration diagrams showing spherical aberration, astigmatism, distortion, and chromatic aberration of magnification in the optical system shown in FIGS. 35A-35C. To be specific, FIGS. 36A to 36D show the aberrations in the normal observation state of the optical system (in the farthest point state), FIGS. 36E to 36H show the aberrations in the middle observation state of the optical system (in the farthest point state), and FIGS. 36I to 36L show the aberrations in the close-up observation state of the optical system (in the farthest point state).

FIG. 37A is a view showing the normal observation state of the optical system (in the farthest point state), FIG. 37B shows the middle observation state of the optical system (in the farthest point state), and FIG. 37C shows the close-up observation state of the optical system (in the farthest point state).

FIGS. 38A to 38D show the aberrations in the normal observation state of the optical system (in the farthest point state), FIGS. 38E to 38H show the aberrations in the middle observation state of the optical system (in the farthest point state), and FIGS. 38I to 38L show the aberrations in the close-up observation state of the optical system (in the farthest point state).

FIG. 39A shows the normal observation state of the optical system (in the farthest point state), FIG. 39B shows the middle observation state of the optical system (in the farthest point state), and FIG. 39C shows the close-up observation state of the optical system (in the farthest point state).

FIGS. 40A to 40lL are aberration diagrams showing spherical aberration, astigmatism, distortion, and chromatic aberration of magnification in the optical system shown in FIGS. 39A-39C. To be specific, FIGS. 40A to 40D show the aberrations in the normal observation state of the optical system (in the farthest point state), FIGS. 40E to 40H show the aberrations in the middle observation state of the optical system (in the farthest point state), and FIGS. 40I to 40L show the aberrations in the close-up observation state of the optical system (in the farthest point state).

FIG. 41A shows the normal observation state of the optical system (in the farthest point state), FIG. 41B shows the middle observation state of the optical system (in the farthest point state), and FIG. 41C shows the close-up observation state of the optical system (in the farthest point state).

FIGS. 42A to 42D show the aberrations in the normal observation state of the optical system (in the farthest point state), FIGS. 42E to 42H show the aberrations in the middle observation state of the optical system (in the farthest point state), and FIGS. 42I to 42L show the aberrations in the close-up observation state of the optical system (in the farthest point state).

DESCRIPTION OF THE PREFERRED EMBODIMENTS

Figure 1A:
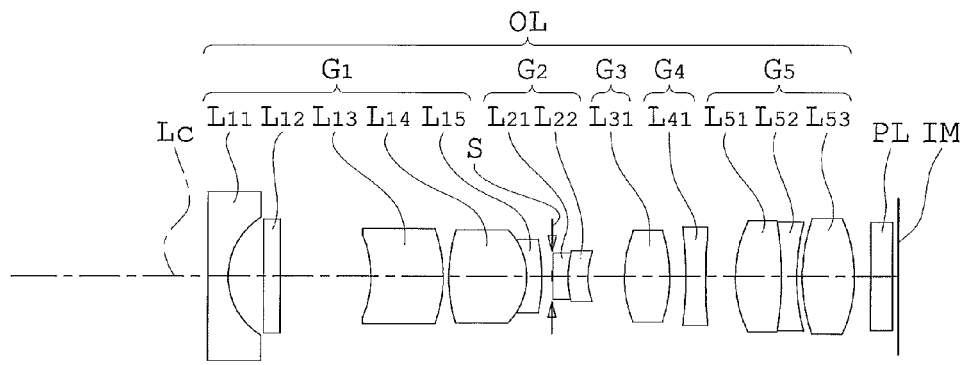
FIGS. 1A to 1C are sectional views taken along the optical axis for showing the configuration of the optical system provided for the observation apparatus according to Embodied Example 1, where

Prior to explanations about the Embodied Examples, operation effects in embodiments of the present invention will be explained. Besides, when the operation effects in the embodiments are specifically explained, the operation effects are to be explained while specific examples are being shown. However, the illustrated embodiments are insistently merely a part of embodiments included by the present invention as well as below-described Embodied Examples, and the embodiments included by the present invention include numerous variations. Accordingly, the present invention is not limited to the below-illustrated embodiments.

Besides, a state in which a magnification produced by a movable lens group mainly playing a role as a component changing magnification or a magnification-changing group has the minimum value is called "normal observation" state, a state in which a magnification produced by a movable lens group mainly playing a role as a component changing magnification or a magnification-changing group has the maximum value is is called "close-up observation" state, and a state in which a magnification produced by a movable lens group mainly playing a role as a component changing magnification or a magnification-changing group has a value between the normal observation state and the close-up observation state is called "middle observation" state, below. Also, a state in which a magnification produced by a movable lens group mainly playing a role as a component performing focusing or a focusing group has the minimum value is called "the farthest point" state, and a state in which a magnification produced by a movable lens group mainly playing a role as a component performing focusing or a focusing group has the maximum value is called "the nearest point" state, below.

An objective optical system of an embodiment according to the present invention is characterized in that: the objective optical system includes an immovable lens group which is arranged nearest to the object side, which is immovable in focusing, and which has negative power, and first and second movable lens groups at least one of which moves along the optical axis in focusing; and an amount of variation in magnification per movement of the first movable lens group is different from an amount of variation in magnification per movement of the second movable lens group.

As described above, in the objective optical system of the present embodiment, the immovable lens group immovable in focusing and having negative power is arranged nearest to the object side.

As a result, the objective optical system of the present embodiment has a structure which makes an angle of view wide and makes it easy to observe an object to be imaged while the objective optical system is close to the object to be imaged, or makes it easy to perform close-up observation.

Also, as described above, the objective optical system of the present embodiment is provided with two movable lens groups which differ from each other in amount of variation in magnification per movement of each of the lens groups.

Accordingly, in the objective optical system of the present embodiment, the movable lens group having a large amount of variation in magnification per its movement is mainly moved when a distance from the objective optical system to an object to be imaged varies widely, and the movable lens group having a small amount of variation in magnification per its movement is mainly moved when a distance from the objective optical system to the object to be imaged varies minutely. As a result, it is possible to reduce changes in observation magnification and in angle of view in focusing. As a result, the objective optical system of the present embodiment makes it possible to perform highly accurate focusing while variations in field curvature and in chromatic aberration of magnification are being checked.

Also, the objective optical system of the present embodiment may be formed in such a way that: the first movable lens group is arranged nearer to the object side than the second movable lens group is arranged; and an amount of variation in magnification per movement of the first movable lens group is larger than an amount of variation in magnification per movement of the second movable lens group.

In the case where the objective optical system of the present embodiment is formed in such a manner, it is hard for the normal observation state and the close-up observation state to widely differ from each other in difference amount occurring on an image-formation plane in performing focusing by the second movable lens group having a small amount of variation in magnification.

Also, the objective optical system of the present embodiment may be formed in such a way that: the first movable lens group is arranged nearer to the object side than the second movable lens group is arranged; and an amount of variation in magnification per movement of the first movable lens group is smaller than an amount of variation in magnification per movement of the second movable lens group.

In the case where the objective optical system of the present embodiment is formed in such a manner, or in the case where the first movable lens group having a small amount of variation in magnification is arranged at a position at which movement of the first movable lens group has a small influence on angle of view, it is hard for angle of view to vary in focusing. Also, a difference amount on the image-formation plane in performing focusing by the first movable lens group becomes large, so that it is possible to reduce a distance range in which the first movable lens group can move, and it is possible to downsize its focusing mechanism.

Also, an objective optical system of an embodiment according to the present invention, which can reversibly and continuously change its normal observation state into its close-up observation state by moving a predetermined lens group, is characterized in that: the objective optical system includes an immovable lens group which is arranged nearest to the object side, which is immovable in focusing and in the change from the normal observation state, and which has negative power, and first and second movable lens groups at least one of which moves along the optical axis in focusing; the first movable lens group is arranged nearer to the object side than the second movable lens group is arranged; an amount of variation in magnification per movement of the first movable lens group is smaller than an amount of variation in magnification per movement of the second movable lens group; and the change from the normal observation state is made by moving the second movable lens group.

As described above, in the optical objective system of the present embodiment, the immovable lens group immovable in focusing and having negative power is arranged nearest to the object side.

As a result, the objective optical system of the present embodiment brings a wide angle of view and makes it easy to observe an object to be imaged while the objective optical system is being focused on the object to be imaged, or makes it easy to perform close-up observation.

Also, as described above, in the objective optical system of the present embodiment, a change from the normal observation state to the close-up observation state is continuously made by moving the second movable lens group with a large amount of variation in magnification per its movement. And, focusing is performed not only by the second movable lens group but also by the first movable lens group with a small amount of variation in magnification per its movement in the change from the normal observation state to the close-up observation state.

As a result, even though a focal depth becomes shallow because the objective optical system is in the close-up observation state as a result of movement of the second movable lens group, it is possible to perform focusing by the first movable lens group which causes small variations in observation magnification and in angle of view, and the objective optical system of the present embodiment makes it easy to perform highly accurate focusing while variations in field curvature and in chromatic aberration of magnification are being checked.

Also, it is preferred that the objective optical system of the present embodiment satisfies the following condition (1):

$$3 < (m_{c\text{-}d}/m_{u\text{-}d})/(m_{c\text{-}n}/m_{c\text{-}d}) < 10 \qquad (1)$$

where, $m_{c\text{-}d}$ denotes transverse magnification of the whole of the system in the farthest point state and in the close-up observation state, $m_{u\text{-}d}$ a denotes transverse magnification of the whole of the system in the farthest point state and in the normal observation state, $m_{c-n}$ denotes transverse magnification of the whole of the system in the nearest point state and in the close-up observation state, $m_{c-n}/m_{c-d}$ denotes an amount of variation in magnification of the first movable lens group, and $m_{c-d}/m_{u-d}$ denotes an amount of variation in magnification of the second movable lens group.

If $(m_{c-d}/m_{u-d})/(m_{c-n}/m_{c-d})$ is below the lower limit of the condition (1), an amount of variation in magnification caused by the first movable lens group is large, so that its focusing function easily deteriorates. On the other hand, if $(m_{c-d}/m_{u-d})/(m_{c-n}/m_{c-d})$ is beyond the upper limit of the condition (1), an amount of variation in magnification caused by the second movable lens group is large, so that the usability of the system in observing an object to be imaged easily deteriorates.

Besides, it is more preferred that the objective optical system of the present embodiment satisfies one of the following conditions (1-1) and (1-2) instead of the condition (1):

$$3.8 < (m_{c-d}/m_{u-d})/(m_{c-n}/m_{c-d}) < 10 \quad (1\text{-}1)$$

$$4.4 < (m_{c-d}/m_{u-d})/(m_{c-n}/m_{c-d}) < 7.7 \quad (1\text{-}2)$$

Also, the upper limit of the condition (1-1) may be used as the upper limit of the condition (1) or (1-2), or the lower limit of the condition (1-1) may be used as the lower limit of the condition (1) or (1-2). Also, the upper limit of the condition (1-2) may be used as the upper limit of the condition (1) or (1-1), or the lower limit of the condition (1-2) may be used as the lower limit of the condition (1) or (1-1).

Also, it is preferred that the objective optical system of the present embodiment satisfies the following condition (2):

$$1 < m_{c-n}/m_{c-d} < 1.55 \quad (2)$$

where, $m_{c-n}$ denotes transverse magnification of the whole of the system in the nearest point state and in the close-up observation state, $m_{c-d}$ denotes transverse magnification of the whole of the system in the farthest point state and in the close-up observation state, and $m_{c-n}/m_{c-d}$ denotes an amount of variation in magnification of the first movable lens group.

If $m_{c-n}/m_{c-d}$ is beyond the upper limit of the condition (2), variations in magnification in focusing are large, so that the usability of the system in observing an object to be imaged easily deteriorates.

Besides, it is more preferred that the objective optical system satisfies one of the following conditions (2-1) and (2-2) instead of the condition (2):

$$1 < m_{c-n}/m_{c-d} < 1.45 \quad (2\text{-}1)$$

$$1 < m_{c-n}/m_{c-d} < 1.35 \quad (2\text{-}2)$$

Also, it is preferred that: the objective optical system of the present embodiment includes a lens group which is located nearer than the image side than the first movable lens group is located; and the objective optical system satisfies the following condition (3):

$$0.2 < |(1-\beta_1 \cdot \beta_1) \times \beta_1' \cdot \beta_1'| < 3 \quad (3)$$

where, $\beta_1$ denotes transverse magnification of the first movable lens group and $\beta_1'$ denotes transverse magnification of the lens group which is located nearer to the image side than the first movable lens group is.

If $|(1-\beta_1 \cdot \beta_1) \times \beta_1' \cdot \beta_1'|$ is below the lower limit of the condition (3), an amount of the first movable lens group moving in focusing is large, so that the whole of the optical system easily has a large size. On the other hand, if $|(1-\beta_1 \cdot \beta_1) \times \beta_1' \cdot \beta_1'|$ is beyond the upper limit of the condition (3), field curvature easily varies large.

Besides, it is more preferred that the objective optical system satisfies one of the following conditions (3-1) and (3-2) instead of the condition (3):

$$0.3 < |(1-\beta_1 \cdot \beta_1) \times \beta_1' \cdot \beta_1'| < 3 \quad (3\text{-}1)$$

$$0.5 < |(1-\beta_1 \cdot \beta_1) \times \beta_1' \cdot \beta_1'| < 2.5 \quad (3\text{-}2)$$

Also, the upper limit of the condition (3-1) may be used as the upper limit of the condition (3) or (3-2), or the lower limit of the condition (3-1) may be used as the lower limit of the condition (3) or (3-2). Also, the upper limit of the condition (3-2) may be used as the upper limit of the condition (3) or (3-1), or the lower limit of the condition (3-2) may be used as the lower limit of the condition (3) or (3-1).

Also, it is preferred that the objective optical system of the present embodiment satisfies the following condition (4):

$$2 < |F_1/F_{c-d}| < 8 \quad (4)$$

where, $F_1$ denotes focal length of the first movable lens group and $F_{c-d}$ denotes focal length of the whole of the optical system in the farthest point state and in the close-up observation state.

If $|F_1/F_{c-d}|$ is below the lower limit of the condition (4), power of the first movable lens group is strong, so that field curvature easily varies large in focusing and resolution is easily deteriorates. On the other hand, if $|F_1/F_{c-d}|$ is beyond the upper limit of the condition (4), power of the first movable lens group is weak, so that a moving distance necessary in focusing easily becomes large and the whole of the optical system easily has a large size.

Besides, it is more preferred that the objective optical system of the present embodiment satisfies one of the following conditions (4-1) and (4-2) instead of the condition (4):

$$3 < |F_1/F_{c-d}| < 7 \quad (4\text{-}1)$$

$$3.2 < |F_1/F_{c-d}| < 6 \quad (4\text{-}2)$$

Also, the upper limit of the condition (4-1) may be used as the upper limit of the condition (4) or (4-2), or the lower limit of the condition (4-1) may be used as the lower limit of the condition (4) or (4-2). Also, the upper limit of the condition (4-2) may be used as the upper limit of the condition (4) or (4-1), or the lower limit of the condition (4-2) may be used as the lower limit of the condition (4) or (4-1).

Also, it is preferred that the objective optical system of the present embodiment satisfies the following condition (5):

$$1.8 < |F_2/F_{c-d}| < 5 \quad (5)$$

where, $F_2$ denotes focal length of the second movable lens group and $F_{c-d}$ denotes focal length of the whole of the optical system in the farthest point state and in the close-up observation state.

If $|F_2/F_{c-d}|$ is below the lower limit of the condition (5), power of the second movable lens group is weak, a moving distance necessary in changing magnification or in focusing easily becomes large and the whole of the optical system easily has a large size. On the other hand, if $|F_2/F_{c-d}|$ is beyond the upper limit of the condition (5), power of the second movable lens group is strong, so that chromatic aberration of magnification or field curvature easily deteriorates.

Besides, it is more preferred that the objective optical system of the present embodiment satisfies one of the following conditions (5-1) and (5-2) instead of the condition (5):

$$1.8 < |F_2/F_{c-d}| < 4.5 \quad (5\text{-}1)$$

$$2 < |F_2/F_{c-d}| < 4 \quad (5\text{-}2)$$

Also, the upper limit of the condition (5-1) may be used as the upper limit of the condition (5) or (5-2), or the lower limit of the condition (5-1) may be used as the lower limit of the condition (5) or (5-2). Also, the upper limit of the condition (5-2) may be used as the upper limit of the condition (5) or (5-1), or the lower limit of the condition (5-2) may be used as the lower limit of the condition (5) or (5-1).

Also, it is preferred that the objective optical system of the present embodiment satisfies the following condition (6):

$$0.02 < D_1/L < 0.12 \qquad (6)$$

where, $D_1$ denotes the sum of an air distance from a lens group located on the object side of the first movable lens group to the first movable lens group and an air distance from the first movable lens group to a lens group located on the image side of the first movable lens group, and L denotes the total length of the whole of the optical system.

If $D_1/L$ is below the lower limit of the condition (6), a necessary space in focusing by the first movable lens group is difficult to secure, so that the first movable lens group has to be made to have strong power, and various aberrations easily deteriorate. On the other hand, if $D_1/L$ is beyond the upper limit of the condition (6), a distance which the first movable lens group covers in focusing is large, so that the whole of the optical system easily has a large size.

Besides, it is more preferred that the objective optical system of the present embodiment satisfies one of the following conditions (6-1) and (6-2) instead of the condition (6):

$$0.03 < D_1/L < 0.11 \qquad (6-1)$$

$$0.04 < D_1/L < 0.10 \qquad (6-2)$$

Also, the upper limit of the condition (6-1) may be used as the upper limit of the condition (6) or (6-2), or the lower limit of the condition (6-1) may be used as the lower limit of the condition (6) or (6-2). Also, the upper limit of the condition (6-2) may be used as the upper limit of the condition (6) or (6-1), or the lower limit of the condition (6-2) may be used as the lower limit of the condition (6) or (6-1).

Also, it is preferred that the objective optical system of the present embodiment satisfies the following condition (7):

$$|DT_{c-n} - DT_{c-d}| < 5 \qquad (7)$$

where, $DT_{c-n}$ denotes distortion at image height ratio of 1.0 in the nearest point state and in the close-up observation state and $DT_{c-d}$ denotes distortion at an image height ratio of 1.0 in the farthest point state and in the close-up observation state.

If $|DT_{c-n} - DT_{c-d}|$ is beyond the upper limit of the condition (7), distortion in focusing by the first movable lens group easily varies large.

Besides, it is more preferred that the objective optical system satisfies one of the following conditions (7-1) and (7-2) instead of the condition (7):

$$|DT_{c-n} - DT_{c-d}| < 4 \qquad (7-1)$$

$$|DT_{c-n} - DT_{c-d}| < 2 \qquad (7-2)$$

Also, it is preferred that the objective optical system of the present embodiment satisfies the following condition (8):

$$DT_{u-d} < -50 \qquad (8)$$

where, $DT_{u-d}$ denotes distortion at an image height ratio of 1.0 in the farthest point state and in the normal observation state.

If $DT_{u-d}$ is beyond the upper limit of the condition (8), it becomes difficult to observe a wide area and the usability of the system easily deteriorates. In addition, an amount of light incident on the edge portions of its lenses decreases, so that the edge potion of an acquired image easily became dark.

Also, it is preferred that the objective optical system of the present embodiment satisfies the following condition (9):

$$Fno_u/Fno_c > 0.94 \qquad (9)$$

where, $Fno_u$ denotes the F number of the whole of the optical system in the normal observation state and $Fno_c$ denotes the F number of the whole of the optical system in the close-up observation state.

Such a constitution of the optical system of the present embodiment makes it easy to secure a sufficient focal depth in each of variation-in-magnification states in a range from the normal observation state to the close-up observation state even though the objective optical system is used in combination with image-pickup elements each having a large number of pixels. It is because the F number in the normal observation state is approximately equal to the F number in the close-up observation state, so that there is no necessity that the F number in the normal observation state is reduced more than necessary even though the F number in the close-up observation state is reduced so as not to be affected by diffraction.

Besides, if $Fno_u/Fno_c$ is below the lower limit of the condition (9), the F number in the normal observation state easily becomes small more than necessary when the F number in the close-up observation state is reduced up to diffraction limit.

Also, it is preferred that: the objective optical system of the present embodiment consists of five lens groups; the second lens group from the object side of the five lens groups is the first movable lens group; and the fourth lens group from the object side of the five lens groups is the second movable lens group.

Such a constitution of the optical system of the present embodiment makes it easy to perform highly accurate focusing while variations in field curvature and in chromatic aberration of magnification are small with respect to particular objects to be imaged. Particularly, the objective optical system having this constitution is very suitable to be used as an objective optical system for endoscopes or the like.

Also, an observation apparatus of an embodiment according to the present invention is characterized in that the observation apparatus is provided with one of the above-described objective optical systems and an autofocus mechanism for moving the first movable lens group.

Besides, for example, the autofocus mechanism is composed of: a drive mechanism which moves the first movable lens group along the optical axis; and a control means which controls the drive mechanism on the basis of predetermined information (information on images formed on an image pickup element in the case where the image pickup element like CCD is arranged on the image side of the objective optical system, information on a distance between the top of the objective optical system and an object to be observed, and so on).

Also, an objective optical system of an embodiment according to the present invention, which can reversibly and continuously change its normal observation state into its close-up observation state by moving a predetermined lens group to change magnification, is characterized in that: the objective optical system includes an immovable lens group which is arranged nearest to the object side and which is immovable in changing magnification and in focusing, a magnification-changing group which moves along the optical axis at least in changing magnification, and a focusing group which moves along the optical axis at least in focusing; the immovable lens group includes a lens having negative power, the lens with negative power being located nearest to the object side; the magnification-changing group is arranged nearer to the object side than the focusing group is arranged;

an amount of variation in magnification per movement of the magnification-changing group is larger than an amount of variation in magnification per movement of the focusing group; and a change in magnification is made by moving the magnification-changing group.

As described above, in the optical objective system of the present embodiment, the immovable lens group immovable in focusing is arranged nearest to the object side. And, the immovable lens group includes the lens which is arranged nearest to the object side and which has negative power.

As a result, in the objective optical system of the present embodiment, an angle of view is wide and it is easy to observe an object to be imaged while the optical system is being focused on the object, that is to say, it is easy to perform close-up observation.

Also, as described above, in the objective optical system of the present embodiment, the normal observation state is changed into the close-up observation state to continuously change magnification by moving the magnification-changing group with a large amount of variation in magnification per its movement. And, focusing is performed not only by the magnification-changing group but also by the focusing group with a small amount of variation in magnification per its movement in the change from the normal observation state to the close-up observation state.

As a result, even though the objective optical system is made to reach the close-up observation state with a shallow focal depth by moving the magnification-changing group, it is possible to perform highly accurate focusing while variations in field curvature and in chromatic aberration of magnification are being checked with a small degree of variations in field curvature and in chromatic aberration of magnification, by performing focusing by the focusing group the movement of which brings small variations in observation magnification and in angle of view. In addition, variations in observation images in focusing can be checked in the objective optical system of the present embodiment, so that it is possible to suppress eyestrain suffered by observers.

Also, it is preferred that the objective optical system of the present embodiment satisfies the following condition (10):

$$3 < (m_{c-d}/m_{u-d})/(m_{c-n}/m_{c-d}) < 11 \quad (10)$$

where, $m_{c-d}$ denotes transverse magnification of the whole of the system in the close-up observation state (in the farthest point state), $m_{u-d}$ a denotes transverse magnification of the whole of the system in the normal observation state (in the farthest point state), and $m_{c-n}$ denotes transverse magnification of the whole of the system in the close-up observation state (in the nearest point state).

Such a constitution of objective optical system satisfying the condition (10) makes it possible to reduce variations in field curvature and in chromatic aberration of magnification in changing magnification and in focusing, so that variations in the edge portions of observation images can be checked, the usability of the optical system in observing an object to be imaged becomes good, and it is easy to suppress eyestrain suffered by observers. If $(m_{c-d}/m_{u-d})/(m_{c-d}/m_{c-d})$ is below the lower limit of the condition (10), an amount of variation in magnification is large, so that it is difficult to make its focusing function good. On the other hand, if $(m_{c-d}/m_{u-d})/(m_{c-n}/m_{c-d})$ is beyond the upper limit of the condition (10), it is difficult to reduce variation in field curvature in focusing.

Besides, it is more preferred that the objective optical system of the present embodiment satisfies one of the following conditions (10-1) and (10-2) instead of the condition (10):

$$3.1 < (m_{c-d}/m_{u-d})/(m_{c-n}/m_{c-d}) < 10.5 \quad (10\text{-}1)$$

$$3.2 < (m_{c-d}/m_{u-d})/(m_{c-n}/m_{c-d}) < 9 \quad (10\text{-}2)$$

Also, the lower limit of the condition (10-1) may be used as the lower limit of the condition (10-2). Also, the lower limit of the condition (10-2) may be used as the lower limit of the condition (10) or (10-1), or the upper limit of the condition (10-2) may be used as the upper limit of the condition (10) or (10-1).

Also, it is preferred that the objective optical system of the present embodiment satisfies the following condition (11) when the focusing group moves in such a way an image plane moves by ± (F number×0.005) mm in a region from the farthest point to the nearest point in the close-up observation state:

$$|\Delta DT_f| < 2 \quad (11)$$

where, $\Delta DT_f$ denotes variation in distortion when the focusing group moves.

If $|\Delta DT_f|$ is beyond the upper limit of the condition (11), a variation in distortion becomes large even though an image plane moves minutely (or by (F number×0.005) mm) That is to say, an observation image varies violently in observing an object to be imaged, so that fatigue suffered by observers easily become large.

Besides, it is more preferred that the objective optical system of the present embodiment satisfies one of the following conditions (11-1) and (11-2) instead of the condition (11):

$$|\Delta DT_f| < 1.8 \quad (11\text{-}1)$$

$$|\Delta DT_f| < 1.5 \quad (11\text{-}2)$$

Also, it is preferred that: the objective optical system of the present embodiment includes a lens group which is located nearer than the image side than the focusing group is located; and the objective optical system satisfies the following condition (12):

$$0.2 < |(1-\beta_f \beta_f) \times \beta_f' \cdot \beta_f'| < 0.9 \quad (12)$$

where, $\beta_f$ denotes transverse magnification of the focusing group in the close-up observation state (in the farthest point state), and $\beta_f'$ denotes transverse magnification of the lens group which is located nearer to the image side than the focusing group is, in the close-up observation state (in the farthest point state).

Also, in the objective optical system of the present embodiment, it is preferred that: the focusing group is arranged nearest to the image side; and the objective optical system satisfies the following condition (12)':

$$0.2 < (1-\beta_f \beta_f) < 0.9 \quad (12)'$$

where, $\beta_f$ denotes transverse magnification of the focusing group in the close-up observation state and in the farthest point state.

If $|(1-\beta_f \beta_f) \times \beta_f' \cdot \beta_f'|$ is below the lower limit of the condition (12) or $(1-\beta_f \beta_f)$ is below the lower limit of the condition (12)', an amount of the focusing group moving in focusing is large, so that it is difficult to downsize the whole of the optical system. On the other hand, if $|(1-\beta_f \beta_f) \times \beta_f' \cdot \beta_f'|$ is beyond the upper limit of the condition (12) or $(1-\beta_f \beta_f)$ is beyond the upper limit of the condition (12)', it is difficult to reduce a variation in field curvature in focusing.

Besides, it is more preferred that the objective optical system of the present embodiment satisfies one of the following conditions (12-1) and (12-2) instead of the condition (12):

$$0.3 < |(1-\beta_f \beta_f) \times \beta_f' \cdot \beta_f'| < 0.8 \quad (12\text{-}1)$$

$$0.3 < |(1-\beta_f \beta_f) \times \beta_f' \cdot \beta_f'| < 0.7 \quad (12\text{-}2)$$

Also, the lower limit of the condition (12-1) may be used as the lower limit of the condition (12) or (12-2), or the upper limit of the condition (12-1) may be used as the upper limit of the condition (12) or (12-2). Also, the upper limit of the condition (12-2) may be used as the upper limit of the condition (12).

Also, it is more preferred that the objective optical system of the present embodiment satisfies one of the following conditions (12-1)' and (12-2)' instead of the condition (12)':

$$0.3 < (1-\beta_f/\beta_f) < 0.8 \quad (12\text{-}1)'$$

$$0.3 < (1-\beta_f/\beta_f) < 0.7 \quad (12\text{-}2)'$$

Also, the lower limit of the condition (12-1)' may be used as the lower limit of the condition (12)' or (12-2)' or the upper limit of the condition (12-1)' may be used as the upper limit of the condition (12)' or (12-2)'. Also, the upper limit of the condition (12-2)' may be used as the upper limit of the condition (12)'.

Also, it is preferred that the objective optical system of the present embodiment satisfies the following condition (13):

$$1 < |m_{c\text{-}n}/m_{c\text{-}d}| < 2 \quad (13)$$

where, $m_{c\text{-}n}$ denotes transverse magnification of the whole of the system in the close-up observation state (in the nearest point state), and $m_{c\text{-}d}$ denotes transverse magnification of the whole of the system in the close-up observation state (in the farthest point state).

If $|m_{c\text{-}n}/m_{c\text{-}d}|$ is below the lower limit of the condition (13), the objective optical system does not play a role as an optical system. On the other hand, if $|m_{c\text{-}n}/m_{c\text{-}d}|$ is beyond the upper limit of the condition (13), variation in magnification in focusing is large, so that it is difficult to make its focus function good.

Besides, it is more preferred that the objective optical system satisfies one of the following conditions (13-1) and (13-2) instead of the condition (13):

$$1 < |m_{c\text{-}n}/m_{c\text{-}d}| < 1.85 \quad (13\text{-}1)$$

$$1 < |m_{c\text{-}n}/m_{c\text{-}d}| < 1.65 \quad (13\text{-}2)$$

Also, it is preferred that the objective optical system of the present embodiment satisfies the following condition (14):

$$0.7 < |F_f/F_v| < 8 \quad (14)$$

where, $F_f$ denotes focal length of the focusing group and $F_v$ denotes focal length of the magnification-changing group.

If $|F_f/F_v|$ is below the lower limit of the condition (14), variation in field curvature in focusing is large, so that it is difficult to make its image-forming function good. On the other hand, if $|F_f/F_v|$ is beyond the upper limit of the condition (14), variation in distortion in focusing is large, so that it is difficult to make its focusing function good.

Besides, it is more preferred that the objective optical system of the present embodiment satisfies one of the following conditions (14-1) and (14-2) instead of the condition (14):

$$1.65 < |F_f/F_v| < 8 \quad (14\text{-}1)$$

$$2 < |F_f/F_v| < 8 \quad (14\text{-}2)$$

Also, it is preferred that the objective optical system of the present embodiment satisfies the following condition (15):

$$|\gamma| < 11.5 \quad (15)$$

where, $\gamma$ denotes an angle between: a principal ray of light emitting from the lens nearest to the image side in the focusing group and forming an image of an image height ratio of 1.0; and the optical axis in the close-up observation state (in the nearest point state).

If $|\gamma|$ is beyond the upper limit of the condition (15), variation in field curvature in focusing is large, so that it is difficult to make its focusing function good.

Besides, it is more preferred that the objective optical system of the present embodiment satisfies one of the following conditions (15-1) and (15-2) instead of the condition (15):

$$|\gamma| < 10 \quad (15\text{-}1)$$

$$|\gamma| < 9.2 \quad (15\text{-}2)$$

Also, it is preferred that the objective optical system of the present embodiment satisfies the following condition (16):

$$|DT_{c\text{-}n} - DT_{c\text{-}d}| < 5 \quad (16)$$

where, $DT_{c\text{-}n}$ denotes distortion of an image with an image height ratio of 1.0 in the close-up observation state (in the nearest point state) and $DT_{c\text{-}d}$ denotes distortion of an image with an image height ratio of 1.0 in the close-up observation state (in the farthest point state).

If $|DT_{c\text{-}n} - DT_{c\text{-}d}|$ is beyond the upper limit of the condition (16), distortion in focusing varies large, so that the edge portion of an observation image easily distorts.

Besides, it is more preferred that the objective optical system of the present embodiment satisfies one of the following conditions (16-1) and (16-2) instead of the condition (16):

$$|DT_{c\text{-}n} - DT_{c\text{-}d}| < 4 \quad (16\text{-}1)$$

$$|DT_{c\text{-}n} - DT_{c\text{-}d}| < 3 \quad (16\text{-}2)$$

Also, it is preferred that the objective optical system of the present embodiment satisfies the following condition (17):

$$DT_{135} < -50 \quad (17)$$

where, $DT_{135}$ denotes distortion at an angle of view of 135 degrees.

If $DT_{135}$ is beyond the upper limit of the condition (17), it is difficult to improve a resolution in the vicinity of the middle of an observation image, and it is difficult to observe a wide area. In addition, an amount of light on its edge portion decreases, so that the edge portion of the acquired image easily becomes dark.

Also, it is preferred that the magnification-changing group and/or the focusing group consists of a single lens component in the objective optical system of the present embodiment.

When the objective optical system of the present embodiment is formed in such a manner, the structure of the objective optical system can be easily simplified. In addition, it is easy to simplify control of its mechanisms. Besides, in this case, the above single lens components constituting magnification-changing groups or focusing groups include cemented lenses.

Also, it is preferred that: the objective optical system of the present embodiment is provided with a stop: and the focusing group is arranged nearer to the image side than the stop is arranged.

When the objective optical system of the present embodiment is formed in such a manner, it is easy to check a change in an observation image due to the movement of the focusing group. In addition, variation in distortion can be reduced, so that it is easy to check a change in angle of view.

Also, it is preferred that the objective optical system of the present embodiment satisfies the following condition (18):

$$2 < |F_f/F_{c\text{-}d}| < 15 \quad (18)$$

where, $F_f$ denotes focal length of the focusing group and $F_{c\text{-}d}$ denotes focal length of the whole of the optical system in the close-up observation state (in the farthest point state).

If $|F_f/F_{c\text{-}d}|$ is below the lower limit of the condition (18), power of the focusing group is strong and chromatic aberration of magnification or field curvature easily varies large in focusing, so that it is difficult to make its image-forming function good. On the other hand, if $|F_f/F_{c-d}|$ is beyond the upper limit of the condition (18), power of the focusing group is weak, a moving distance necessary to move the focusing group in focusing easily becomes large, so that it is difficult to downsize the whole of the optical system.

Besides, it is more preferred that the objective optical system satisfies one of the following conditions (18-1) and (18-2) instead of the condition (18):

$$3<|F_f/F_{c-d}|<15 \tag{18-1}$$

$$4<|F_f/F_{c-d}|<14 \tag{18-2}$$

Also, the lower limit of the condition (18-1) may be used as the lower limit of the condition (18-2). Also, the lower limit of the condition (18-2) may be used as the lower limit of the condition (18) or (18-1), or the upper limit of the condition (18-2) may be used as the upper limit of the condition (18) or (18-1).

Also, it is preferred that the objective optical system of the present embodiment satisfies the following condition (19):

$$0.83<Fno_u/Fno_c \tag{19}$$

where, $Fno_u$ denotes the F number of the whole of the optical system in the normal observation state (in the farthest point state) and $Fno_c$ denotes the F number of the whole of the optical system in the close-up observation state (in the farthest point state).

Such a constitution of the optical system of the present embodiment makes it easy to secure a sufficient focal depth in each of variation-in-magnification states in a range from the normal observation state to the close-up observation state even though the objective optical system is used in combination with image-pickup elements each having a large number of pixels. It is because the F number in the normal observation state is approximately equal to the F number in the close-up observation state, so that there is no necessity that the F number in the normal observation state is reduced more than necessary even though the F number in the close-up observation state is reduced so as not to be affected by diffraction.

Besides, if $Fno_u/Fno_c$ is below the lower limit of the condition (19), the F number in the normal observation state easily becomes small more than necessary when the F number in the close-up observation state is reduced up to diffraction limit.

Also, it is preferred that: the objective optical system of the present embodiment consists of five lens groups; the second lens group from the object side of the five lens groups is the magnification-changing group; and the fourth lens group from the object side of the five lens groups is the focusing group.

Such a constitution of the optical system of the present embodiment makes it easy to perform highly accurate focusing while variations in field curvature and in chromatic aberration of magnification are small with respect to particular objects to be imaged. Particularly, the objective optical system having this constitution is very suitable to be used as an objective optical system for endoscopes or the like.

Also, an observation apparatus of an embodiment according to the present invention is characterized in that the observation apparatus is provided with one of the above-described objective optical systems and an autofocus mechanism for moving the focusing group.

Besides, for example, the autofocus mechanism is composed of: a drive mechanism which moves the focusing group along the optical axis; and a control means which controls the drive mechanism on the basis of predetermined information (information on images formed on an image pickup element in the case where the image pickup element like CCD is arranged on the image side of the objective optical system, information on a distance between the top of the objective optical system and an object to be observed, and so on).

Embodied Examples according to the embodiments of the objective optical systems of the present invention respectively are explained while reference to the drawings is being made, below.

Besides, subscript numbers given to $r_1$, $r_2$, . . . and $d_1$, $d_2$, . . . in the sectional views along the optical axes of the respective optical systems correspond to surface numbers 1, 2, . . . in numerical data, respectively.

Also, in the numerical data, s denotes surface number, r denotes radius of curvature of is each surface, d denotes surface distance, nd denotes refractive index at the d line, and vd denotes Abbe's number at the d line.

Embodied Example 1

An observation apparatus provided with an objective optical system according to Embodied Example 1 is explained in detail using FIGS. 1A-1C, below.

Figure 1B:
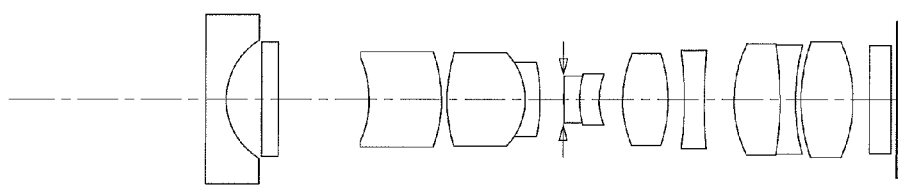
Figure 1C:
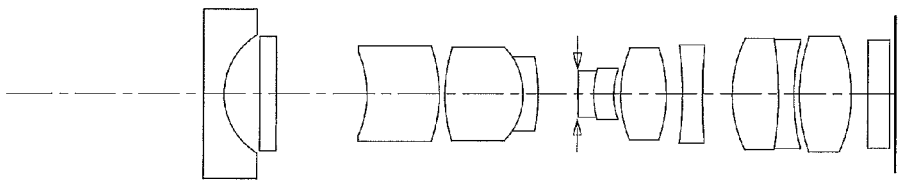

FIGS. 1A to 1C are sectional views taken along the optical axis for showing the configuration of the optical system provided for this observation apparatus, where FIG. 1A shows the normal observation state of the optical system (in the farthest point state), FIG. 1B shows the middle state of the optical system (in the farthest point state), and FIG. 1C shows the close-up observation state of the optical system (the farthest point state).

As shown in FIGS. 1A-1C, this observation apparatus includes: an optical system which includes an objective optical system OL and a plano lens PL arranged on the image side of the objective optical system OL and substantially having no refractive power; an aperture stop S arranged in the objective optical system OL; and an image pickup element like CCD for which only its image plane IM is shown in FIGS. 1A-1C. All of these components are arranged on the optical axis Lc.

The objective optical system OL is composed of a first lens group $G_1$ having positive power, a second lens group $G_2$ having negative power and being movable along the optical axis, a third lens group $G_3$ having positive power, a fourth lens group $G_4$ having negative power and being movable along the optical axis, and a fifth lens group $G_5$ having positive power, these lens groups being arranged in that order from the object side. The aperture stop S is arranged between the first lens group $G_1$ and the second lens group $G_2$ in such a way that the aperture stop S moves integrally with the second lens group $G_2$.

The first lens group $G_1$ is composed of: a lens $L_{11}$ that is a plano-concave lens having negative power with the concave surface thereof facing the image side; a lens $L_{12}$ that is a plano lens; a lens $L_{13}$ that is a meniscus lens having negative power with the convex surface thereof facing the image side; a lens $L_{14}$ that is a biconvex lens having positive power; and a lens $L_{15}$ that is a meniscus lens having negative power with the convex surface thereof facing the image side, these lenses being arranged in that order from the object side. The lens $L_{14}$ and the lens $L_{15}$ are joined to each other.

The second lens group $G_2$ is composed of: a lens $L_{21}$ that is a plano-concave lens having negative power with the concave surface thereof facing the image side; and a lens $L_{22}$ that is a meniscus lens having negative power with the concave surface thereof facing the image side, these lenses being arranged in that order from the object side. The lens $L_{21}$ and the lens $L_{22}$ are joined to each other.

The third lens group $G_3$ is composed of a lens $L_{31}$ that is a biconvex lens having positive power.

The fourth lens group $G_4$ is composed of a lens $L_{41}$ that is a biconcave lens having negative power.

The fifth lens group $G_5$ is composed of: a lens $L_{51}$ that is a biconvex lens having positive power; a lens $L_{52}$ that is a biconcave lens having negative power; and a lens $L_{53}$ that is a biconvex lens having positive power, these lenses being arranged in that order from the object side. The lens $L_{51}$ and the lens $L_{52}$ are joined to each other.

An amount of variation in magnification per movement of the fourth lens group $G_4$ is smaller than an amount of variation in magnification per movement of the second lens group $G_2$ in this objective optical system OL.

This observation apparatus is formed in such a way that movement of the second lens group $G_2$ along the optical axis can change the observation state of the objective optical system reversibly and continuously: from the normal observation state in which a plurality of objects to be imaged exist in an observation area; to the close-up observation state in which the objective optical system is closed to a particular object optionally selected from these objects to be imaged by an observer so as to observe the particular object in detail.

In addition, this observation apparatus is formed in such a way that accurate focusing can be performed in every observation state of the objective optical system by moving not only the second lens group $G_2$ but also the fourth lens group $G_4$ along the optical axis.

Embodied Example 2

An observation apparatus provided with an objective optical system according to Embodied Example 2 is explained in detail using FIGS. 2A-2C, below.

Figure 2A:
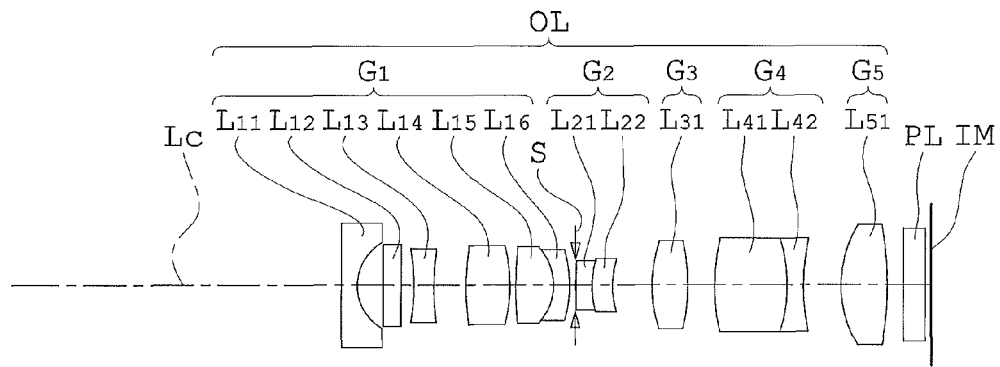
FIGS. 2A to 2C are sectional views taken along the optical axis for showing the configuration of the optical system provided for the observation apparatus according to Embodied Example 2, where
Figure 2B:
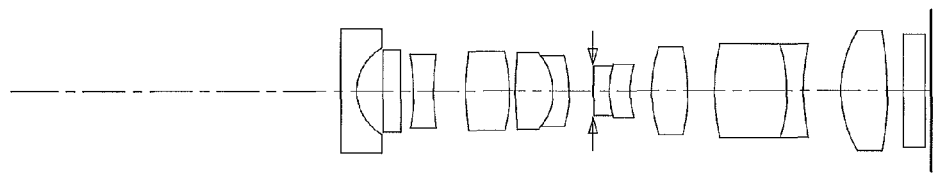
Figure 2C:
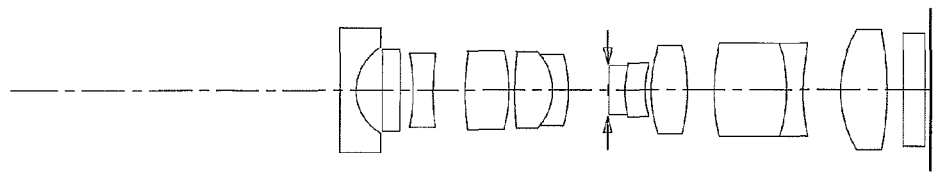

FIGS. 2A to 2C are sectional views taken along the optical axis for showing the configuration of the optical system provided for this observation apparatus, where FIG. 2A shows the normal observation state of the optical system (in the farthest point state), FIG. 2B shows the middle state of the optical system (in the farthest point state), and FIG. 2C shows the close-up observation state of the optical system (in the farthest point state).

As shown in FIGS. 2A-2C, this observation apparatus includes: an optical system which includes an objective optical system OL and a plano lens PL arranged on the image side of the objective optical system OL and substantially having no refractive power; an aperture stop S arranged in the objective optical system OL; and an image pickup element like CCD for which only its image plane IM is shown in FIG. 2A-2C. All of these components are arranged on the optical axis Lc.

The objective optical system OL is composed of a first lens group $G_1$ having positive power, a second lens group $G_2$ having negative power and being movable along the optical axis, a third lens group $G_3$ having positive power, a fourth lens group $G_4$ having negative power and being movable along the optical axis, and a fifth lens group $G_5$ having positive power, these lens groups being arranged in that order from the object side. The aperture stop S is arranged between the first lens group $G_1$ and the second lens group $G_2$ in such a way that the aperture stop S moves integrally with the second lens group $G_2$.

The first lens group $G_1$ is composed of: a lens $L_{11}$ that is a plano-concave lens having negative power with the concave surface thereof facing the image side; a lens $L_{12}$ that is a plano lens; a lens $L_{13}$ that is a biconcave lens having negative power; a lens $L_{14}$ that is a biconvex lens having positive power; a lens $L_{15}$ that is a biconvex lens having positive power; and a lens $L_{16}$ that is a meniscus lens having negative power with the convex surface thereof facing the image side, these lenses being arranged in that order from the object side. The lens $L_{15}$ and the lens $L_{16}$ are joined to each other.

The second lens group $G_2$ is composed of: a lens $L_{21}$ that is a plano-concave lens having negative power with the concave surface thereof facing the image side; and a lens $L_{22}$ that is a meniscus lens having negative power with the concave surface thereof facing the image side, these lenses being arranged in that order from the object side. The lens $L_{21}$ and the lens $L_{22}$ are joined to each other.

The third lens group $G_3$ is composed of a lens $L_{31}$ that is a biconvex lens having positive power.

The fourth lens group $G_4$ is composed of: a lens $L_{41}$ that is a biconvex lens having positive power; and a lens $L_{42}$ that is a biconcave lens having negative power, these lenses being arranged in that order from the object side. The lens $L_{41}$ and the lens $L_{42}$ are joined to each other.

The fifth lens group $G_5$ is composed of a lens $L_{51}$ that is a biconvex lens having positive power.

An amount of variation in magnification per movement of the fourth lens group $G_4$ is smaller than an amount of variation in magnification per movement of the second lens group $G_2$ in this objective optical system OL.

This observation apparatus is formed in such a way that movement of the second lens group $G_2$ along the optical axis can change the observation state of the objective optical system reversibly and continuously: from the normal observation state in which a plurality of objects to be imaged exist in an observation area; to the close-up observation state in which the objective optical system is closed to a particular object optionally is selected from these objects to be imaged by an observer so as to observe the particular object in detail.

In addition, this observation apparatus is formed in such a way that accurate focusing can be performed in every observation state of the objective optical system by moving not only the second lens group $G_2$ but also the fourth lens group $G_4$ along the optical axis.

Embodied Example 3

An observation apparatus provided with an objective optical system according to Embodied Example 3 is explained in detail using FIGS. 3A-3C and 4A-4L, below.

Figure 3A:
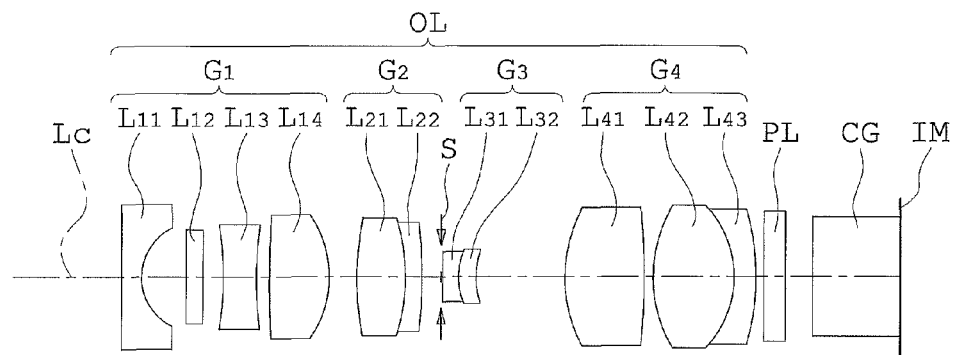
FIGS. 3A to 3C are sectional views taken along the optical axis for showing the configuration of the optical system provided for the observation apparatus according to Embodied Example 3, where
Figure 3B:
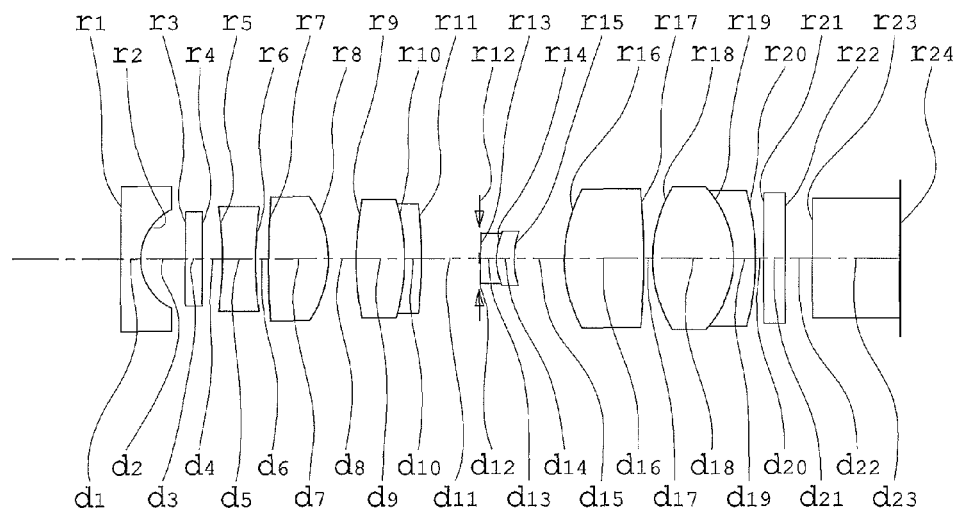
Figure 3C:
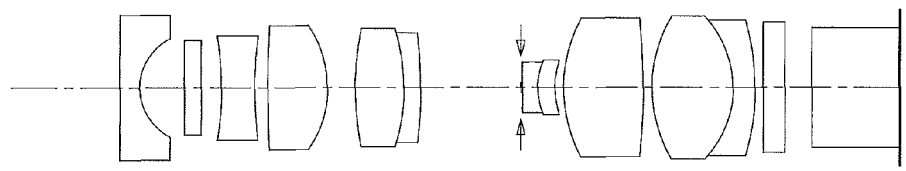

FIGS. 3A to 3C are sectional views taken along the optical axis for showing the configuration of the optical system provided for this observation apparatus, where FIG. 3A shows the normal observation state of the optical system (in the farthest point state), FIG. 3B shows the middle state of the optical system (in the farthest point state), and FIG. 3C shows the close-up observation state of the optical system (in the farthest point state). FIGS. 4A to 4L are aberration diagrams showing spherical aberration, astigmatism, distortion, and chromatic aberration of magnification in the optical system shown in FIGS. 3A-3C. To be specific, FIGS. 4A to 4D show the aberrations in the normal observation state of the optical system (in the farthest point state), FIGS. 4E to 4H show the aberrations in the middle state of the optical system (in the farthest point state), and FIGS. 4I to 4L show the aberrations in the close-up observation state of the optical system (in the farthest point state).

As shown in FIGS. 3A-3C, this observation apparatus includes: an optical system which includes an objective optical system OL, a plano lens PL arranged on the image side of the objective optical system OL and substantially having no refractive power, and a CCD cover glass CG; an aperture stop S arranged in the objective optical system OL; and an image pickup element like CCD for which only its image plane IM is shown in FIGS. 3A-3C. All of these components are arranged on the optical axis Lc.

The objective optical system OL is composed of a first lens group $G_1$ having negative power, a second lens group $G_2$ having positive power and being movable along the optical axis, a third lens group $G_3$ having negative power and being movable along the optical axis, and a fourth lens group $G_4$ having positive power, these lens groups being arranged in that order from the object side. The aperture stop S is arranged between the second lens group $G_2$ and the third lens group $G_3$ in such a way that the aperture stop S moves integrally with the third lens group $G_3$.

The first lens group $G_1$ is composed of: a lens $L_{11}$ that is a plano-concave lens having negative power and with a concave surface thereof facing the image side; a lens $L_{12}$ that is a plano lens; a lens $L_{13}$ that is a biconcave lens having negative power; and a lens $L_{14}$ that is a biconvex lens having positive power, these lenses being arranged in that order from the object side.

The second lens group $G_2$ is composed of: a lens $L_{21}$ that is a biconvex lens having positive power; and a lens $L_{22}$ that is a meniscus lens having negative power with the convex surface thereof facing the image side, these lenses being arranged in that order from the object side. The lens $L_{21}$ and the lens $L_{22}$ are joined to each other.

The third lens group $G_3$ is composed of: a lens $L_{31}$ that is a plano-concave lens having negative power with the concave surface thereof facing the image side; and a lens $L_{32}$ that is a meniscus lens having positive power with the concave surface thereof facing the image side, these lenses being arranged in that order from the object side. The lens $L_{31}$ and the lens $L_{32}$ are joined to each other.

The fourth lens group $G_4$ is composed of: a lens $L_{41}$ that is a biconvex lens having positive power; a lens $L_{42}$ that is a biconvex lens having positive power; and a lens $L_{43}$ that is a meniscus lens having negative power with the convex surface thereof facing the image side, these lenses being arranged in that order from the object side. The lens $L_{42}$ and the lens $L_{43}$ are joined to each other.

An amount of variation in magnification per movement of the third lens group $G_3$ is larger than an amount of variation in magnification per movement of the second lens group $G_2$ in this objective optical system OL.

This observation apparatus is formed in such a way that movement of the third lens group $G_3$ along the optical axis can change the observation state of the objective optical system reversibly and continuously: from the normal observation state in which a plurality of objects to be imaged exist in an observation area; to the close-up observation state in which the objective optical system is closed to a particular object optionally selected from these objects to be imaged by an observer so as to observe the particular object in detail.

In addition, this observation apparatus is formed in such a way that accurate focusing can be performed in every observation state of the objective optical system by moving not only the third lens group $G_3$ but also the second lens group $G_2$ along the optical axis.

Next, numerical data on the optical system provided for this observation apparatus is shown.

Numerical Data 1

Unit: mm

Surface data

| Surface No. s | Radius of curvature r | Surface distance d | Refractive index nd | Abbe's number vd |
|---|---|---|---|---|
| 1 | ∞ | 0.36 | 1.88300 | 40.76 |
| 2 | 0.996 | 0.82 | | |
| 3 | ∞ | 0.31 | 1.51400 | 75.00 |
| 4 | ∞ | 0.37 | | |
| 5 | −6.212 | 0.60 | 1.51742 | 52.43 |
| 6 | 7.399 | 0.24 | | |
| 7 | 20.660 | 1.09 | 1.51633 | 64.14 |
| 8 | −1.988 | D8 | | |
| 9 | 5.439 | 0.90 | 1.77250 | 49.60 |
| 10 | −3.566 | 0.31 | 1.92286 | 18.90 |
| 11 | −8.344 | D11 | | |
| 12 (Stop surface) | ∞ | 0.03 | | |
| 13 | ∞ | 0.28 | 1.48749 | 70.23 |
| 14 | 1.200 | 0.32 | 1.59270 | 35.31 |
| 15 | 1.542 | D15 | | |
| 16 | 2.648 | 1.45 | 1.48749 | 70.23 |
| 17 | −11.997 | 0.16 | | |
| 18 | 2.523 | 1.47 | 1.48749 | 70.23 |
| 19 | −1.897 | 0.40 | 1.92286 | 18.90 |
| 20 | −4.420 | 0.15 | | |
| 21 | ∞ | 0.40 | 1.52300 | 58.50 |
| 22 | ∞ | 0.50 | | |
| 23 | ∞ | 1.60 | 1.51633 | 64.14 |
| 24 (Image plane) | ∞ | | | |

Observation state

| | Normal observation (the farthest point) | Middle observation (the farthest point) | Close-up observation (the farthest point) | Close-up observation (the nearest point) |
|---|---|---|---|---|
| Various data on objective optical system Zoom ratio: 1.38 | | | | |
| Focal length | 0.95 | 1.14 | 1.31 | 1.35 |
| F number | 5.26 | 5.52 | 5.40 | 5.31 |
| Angle of view (2ω) | 142.41 | 97.88 | 71.18 | 67.90 |
| Image height | 0.85 | 0.85 | 0.85 | 0.85 |
| Lens total length (in air) | 13.48 | 13.24 | 12.83 | 12.74 |
| BF (in air) | 1.90 | 1.66 | 1.25 | 1.16 |
| Surface distance | | | | |
| D8 | 0.50 | 0.50 | 0.50 | 0.35 |
| D11 | 0.35 | 1.04 | 1.81 | 1.96 |
| D15 | 1.63 | 0.93 | 0.16 | 0.16 |

Data on lens groups

| Group | The first surface of lens group | Focal length |
|---|---|---|
| 1 | 1 | −5.10 |
| 2 | 9 | 4.91 |
| 3 | 13 | −3.45 |
| 4 | 16 | 2.87 |

Data on conditions

Condition (1): $3 < (m_{c\text{-}d}/m_{u\text{-}d})/(m_{c\text{-}n}/m_{c\text{-}d}) < 10$: 6.934
Condition (2): $1 < m_{c\text{-}n}/m_{c\text{-}d} < 1.55$: 1.0908
Condition (3): $0.2 < |(1 − \beta_1 \cdot \beta_1) \times \beta_1' \cdot \beta_1'| < 3$: 0.31678
Condition (4): $2 < |F_1/F_{c\text{-}d}| < 8$: 3.735383
Condition (5): $1.8 < |F_2/F_{c\text{-}d}| < 5$: 2.625099
Condition (6): $0.02 < D_1/L < 0.12$: 0.049542191
Condition (7): $|DT_{c\text{-}n} − DT_{c\text{-}d}| < 5$: 1.5262
Condition (8): $DT_{u\text{-}d} < −50$: −67.921
Condition (9): $Fno_u/Fno_c > 0.94$: 0.974

Embodied Example 4

An observation apparatus provided with an objective optical system according to Embodied Example 4 is explained in detail using FIGS. 5A-5C and 6A-6L, below.

Figure 5A:
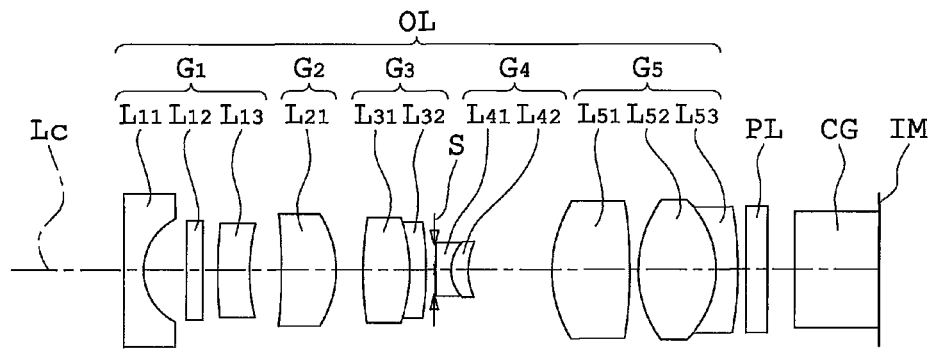
FIGS. 5A to 5C are sectional views taken along the optical axis for showing the configuration of the optical system provided for the observation apparatus according to Embodied Example 4, where
Figure 5B:
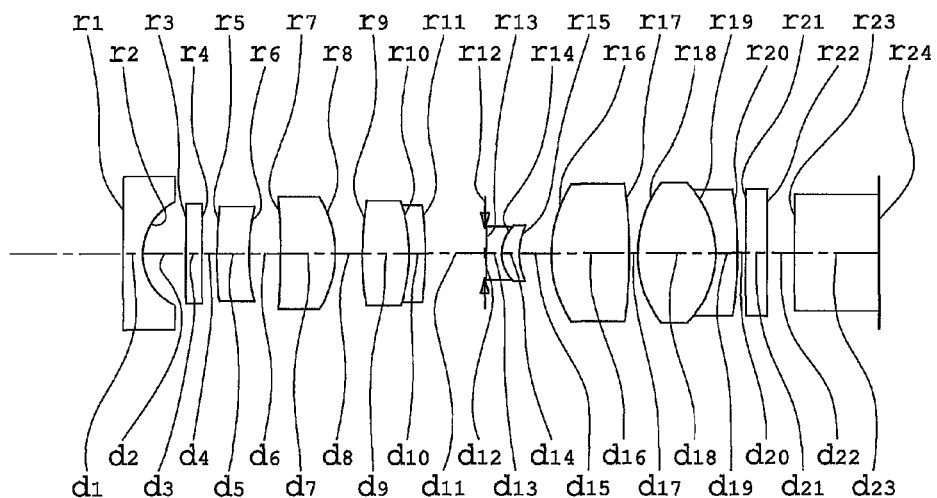
Figure 5C:
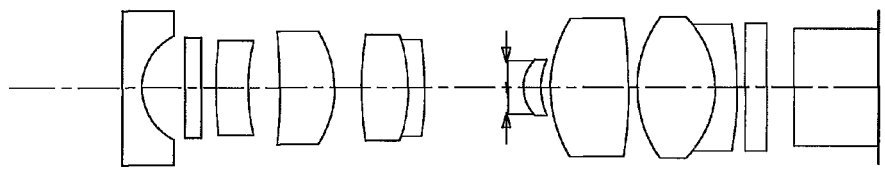

FIG. 5A to 5C are sectional views taken along the optical axis for showing the configuration of the optical system provided for this observation apparatus, where FIG. 5A shows the normal observation state of the optical system (in the farthest point state), FIG. 5B shows the middle state of the optical system (in the farthest point state), and FIG. 5C shows the close-up observation state of the optical system (in the farthest point state). FIGS. 6A to 6L are aberration diagrams showing spherical aberration, astigmatism, distortion, and chromatic aberration of magnification in the optical system shown in FIG. 5A-5C. To be specific, FIGS. 6A to 6D show the aberrations in the normal observation state of the optical system (in the farthest point state), FIGS. 6E to 6H show the aberrations in the middle state of the optical system (in the farthest point state), and FIGS. 6I to 6L show the aberrations in the close-up observation state of the optical system (in the farthest point state).

As shown in FIGS. 5A-5C, this observation apparatus includes: an optical system which includes an objective optical system OL, a plano lens PL arranged on the image side of the objective optical system OL and substantially having no refractive power, and a CCD cover glass CG; an aperture stop S arranged in the objective optical system OL; and an image pickup element like CCD for which only its image plane IM is shown in FIGS. 5A-5C. All of these components are arranged on the optical axis Lc.

The objective optical system OL is composed of a first lens group $G_1$ having negative power, a second lens group $G_2$ having positive power and being movable along the optical axis, a third lens group $G_3$ having positive power, a fourth lens group $G_4$ having negative power and being movable along the optical axis, and a fifth lens group $G_5$ having positive power, these lens groups being arranged in that order from the object side. The aperture stop S is arranged between the third lens group $G_3$ and the fourth lens group $G_4$ in such a way that the aperture stop S moves integrally with the fourth lens group $G_4$.

The first lens group $G_1$ is composed of: a lens $L_{11}$ that is a plano-concave lens having negative power with the concave surface thereof facing the image side; a lens $L_{12}$ that is a plano lens; and a lens $L_{13}$ that is a meniscus lens having negative power with the concave surface thereof facing the image side, these lenses being arranged in that order from the object side.

The second lens group $G_2$ is composed of a lens $L_{21}$ that is a meniscus lens having positive power with the convex surface thereof facing the image side.

The third lens group $G_3$ is composed of: a lens $L_{31}$ that is a biconvex lens having positive power; and a lens $L_{32}$ that is a meniscus lens having negative power with the convex surface thereof facing the image side, these lenses being arranged in that order from the object side. The lens $L_{31}$ and the lens $L_{32}$ are joined to each other.

The fourth lens group $G_4$ is composed of: a lens $L_{41}$ that is a plano-concave lens having negative power with the concave surface thereof facing the image side; and a lens $L_{42}$ that is a meniscus lens having positive power with the concave surface thereof facing the image side, these lenses being arranged in that order from the object side. The lens $L_{41}$ and the lens $L_{42}$ are joined to each other.

The fifth lens group $G_5$ is composed of: a lens $L_{51}$ that is a biconvex lens having positive power; a lens $L_{52}$ that is a biconvex lens having positive power; and a lens $L_{53}$ that is a meniscus lens having negative power with the convex surface thereof facing the image side, these lenses being arranged in that order from the object side. The lens $L_{52}$ and the lens $L_{53}$ are joined to each other.

An amount of variation in magnification per movement of the fourth lens group $G_4$ is larger than an amount of variation in magnification per movement of the second lens group $G_2$ in this objective optical system OL.

This observation apparatus is formed in such a way that movement of the fourth lens group $G_4$ along the optical axis can change the observation state of the objective optical system reversibly and continuously: from the normal observation state in which a plurality of objects to be imaged exist in an observation area; to the close-up observation state in which the objective optical system is closed to a particular object optionally selected from these objects to be imaged by an observer so as to observe the particular object in detail.

In addition, this observation apparatus is formed in such a way that accurate focusing can be performed in every observation state of the objective optical system by moving not only the fourth lens group $G_4$ but also the second lens group $G_2$ along the optical axis.

Next, numerical data on the optical system provided for this observation apparatus is shown.

Numerical Data 2

| Unit: mm | | | | |
|---|---|---|---|---|
| Surface data | | | | |
| Surface No. s | Radius of curvature r | Surface distance d | Refractive index nd | Abbe's number vd |
| 1 | ∞ | 0.36 | 1.88300 | 40.76 |
| 2 | 1.077 | 0.82 | | |
| 3 | ∞ | 0.31 | 1.51400 | 74.00 |
| 4 | ∞ | 0.28 | | |
| 5 | 8.349 | 0.60 | 1.51742 | 52.43 |
| 6 | 3.733 | D6 | | |
| 7 | −10.468 | 1.00 | 1.51633 | 64.14 |
| 8 | −1.987 | D8 | | |
| 9 | 6.230 | 0.90 | 1.77250 | 49.60 |
| 10 | −2.754 | 0.31 | 1.92286 | 18.90 |
| 11 | −6.114 | D11 | | |
| 12 (Stop surface) | ∞ | 0.03 | | |
| 13 | ∞ | 0.28 | 1.48749 | 70.23 |
| 14 | 0.733 | 0.32 | 1.59270 | 35.31 |
| 15 | 1.228 | D15 | | |
| 16 | 2.477 | 1.45 | 1.48749 | 70.23 |
| 17 | −8.708 | 0.16 | | |
| 18 | 2.204 | 1.47 | 1.48749 | 70.23 |
| 19 | −1.833 | 0.40 | 1.92286 | 18.90 |
| 20 | −6.842 | 0.15 | | |
| 21 | ∞ | 0.40 | 1.52300 | 58.50 |
| 22 | ∞ | 0.50 | | |
| 23 | ∞ | 1.60 | 1.51633 | 64.14 |
| 24 (Image plane) | ∞ | | | |

| | Observation state | | | |
|---|---|---|---|---|
| | Normal observation (the farthest point) | Middle observation (the farthest point) | Close-up observation (the farthest point) | Close-up observation (the nearest point) |
| Various data on objective optical system Zoom ratio: 1.39 | | | | |
| Focal length | 0.95 | 1.23 | 1.33 | 1.28 |
| F number | 5.10 | 5.48 | 5.40 | 5.22 |
| Angle of view (2ω) | 142.45 | 82.85 | 69.54 | 69.30 |

-continued

Unit: mm

| | | | | |
|---|---|---|---|---|
| Image height | 0.85 | 0.85 | 0.85 | 0.85 |
| Lens total length (in air) | 13.39 | 13.05 | 12.81 | 12.66 |
| BF (in air) | 1.91 | 1.57 | 1.33 | 1.18 |
| Surface distance | | | | |
| D6 | 0.60 | 0.60 | 0.60 | 0.69 |
| D8 | 0.50 | 0.50 | 0.50 | 0.41 |
| D11 | 0.15 | 1.11 | 1.51 | 1.51 |
| D15 | 1.54 | 0.58 | 0.18 | 0.18 |

Data on lens groups

| Group | The first surface of lens group | Focal length |
|---|---|---|
| 1 | 1 | −0.98 |
| 2 | 7 | 4.57 |
| 3 | 9 | 4.71 |
| 4 | 13 | −3.07 |
| 5 | 16 | 2.73 |

Data on conditions

Condition (1): $3 < (m_{c-d}/m_{u-d})/(m_{c-n}/m_{c-d}) < 10$: 5.9922
Condition (2): $1 < m_{c-n}/m_{c-d} < 1.55$: 1.2815
Condition (3): $0.2 < |(1 - \beta_1 \cdot \beta_1) \times \beta_1' \cdot \beta_1'| < 3$: 2.2482
Condition (4): $2 < |F_1/F_{c-d}| < 8$: 3.439532
Condition (5): $1.8 < |F_2/F_{c-d}| < 5$: 2.316437
Condition (6): $0.02 < D_1/L < 0.12$: 0.077846103
Condition (7): $|DT_{c-n} - DT_{c-d}| < 5$: 1.8351
Condition (8): $DT_{u-d} < -50$: −68.2131
Condition (9): $Fno_u/Fno_c > 0.94$: 0.944721

Embodied Example 5

An observation apparatus provided with an objective optical system according to Embodied Example 5 is explained in detail using FIGS. 7A-7C and 8A-8L, below.

Figure 7A:
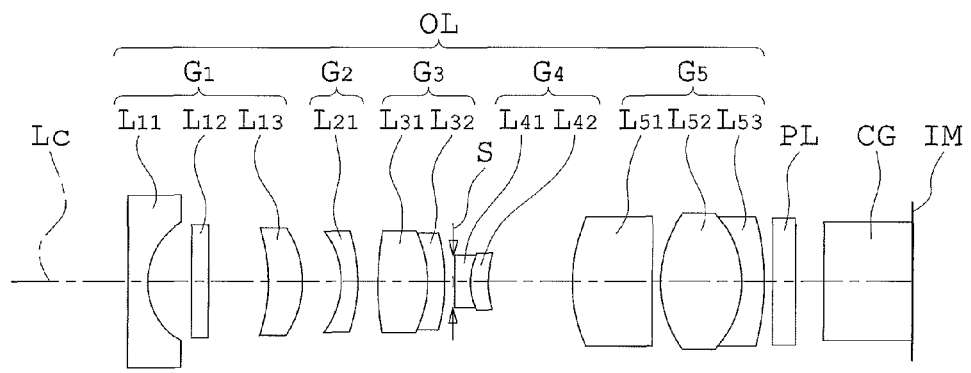
FIGS. 7A to 7C are sectional views taken along the optical axis for showing the configuration of the optical system provided for the observation apparatus according to Embodied Example 5, where
Figure 7B:
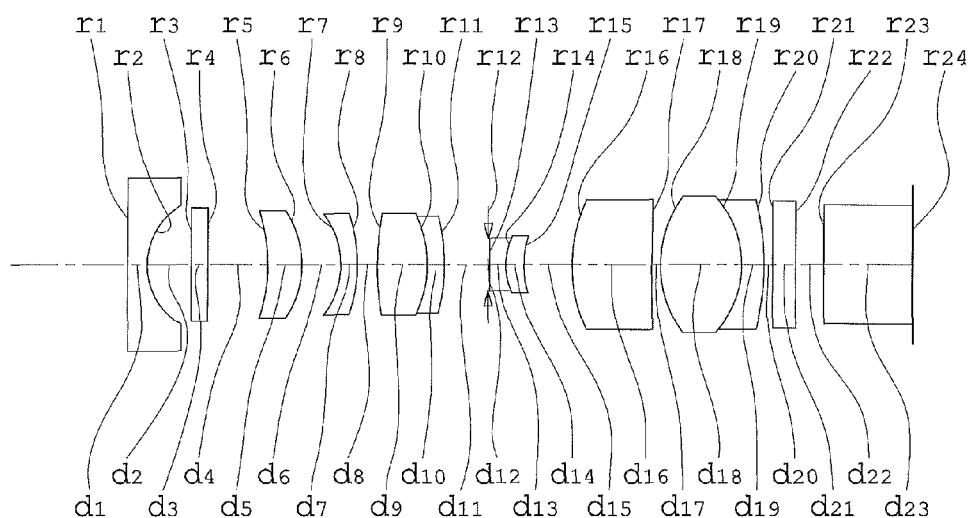
Figure 7C:
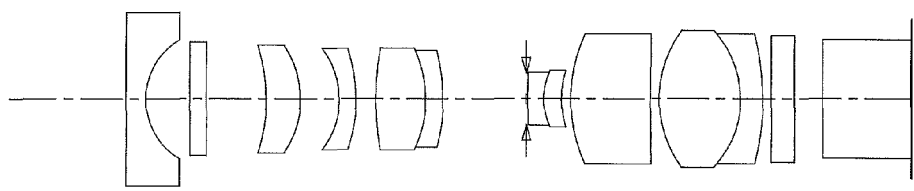

FIGS. 7A to 7C are sectional views taken along the optical axis for showing the configuration of the optical system provided for this observation apparatus, where FIG. 7A shows the normal observation state of the optical system (in the farthest point state), FIG. 7B shows the middle state of the optical system (in the farthest point state), and FIG. 7C shows the close-up observation state of the optical system (in the farthest point state). FIGS. 8A to 8L are aberration diagrams showing spherical aberration, astigmatism, distortion, and chromatic aberration of magnification in the optical system shown in FIGS. 7A-7C. To be specific, FIGS. 8A to 8D show the aberrations in the normal observation state of the optical system (in the farthest point state), FIGS. 8E to 8H show the aberrations in the middle state of the optical system (in the farthest point state), and FIGS. 8I to 8L show the aberrations in the close-up observation state of the optical system (in the farthest point state).

As shown in FIGS. 7A-7C, this observation apparatus includes: an optical system which includes an objective optical system OL, a plano lens PL arranged on the image side of the objective optical system OL and substantially having no refractive power, and a CCD cover glass CG; an aperture stop S arranged in the objective optical system OL; and an image pickup element like CCD for which only its image plane IM is shown in FIGS. 7A-7C. All of these components are arranged on the optical axis Lc.

The objective optical system OL is composed of a first lens group $G_1$ having negative power, a second lens group $G_2$ having negative power and being movable along the optical axis, a third lens group $G_3$ having positive power, a fourth lens group $G_4$ having negative power and being movable along the optical axis, and a fifth lens group $G_5$ having positive power, these lens groups being arranged in that order from the object side. The aperture stop S is arranged between the third lens group $G_3$ and the fourth lens group $G_4$ in such a way that the aperture stop S moves integrally with the fourth lens group $G_4$.

The first lens group $G_1$ is composed of: a lens $L_{11}$ that is a plano-concave lens having negative power with the concave surface thereof facing the image side; a lens $L_{12}$ that is a plano lens; and a lens $L_{13}$ that is a meniscus lens having positive power with the convex surface thereof facing the image side, these lenses being arranged in that order from the object side.

The second lens group $G_2$ is composed of a lens $L_{21}$ that is a meniscus lens having negative power with the convex surface thereof facing the image side.

The third lens group $G_3$ is composed of: a lens $L_{31}$ that is a biconvex lens having positive power; and a lens $L_{32}$ that is a meniscus lens having negative power with the convex surface thereof facing the image side, these lenses being arranged in that order from the object side. The lens $L_{31}$ and the lens $L_{32}$ are joined to each other.

The fourth lens group $G_4$ is composed of: a lens $L_{41}$ that is a plano-concave lens having negative power with the concave surface thereof facing the image side; and a lens $L_{42}$ that is a meniscus lens having positive power with the concave surface thereof facing the image side, these lenses being arranged in that order from the object side. The lens $L_{41}$ and the lens $L_{42}$ are joined to each other.

The fifth lens group $G_5$ is composed of: a lens $L_{51}$ that is a meniscus lens having positive power with the concave surface thereof facing the image side; a lens $L_{52}$ that is a biconvex lens having positive power; and a lens $L_{53}$ that is a meniscus lens having negative power with the convex surface thereof facing the image side, these lenses being arranged in that order from the object side. The lens $L_{52}$ and the lens $L_{53}$ are joined to each other.

An amount of variation in magnification per movement of the fourth lens group $G_4$ is larger than an amount of variation in magnification per movement of the second lens group $G_2$ in this objective optical system OL.

This observation apparatus is formed in such a way that movement of the fourth lens group $G_4$ along the optical axis can change the observation state of the objective optical system reversibly and continuously: from the normal observation state in which a plurality of objects to be imaged exist in an observation area; to the close-up observation state in which the objective optical system is closed to a particular object optionally selected from these objects to be imaged by an observer so as to observe the particular object in detail.

In addition, this observation apparatus is formed in such a way that accurate focusing can be performed in every observation state of the objective optical system by moving not only the fourth lens group $G_4$ but also the second lens group $G_2$ along the optical axis.

Next, numerical data on the optical system provided for this observation apparatus is shown.

Numerical Data 3

Unit: mm

Surface data

| Surface No. s | Radius of curvature r | Surface distance d | Refractive index nd | Abbe's number vd |
|---|---|---|---|---|
| 1 | ∞ | 0.36 | 1.88300 | 40.76 |
| 2 | 1.219 | 0.82 | | |
| 3 | ∞ | 0.31 | 1.51400 | 73.43 |
| 4 | ∞ | 1.07 | | |
| 5 | −3.199 | 0.60 | 1.51742 | 52.43 |
| 6 | −1.762 | D6 | | |
| 7 | −1.500 | 0.30 | 1.51633 | 64.14 |
| 8 | −2.732 | D8 | | |
| 9 | 5.195 | 0.90 | 1.77250 | 49.60 |
| 10 | −2.090 | 0.31 | 1.92286 | 18.90 |
| 11 | −3.497 | D11 | | |
| 12 (Stop surface) | ∞ | 0.03 | | |
| 13 | ∞ | 0.28 | 1.48749 | 70.23 |
| 14 | 1.200 | 0.32 | 1.59270 | 35.31 |
| 15 | 1.783 | D15 | | |
| 16 | 2.734 | 1.45 | 1.48749 | 70.23 |
| 17 | 44.661 | 0.16 | | |
| 18 | 2.074 | 1.47 | 1.48749 | 70.23 |
| 19 | −1.828 | 0.40 | 1.92286 | 18.90 |
| 20 | −4.725 | 0.15 | | |
| 21 | ∞ | 0.40 | 1.52300 | 58.50 |
| 22 | ∞ | 0.50 | | |
| 23 | ∞ | 1.60 | 1.51633 | 64.14 |
| 24 (Image plane) | ∞ | | | |

Observation state

| | Normal observation (the farthest point) | Middle observation (the farthest point) | Close-up observation (the farthest point) | Close-up observation (the nearest point) |
|---|---|---|---|---|
| Various data on objective optical system Zoom ratio: 1.27 | | | | |
| Focal length | 0.95 | 1.08 | 1.21 | 1.17 |
| F number | 5.41 | 5.53 | 5.40 | 5.26 |
| Angle of view (2ω) | 142.66 | 106.19 | 82.40 | 83.45 |
| Image height | 0.85 | 0.85 | 0.85 | 0.85 |
| Lens total length (in air) | 13.38 | 13.18 | 12.88 | 12.75 |
| BF (in air) | 1.90 | 1.70 | 1.40 | 1.27 |
| Surface distance | | | | |
| D6 | 0.70 | 0.70 | 0.70 | 0.48 |
| D8 | 0.35 | 0.35 | 0.35 | 0.57 |
| D11 | 0.15 | 0.79 | 1.49 | 1.49 |
| D15 | 1.50 | 0.86 | 0.16 | 0.16 |

Data on lens groups

| Group | The first surface of lens group | Focal length |
|---|---|---|
| 1 | 1 | −3.83 |
| 2 | 7 | −7.02 |
| 3 | 9 | 3.10 |
| 4 | 13 | −4.18 |
| 5 | 16 | 3.05 |

Data on conditions

Condition (1): $3 < (m_{c\text{-}d}/m_{u\text{-}d})/(m_{c\text{-}n}/m_{c\text{-}d}) < 10$: 5.1835
Condition (2): $1 < m_{c\text{-}n}/m_{c\text{-}d} < 1.55$: 1.2673
Condition (3): $0.2 < |(1 − \beta_1 \cdot \beta_1) \times \beta_1' \cdot \beta_1'| < 3$: 0.78613
Condition (4): $2 < |F_1/F_{c\text{-}d}| < 8$: 5.825520
Condition (5): $1.8 < |F_2/F_{c\text{-}d}| < 5$: 3.470654
Condition (6): $0.02 < D_1/L < 0.12$: 0.074314407
Condition (7): $|DT_{c\text{-}n} − DT_{c\text{-}d}| < 5$: 1.9309

Unit: mm

Condition (8): $DT_{u\text{-}d} < −50$: −68.0189
Condition (9): $Fno_u/Fno_c > 0.94$: 1.00249

Embodied Example 6

An observation apparatus provided with an objective optical system according to Embodied Example 6 is explained in detail using FIGS. 9A-9C and 10A-10L, below.

Figure 9A:
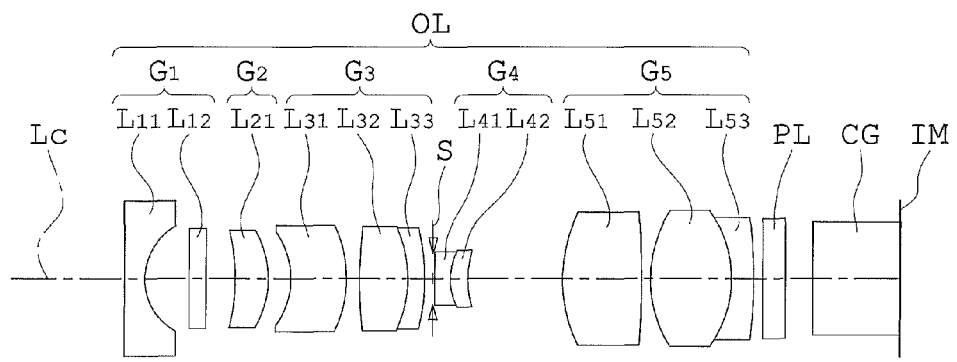
FIGS. 9A to 9C are sectional views taken along the optical axis for showing the configuration of the optical system provided for the observation apparatus according to Embodied Example 6, where
Figure 9B:
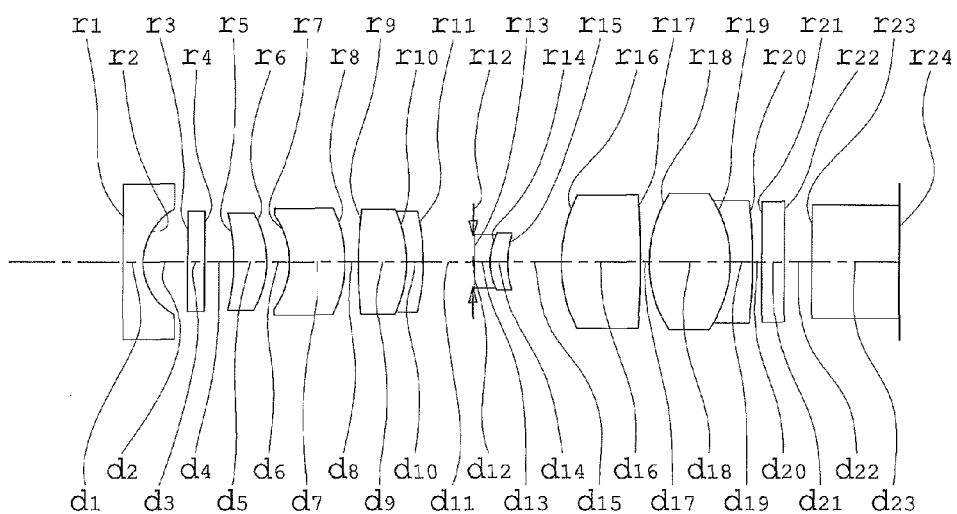
Figure 9C:
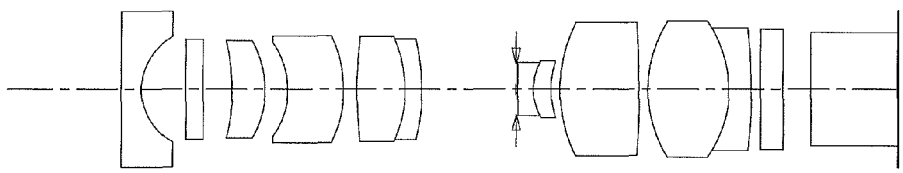
Figure 10A:
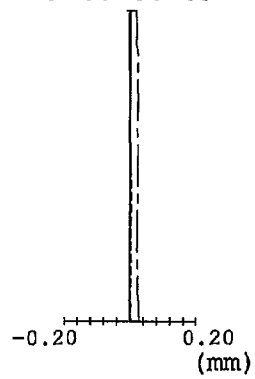
FIGS. 10A to 10L are aberration diagrams showing spherical aberration, astigmatism, distortion, and chromatic aberration of magnification in the optical system shown in FIGS. 9A-9C. To be specific.
Figure 10B:
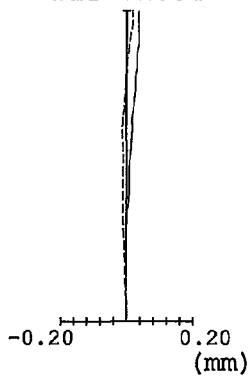
Figure 10C:
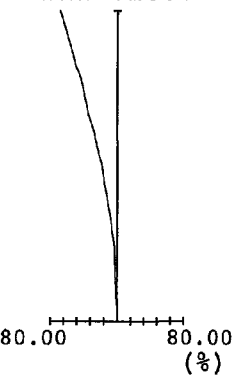
Figure 10D:
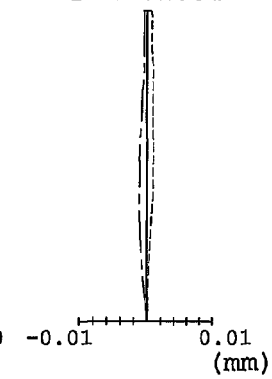
Figure 10E:
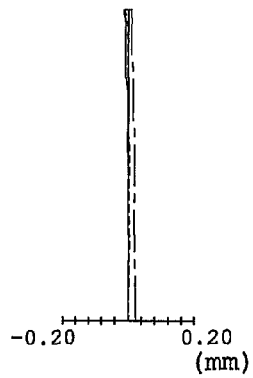
Figure 10F:
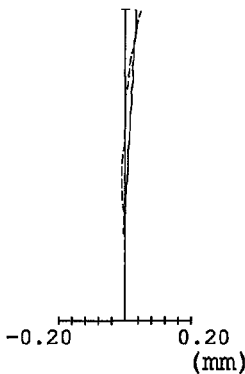
Figure 10G:
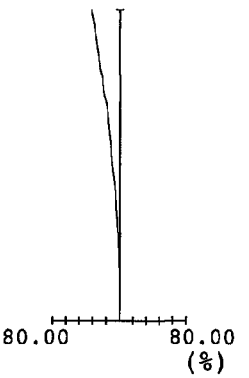
Figure 10H:
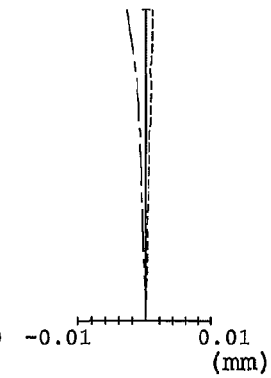
Figure 10I:
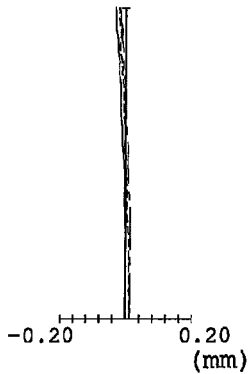
Figure 10J:
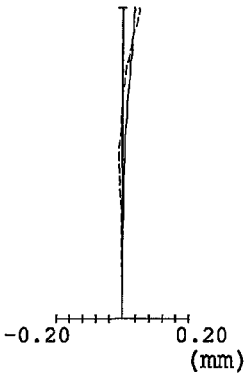
Figure 10K:
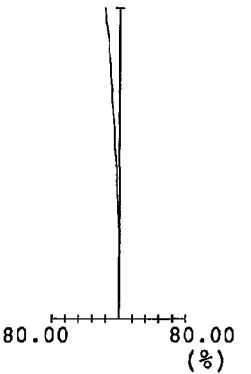
Figure 10L:
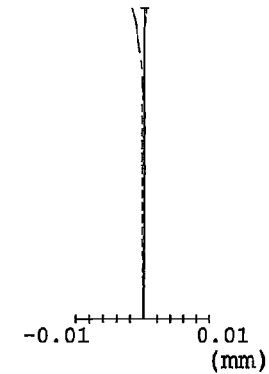

FIGS. 9A to 9C are sectional views taken along the optical axis for showing the configuration of the optical system provided for this observation apparatus, where FIG. 9A shows the normal observation state of the optical system (in the farthest point state), FIG. 9B shows the middle state of the optical system (in the farthest point state), and FIG. 9C shows the close-up observation state of the optical system (in the farthest point state). FIGS. 10A to 10L are aberration diagrams showing spherical aberration, astigmatism, distortion, and chromatic aberration of magnification in the optical system shown in FIGS. 9A-9C. To be specific, FIGS. 10A to 10D show the aberrations in the normal observation state of the optical system (in the farthest point state), FIGS. 10E to 10H show the aberrations in the middle state of the optical system (in the farthest point state), and FIGS. 10I to 10L show the aberrations in the close-up observation state of the optical system (in the farthest point state).

As shown in FIGS. 9A-9C, this observation apparatus includes: an optical system which includes an objective optical system OL, a plano lens PL arranged on the image side of the objective optical system OL and substantially having no refractive power, and a CCD cover glass CG; an aperture stop S arranged in the objective optical system OL; and an image pickup element like CCD for which only its image plane IM is shown in FIGS. 9A-9C. All of these components are arranged on the optical axis Lc.

The objective optical system OL is composed of a first lens group $G_1$ having negative power, a second lens group $G_2$ having positive power and being movable along the optical axis, a third lens group $G_3$ having positive power, a fourth lens group $G_4$ having negative power and being movable along the optical axis, and a fifth lens group $G_5$ having positive power, these lens groups being arranged in that order from the object side. The aperture stop S is arranged between the third lens group $G_3$ and the fourth lens group $G_4$ in such a way that the aperture stop S moves integrally with the fourth lens group $G_4$.

The first lens group $G_1$ is composed of: a lens $L_{11}$ that is a plano-concave lens having negative power with the concave surface thereof facing the image side; and a lens $L_{12}$ that is a plano lens, these lenses being arranged in that order from the object side.

The second lens group $G_2$ is composed of a lens $L_{21}$ that is a meniscus lens having positive power with the convex surface thereof facing the image side.

The third lens group $G_3$ is composed of: a lens $L_{31}$ that is a meniscus lens having negative power with the convex surface thereof facing the image side; a lens $L_{32}$ that is a biconvex lens having positive power; and a lens $L_{33}$ that is a meniscus lens having negative power with the convex surface thereof facing the image side, these lenses being arranged in that order from the object side. The lens $L_{32}$ and the lens $L_{33}$ are joined to each other.

The fourth lens group $G_4$ is composed of: a lens $L_{41}$ that is a plano-concave lens having negative power with the concave surface thereof facing the image side; and a lens $L_{42}$ that is a meniscus lens having positive power with the concave surface thereof facing the image side, these lenses being arranged in that order from the object side. The lens $L_{41}$ and the lens $L_{42}$ are joined to each other.

The fifth lens group $G_5$ is composed of: a lens $L_{51}$ that is a biconvex lens having positive power; a lens $L_{52}$ that is a biconvex lens having positive power; and a lens $L_{53}$ that is a meniscus lens having negative power with the convex surface thereof facing the image side, these lenses being arranged in that order from the object side. The lens $L_{52}$ and the lens $L_{53}$ are joined to each other.

An amount of variation in magnification per movement of the fourth lens group $G_4$ is larger than an amount of variation in magnification per movement of the second lens group $G_2$ in this objective optical system OL.

This observation apparatus is formed in such a way that movement of the fourth lens group $G_4$ along the optical axis can change the observation state of the objective optical system reversibly and continuously: from the normal observation state in which a plurality of objects to be imaged exist in an observation area; to the close-up observation state in which the objective optical system is closed to a particular object optionally selected from these objects to be imaged by an observer so as to observe the particular object in detail.

In addition, this observation apparatus is formed in such a way that accurate focusing can be performed in every observation state of the objective optical system by moving not only the fourth lens group $G_4$ but also the second lens group $G_2$ along the optical axis.

Next, numerical data on the optical system provided for this observation apparatus is shown.

Numerical Data 4

Unit: mm

Surface data

| Surface No. s | Radius of curvature r | Surface distance d | Refractive index nd | Abbe's number vd |
|---|---|---|---|---|
| 1 | ∞ | 0.36 | 1.88300 | 40.76 |
| 2 | 1.088 | 0.82 | | |
| 3 | ∞ | 0.31 | 1.51400 | 74.00 |
| 4 | ∞ | D4 | | |
| 5 | −3.668 | 0.60 | 1.51742 | 52.43 |
| 6 | −1.774 | D6 | | |
| 7 | −1.496 | 1.00 | 1.51633 | 64.14 |
| 8 | −2.261 | 0.25 | | |
| 9 | 8.267 | 0.90 | 1.77250 | 49.60 |
| 10 | −2.222 | 0.31 | 1.92286 | 18.90 |
| 11 | −3.851 | D11 | | |
| 12 (Stop surface) | ∞ | 0.03 | | |
| 13 | ∞ | 0.28 | 1.48749 | 70.23 |
| 14 | 1.100 | 0.32 | 1.59270 | 35.31 |
| 15 | 1.755 | D15 | | |
| 16 | 2.669 | 1.45 | 1.48749 | 70.23 |
| 17 | −17.036 | 0.16 | | |
| 18 | 2.312 | 1.47 | 1.48749 | 70.23 |
| 19 | −2.147 | 0.40 | 1.92286 | 18.90 |
| 20 | −9.061 | 0.17 | | |
| 21 | ∞ | 0.40 | 1.52300 | 58.50 |
| 22 | ∞ | 0.50 | | |
| 23 | ∞ | 1.60 | 1.51633 | 64.14 |
| 24 (Image plane) | ∞ | | | |

-continued

Unit: mm

Observation state

| | Normal observation (the farthest point) | Middle observation (the farthest point) | Close-up observation (the farthest point) | Close-up observation (the nearest point) |
|---|---|---|---|---|
| Various data on objective optical system Zoom ratio: 1.30 | | | | |
| Focal length | 0.94 | 1.09 | 1.23 | 1.21 |
| F number | 5.41 | 5.56 | 5.40 | 5.35 |
| Angle of view (2ω) | 142.68 | 102.64 | 77.54 | 77.57 |
| Image height | 0.85 | 0.85 | 0.85 | 0.85 |
| Lens total length (in air) | 13.38 | 13.17 | 12.83 | 12.78 |
| BF (in air) | 1.92 | 1.70 | 1.36 | 1.32 |
| Surface distance | | | | |
| D4 | 0.53 | 0.53 | 0.53 | 0.58 |
| D6 | 0.40 | 0.40 | 0.40 | 0.35 |
| D11 | 0.15 | 0.90 | 1.72 | 1.72 |
| D15 | 1.72 | 0.98 | 0.16 | 0.16 |

Data on lens groups

| Group | The first surface of lens group | Focal length |
|---|---|---|
| 1 | 1 | −1.23 |
| 2 | 5 | 5.99 |
| 3 | 7 | 3.82 |
| 4 | 13 | −4.25 |
| 5 | 16 | 3.09 |

Data on conditions

Condition (1): $3 < (m_{c\text{-}d}/m_{u\text{-}d})/(m_{c\text{-}n}/m_{c\text{-}d}) < 10$: 6.5641
Condition (2): $1 < m_{c\text{-}n}/m_{c\text{-}d} < 1.55$: 1.0775
Condition (3): $0.2 < |(1 - \beta_1 \cdot \beta_1) \times \beta_1' \cdot \beta_1'| < 3$: 1.06971
Condition (4): $2 < |F_1/F_{c\text{-}d}| < 8$: 4.885378
Condition (5): $1.8 < |F_2/F_{c\text{-}d}| < 5$: 3.460754
Condition (6): $0.02 < D_1/L < 0.12$: 0.056617
Condition (7): $|DT_{c\text{-}n} - DT_{c\text{-}d}| < 5$: 0.63327
Condition (8): $DT_{u\text{-}d} < -50$: −67.9783
Condition (9): $Fno_u/Fno_c > 0.94$: 1.00166

Embodied Example 7

An observation apparatus provided with an objective optical system according to Embodied Example 7 is explained in detail using FIGS. 11A-11C and 12A-12L, below.

Figure 11A:
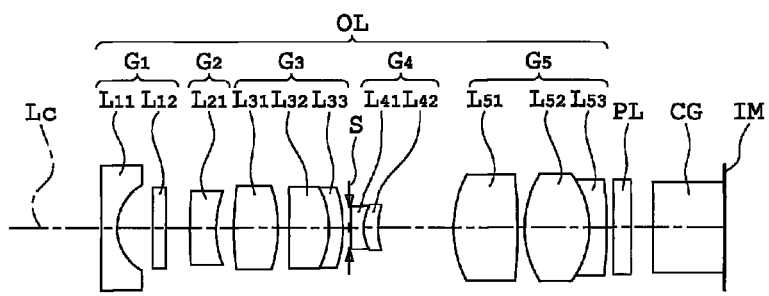
FIGS. 11A to 11C are sectional views taken along the optical axis for showing the configuration of the optical system provided for the observation apparatus according to Embodied Example 7, where
Figure 11B:
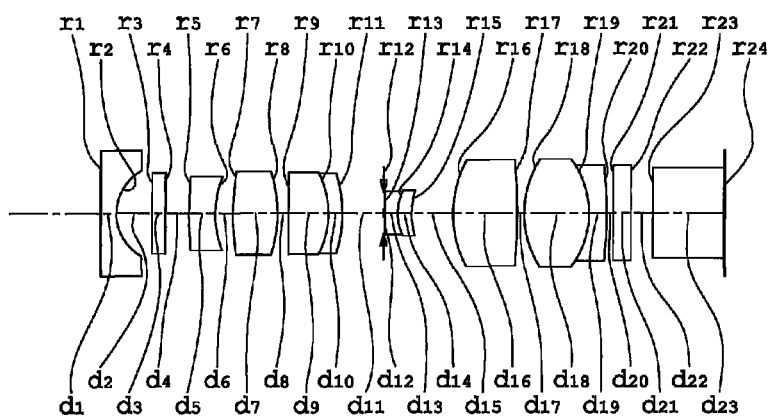
Figure 11C:
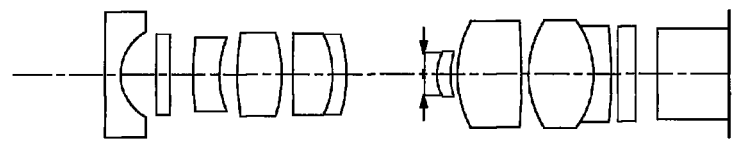
Figure 12A:
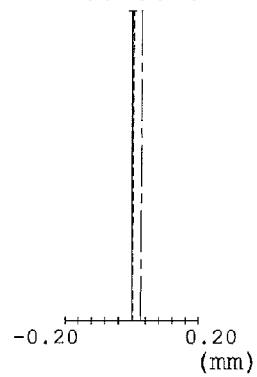
FIGS. 12A to 12L are aberration diagrams showing spherical aberration, astigmatism, distortion, and chromatic aberration of magnification in the optical system shown in FIGS. 11A-11C. To be specific.
Figure 12B:
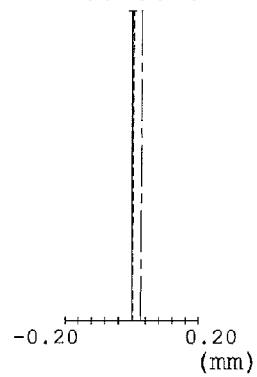
Figure 12C:
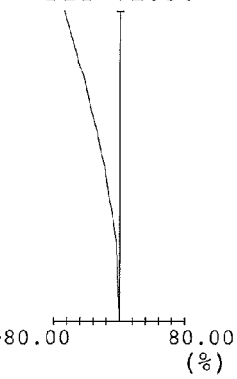
Figure 12D:
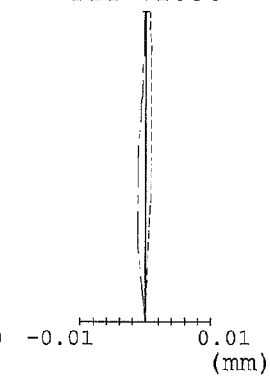
Figure 12E:
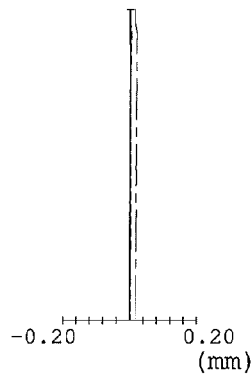
Figure 12F:
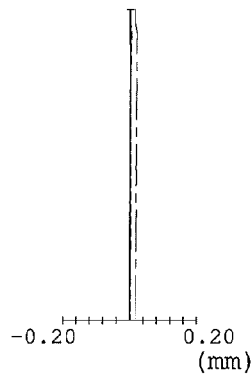
Figure 12G:
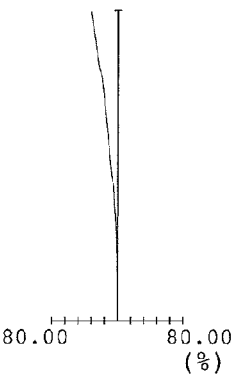
Figure 12H:
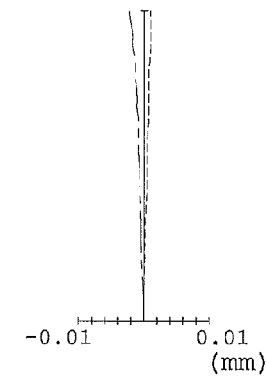
Figure 12I:
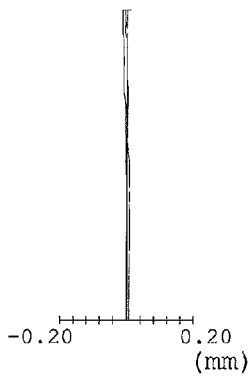
Figure 12J:
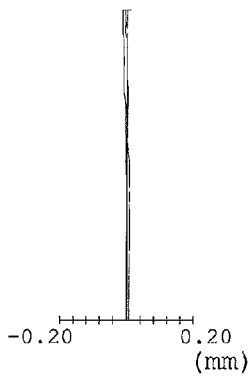
Figure 12K:
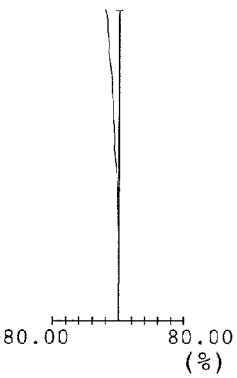
Figure 12L:
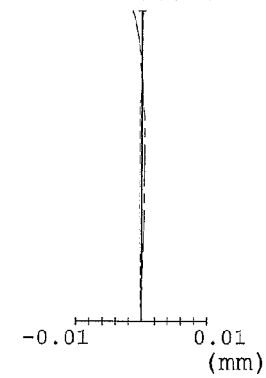

FIGS. 11A to 11C are sectional views taken along the optical axis for showing the configuration of the optical system provided for this observation apparatus, where FIG. 11A shows the normal observation state of the optical system (in the farthest point state), FIG. 11B shows the middle state of the optical system (in the farthest point state), and FIG. 11C shows the close-up observation state of the optical system (in the farthest point state). FIGS. 12A to 12L are aberration diagrams showing spherical aberration, astigmatism, distortion, and chromatic aberration of magnification in the optical system shown in FIGS. 11A-11D. To be specific, FIGS. 12A to 12D show the aberrations in the normal observation state of the optical system (in the farthest point state), FIGS. 12E to 12H show the aberrations in the middle state of the optical system (in the farthest point state), and FIGS. 12I to 12L show the aberrations in the close-up observation state of the optical system (in the farthest point state).

As shown in FIG. 11A-11C, this observation apparatus includes: an optical system which includes an objective optical system OL, a plano lens PL arranged on the image side of the objective optical system OL and substantially having no refractive power, and a CCD cover glass CG; an aperture stop S arranged in the objective optical system OL; and an image pickup element like CCD for which only its image plane IM is shown in FIGS. 11A-11C. All of these components are arranged on the optical axis Lc.

The objective optical system OL is composed of a first lens group $G_1$ having negative power, a second lens group $G_2$ having negative power and being movable along the optical axis, a third lens group $G_3$ having positive power, a fourth lens group $G_4$ having negative power and being movable along the optical axis, and a fifth lens group $G_5$ having positive power, these lens groups being arranged in that order from the object side. The aperture stop S is arranged between the third lens group $G_3$ and the fourth lens group $G_4$ in such a way that the aperture stop S moves integrally with the fourth lens group $G_4$.

The first lens group $G_1$ is composed of: a lens $L_{11}$ that is a plano-concave lens having negative power with the concave surface thereof facing the image side; and a lens $L_{12}$ that is a plano lens, these lenses being arranged in that order from the object side.

The second lens group $G_2$ is composed of a lens $L_{21}$ that is a meniscus lens having negative power with the concave surface thereof facing the image side.

The third lens group $G_3$ is composed of: a lens $L_{31}$ that is a biconvex lens having positive power; a lens $L_{32}$ that is a biconvex lens having positive power; and a lens $L_{33}$ that is a meniscus lens having negative power with the convex surface thereof facing the image side, these lenses being arranged in that order from the object side. The lens $L_{32}$ and the lens $L_{33}$ are joined to each other.

The fourth lens group $G_4$ is composed of: a lens $L_{41}$ that is a plano-concave lens having negative power with the concave surface thereof facing the image side; and a lens $L_{42}$ that is a meniscus lens having positive power with the concave surface thereof facing the image side, these lenses being arranged in that order from the object side. The lens $L_{41}$ and the lens $L_{42}$ are joined to each other.

The fifth lens group $G_5$ is composed of: a lens $L_{51}$ that is a biconvex lens having positive power; a lens $L_{52}$ that is a biconvex lens having positive power; and a lens $L_{53}$ that is a meniscus lens having negative power with the convex surface thereof facing the image side, these lenses being arranged in that order from the object side. The lens $L_{52}$ and the lens $L_{53}$ are joined to each other.

An amount of variation in magnification per movement of the fourth lens group $G_4$ is larger than an amount of variation in magnification per movement of the second lens group $G_2$ in this objective optical system OL.

This observation apparatus is formed in such a way that movement of the fourth lens group $G_4$ along the optical axis can change the observation state of the objective optical system reversibly and continuously: from the normal observation state in which a plurality of objects to be imaged exist in an observation area; to the close-up observation state in which the objective optical system is closed to a particular object optionally selected from these objects to be imaged by an observer so as to observe the particular object in detail.

In addition, this observation apparatus is formed in such a way that accurate focusing can be performed in every observation state of the objective optical system by moving not only the fourth lens group $G_4$ but also the second lens group $G_2$ along the optical axis.

Next, numerical data on the optical system provided for this observation apparatus is shown.

Numerical Data 5

Unit: mm

Surface data

| Surface No. s | Radius of curvature r | Surface distance d | Refractive index nd | Abbe's number vd |
|---|---|---|---|---|
| 1 | ∞ | 0.36 | 1.88300 | 40.76 |
| 2 | 1.102 | 0.82 | | |
| 3 | ∞ | 0.31 | 1.51400 | 74.00 |
| 4 | ∞ | D4 | | |
| 5 | 8.210 | 0.60 | 1.51742 | 52.43 |
| 6 | 2.334 | D6 | | |
| 7 | 6.426 | 1.00 | 1.51633 | 64.14 |
| 8 | −3.085 | 0.25 | | |
| 9 | 99.199 | 0.90 | 1.77250 | 49.60 |
| 10 | −2.013 | 0.31 | 1.92286 | 18.90 |
| 11 | −3.076 | D11 | | |
| 12 (Stop surface) | ∞ | 0.03 | | |
| 13 | ∞ | 0.28 | 1.48749 | 70.23 |
| 14 | 1.100 | 0.32 | 1.59270 | 35.31 |
| 15 | 1.743 | D15 | | |
| 16 | 2.558 | 1.45 | 1.48749 | 70.23 |
| 17 | −16.397 | 0.16 | | |
| 18 | 2.293 | 1.47 | 1.48749 | 70.23 |
| 19 | −2.029 | 0.40 | 1.92286 | 18.90 |
| 20 | −10.233 | 0.15 | | |
| 21 | ∞ | 0.40 | 1.52300 | 58.50 |
| 22 | ∞ | 0.50 | | |
| 23 | ∞ | 1.60 | 1.51633 | 64.14 |
| 24 (Image plane) | ∞ | | | |

Observation state

| | Normal observation (the farthest point) | Middle observation (the farthest point) | Close-up observation (the farthest point) | Close-up observation (the nearest point) |
|---|---|---|---|---|
| Various data on objective optical system Zoom ratio: 1.30 | | | | |
| Focal length | 0.94 | 1.09 | 1.23 | 1.22 |
| F number | 5.40 | 5.57 | 5.40 | 5.35 |
| Angle of view (2ω) | 142.71 | 101.70 | 76.57 | 76.20 |
| Image height | 0.85 | 0.85 | 0.85 | 0.85 |
| Lens total length (in air) | 13.38 | 13.17 | 12.82 | 12.78 |
| BF (in air) | 1.90 | 1.69 | 1.34 | 1.30 |
| Surface distance | | | | |
| D4 | 0.53 | 0.53 | 0.53 | 0.50 |
| D6 | 0.40 | 0.40 | 0.40 | 0.43 |
| D11 | 0.15 | 0.91 | 1.73 | 1.73 |
| D15 | 1.74 | 0.98 | 0.16 | 0.16 |

Data on lens groups

| Group | The first surface of lens group | Focal length |
|---|---|---|
| 1 | 1 | −1.25 |
| 2 | 5 | −6.53 |
| 3 | 7 | 2.45 |
| 4 | 13 | −4.20 |
| 5 | 16 | 3.08 |

Data on conditions

Condition (1): $3 < (m_{c-d}/m_{u-d})/(m_{c-n}/m_{c-d}) < 10$: 6.66717
Condition (2): $1 < m_{c-n}/m_{c-d} < 1.55$: 1.0699
Condition (3): $0.2 < |(1 - \beta_1 \cdot \beta_1) \times \beta_1' \cdot \beta_1'| < 3$: 1.515007
Condition (4): $2 < |F_1/F_{c-d}| < 8$: 5.316049
Condition (5): $1.8 < |F_2/F_{c-d}| < 5$: 3.422266
Condition (6): $0.02 < D_1/L < 0.12$: 0.056617

-continued

Unit: mm

Condition (7): $|DT_{c-n} - DT_{c-d}| < 5$: 0.70351
Condition (8): $DT_{u-d} < -50$: −67.9774
Condition (9): $Fno_u/Fno_c > 0.94$: 1.000205

Embodied Example 8

An observation apparatus provided with an objective optical system according to Embodied Example 8 is explained in detail using FIGS. 13A-13C and 14A-14L, below.

Figure 13A:
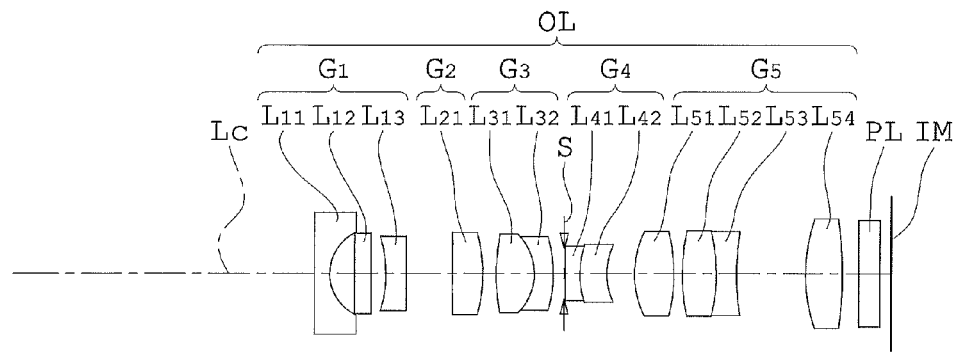
FIGS. 13A to 13C are sectional views taken along the optical axis for showing the configuration of the optical system provided for the observation apparatus according to Embodied Example 8, where
Figure 13B:
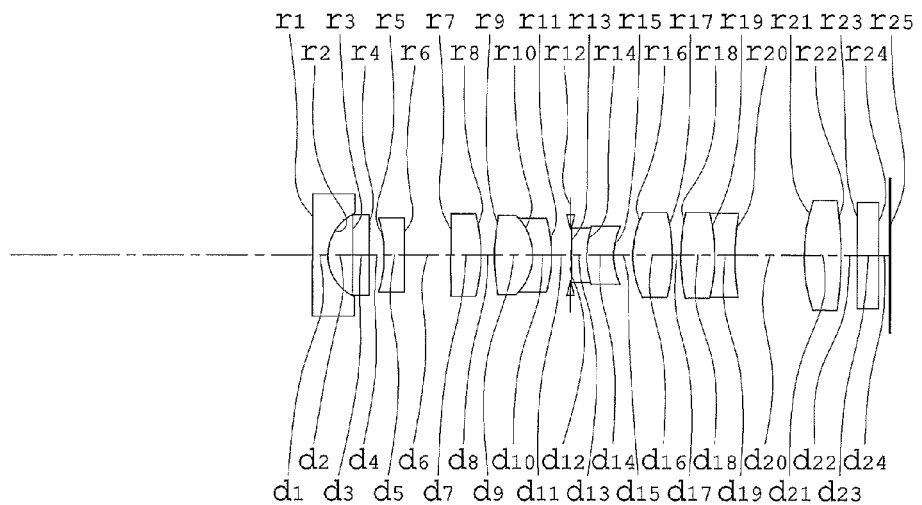
Figure 13C:
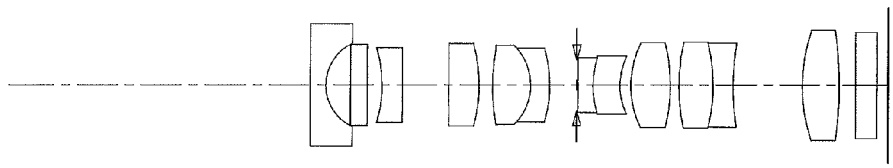

FIGS. 13A to 13C are sectional views taken along the optical axis for showing the configuration of the optical system provided for this observation apparatus, where FIG. 13A shows the normal observation state of the optical system (in the farthest point state), FIG. 13B shows the middle state of the optical system (in the farthest point state), and FIG. 13C shows the close-up observation state of the optical system (in the farthest point state). FIGS. 14A to 14L are aberration diagrams showing spherical aberration, astigmatism, distortion, and chromatic aberration of magnification in the optical system shown in FIGS. 13A-13C. To be specific, FIGS. 14A to 14D show the aberrations in the normal observation state of the optical system (in the farthest point state), FIGS. 14E to 14H show the aberrations in the middle state of the optical system (in the farthest point state), and FIGS. 14I to 14L show the aberrations in the close-up observation state of the optical system (in the farthest point state).

As shown in FIGS. 13A-13C, this observation apparatus includes: an optical system which includes an objective optical system OL and a plano lens PL arranged on the image side of the objective optical system OL and substantially having no refractive power; an aperture stop S arranged in the objective optical system OL; and an image pickup element like CCD for which only its image plane IM is shown in FIGS. 13A-13C. All of these components are arranged on the optical axis Lc.

The objective optical system OL is composed of a first lens group $G_1$ having negative power, a second lens group $G_2$ having positive power and being movable along the optical axis, a third lens group $G_3$ having positive power, a fourth lens group $G_4$ having negative power and being movable along the optical axis, and a fifth lens group $G_5$ having positive power, these lens groups being arranged in that order from the object side. The aperture stop S is arranged between the third lens group $G_3$ and the fourth lens group $G_4$ in such a way that the aperture stop S moves integrally with the fourth lens group $G_4$.

The first lens group $G_1$ is composed of: a lens $L_{11}$ that is a plano-concave lens having negative power with the concave surface thereof facing the image side; a lens $L_{12}$ that is a plano lens; and a lens $L_{13}$ that is a biconcave lens having negative power, these lenses being arranged in that order from the object side.

The second lens group $G_2$ is composed of a lens $L_{21}$ that is a biconvex lens having positive power.

The third lens group $G_3$ is composed of: a lens $L_{31}$ that is a biconvex lens having positive power; and a lens $L_{32}$ that is a meniscus lens having negative power with the convex surface thereof facing the image side, these lenses being arranged in that order from the object side. The lens $L_{31}$ and the lens $L_{32}$ are joined to each other.

The fourth lens group $G_4$ is composed of: a lens $L_{41}$ that is a plano-concave lens having negative power with the concave surface thereof facing the image side; and a lens $L_{42}$ that is a meniscus lens having negative power with the concave surface thereof facing the image side, these lenses being arranged in that order from the object side. The lens $L_{41}$ and the lens $L_{42}$ are joined to each other.

The fifth lens group $G_5$ is composed of: a lens $L_{51}$ that is a biconvex lens having positive power; a lens $L_{52}$ that is a biconvex lens having positive power; a lens $L_{53}$ that is a biconcave lens having negative power; and a lens $L_{54}$ that is a biconvex lens having positive power, these lenses being arranged in that order from the object side. The lens $L_{52}$ and the lens $L_{53}$ are joined to each other.

An amount of variation in magnification per movement of the fourth lens group $G_4$ is larger than an amount of variation in magnification per movement of the second lens group $G_2$ in this objective optical system OL.

This observation apparatus is formed in such a way that movement of the fourth lens group $G_4$ along the optical axis can change the observation state of the objective optical system reversibly and continuously: from the normal observation state in which a plurality of objects to be imaged exist in an observation area; to the close-up observation state in which the objective optical system is closed to a particular object optionally selected from these objects to be imaged by an observer so as to observe the particular object in detail.

In addition, this observation apparatus is formed in such a way that accurate focusing can be performed in every observation state of the objective optical system by moving not only the fourth lens group $G_4$ but also the second lens group $G_2$ along the optical axis.

Next, numerical data on the optical system provided for this observation apparatus is shown.

Numerical Data 6

Unit: mm

Surface data

| Surface No. s | Radius of curvature r | Surface distance d | Refractive index nd | Abbe's number vd |
|---|---|---|---|---|
| 1 | ∞ | 0.28 | 1.88300 | 40.76 |
| 2 | 0.844 | 0.47 | | |
| 3 | ∞ | 0.31 | 1.51400 | 74.00 |
| 4 | ∞ | 0.28 | | |
| 5 | −2.357 | 0.38 | 1.60342 | 38.03 |
| 6 | 223.221 | D6 | | |
| 7 | 51.662 | 0.57 | 1.51633 | 64.14 |
| 8 | −2.800 | D8 | | |
| 9 | 4.119 | 0.71 | 1.75520 | 27.51 |
| 10 | −1.027 | 0.36 | 1.92286 | 18.90 |
| 11 | −2.339 | D11 | | |
| 12 (Stop surface) | ∞ | 0.02 | | |
| 13 | ∞ | 0.28 | 1.48749 | 70.23 |
| 14 | 1.742 | 0.50 | 1.59270 | 35.31 |
| 15 | 1.256 | D15 | | |
| 16 | 1.789 | 0.69 | 1.48749 | 70.23 |
| 17 | −3.243 | 0.11 | | |
| 18 | 3.759 | 0.63 | 1.48749 | 70.23 |
| 19 | −3.178 | 0.36 | 1.92286 | 18.90 |
| 20 | 4.753 | 1.31 | | |
| 21 | 3.283 | 0.69 | 1.58313 | 59.38 |
| 22 | −7.262 | 0.30 | | |
| 23 | ∞ | 0.40 | 1.52300 | 58.50 |
| 24 | ∞ | 0.20 | | |
| 25 (Image plane) | ∞ | | | |

-continued

Unit: mm

Observation state

|  | Normal observation (the farthest point) | Middle observation (the farthest point) | Close-up observation (the farthest point) | Close-up observation (the nearest point) |
|---|---|---|---|---|
| Various data on objective optical system Zoom ratio: 1.09 | | | | |
| Focal length | 0.88 | 0.92 | 0.96 | 0.95 |
| F number | 5.08 | 5.10 | 5.07 | 5.03 |
| Angle of view (2ω) | 147.14 | 129.01 | 115.33 | 115.72 |
| Image height | 0.85 | 0.85 | 0.85 | 0.85 |
| Lens total length (in air) | 10.46 | 10.30 | 10.12 | 10.05 |
| BF (in air) | 0.69 | 0.54 | 0.35 | 0.28 |
| Surface distance | | | | |
| D6 | 0.87 | 0.87 | 0.87 | 0.91 |
| D8 | 0.25 | 0.25 | 0.25 | 0.20 |
| D11 | 0.20 | 0.35 | 0.52 | 0.52 |
| D15 | 0.51 | 0.36 | 0.20 | 0.20 |

Data on lens groups

| Group | The first surface of lens group | Focal length |
|---|---|---|
| 1 | 1 | −0.64 |
| 2 | 7 | 5.16 |
| 3 | 9 | 2.53 |
| 4 | 13 | −2.49 |
| 5 | 16 | 2.94 |

Data on conditions

Condition (1): $3 < (m_{c-d}/m_{u-d})/(m_{c-n}/m_{c-d}) < 10$: 4.61297
Condition (2): $1 < m_{c-n}/m_{c-d} < 1.55$: 1.1953
Condition (3): $0.2 < |(1 − \beta_1 \cdot \beta_1) \times \beta_1' \cdot \beta_1'| < 3$: 1.9016
Condition (4): $2 < |F_1/F_{c-d}| < 8$: 5.101347822
Condition (5): $1.8 < |F_2/F_{c-d}| < 5$: 2.59931
Condition (6): $0.02 < D_1/L < 0.12$: 0.100967389
Condition (7): $|DT_{c-n} − DT_{c-d}| < 5$: 2.08875
Condition (8): $DT_{u-d} < −50$: −70.0075
Condition (9): $Fno_u/Fno_c > 0.94$: 1.00279

Embodied Example 9

An observation apparatus provided with an objective optical system according to Embodied Example 9 is explained in detail using FIGS. 15A-15C and 16A-16L, below.

Figure 15A:
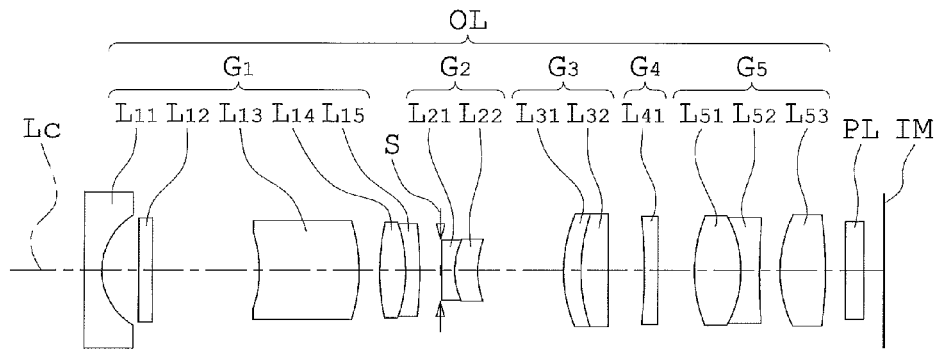
FIGS. 15A to 15C are sectional views taken along the optical axis for showing the configuration of the optical system provided for the observation apparatus according to Embodied Example 9, where
Figure 15B:
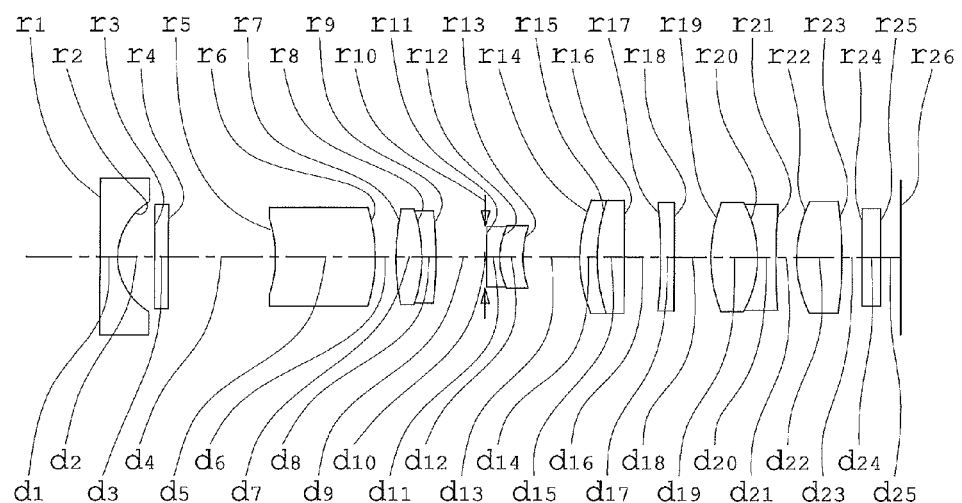
Figure 15C:
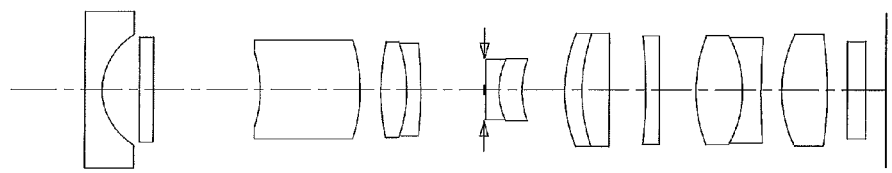
Figure 16A:
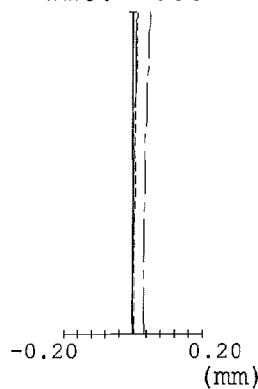
FIGS. 16A to 16L are aberration diagrams showing spherical aberration, astigmatism, distortion, and chromatic aberration of magnification in the optical system shown in FIGS. 15A-15C. To be specific.
Figure 16B:
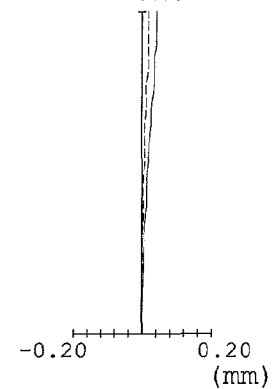
Figure 16C:
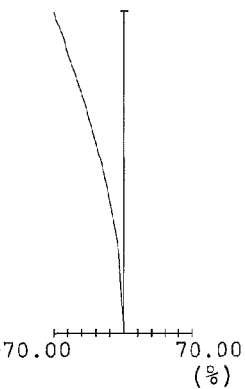
Figure 16D:
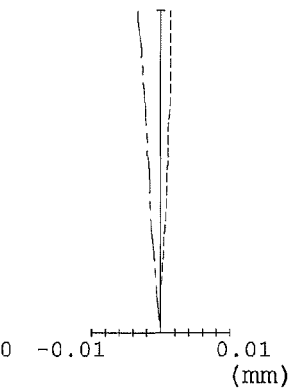
Figure 16E:
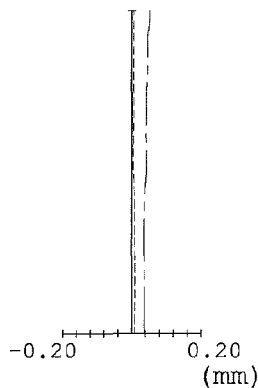
Figure 16F:
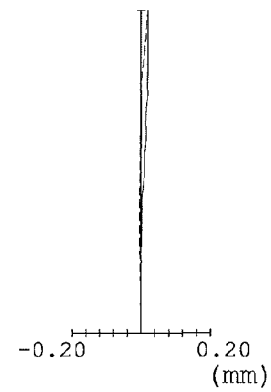
Figure 16G:
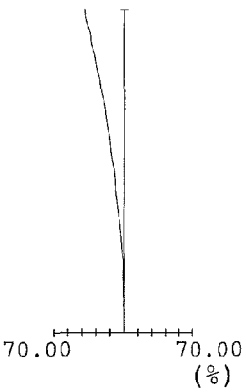
Figure 16H:
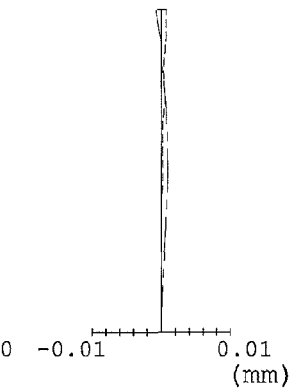
Figure 16I:
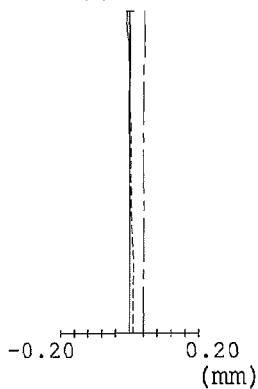
Figure 16J:
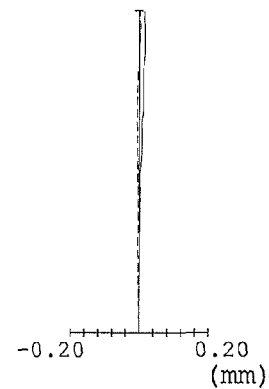
Figure 16K:
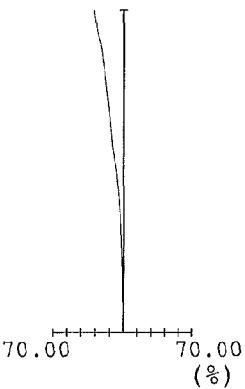
Figure 16L:
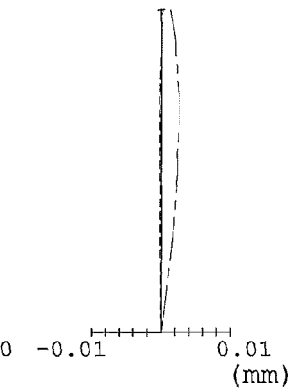

FIGS. 15A to 15C are sectional views taken along the optical axis for showing the configuration of the optical system provided for this observation apparatus, where FIG. 15A shows the normal observation state of the optical system (in the farthest point state), FIG. 15B shows the middle state of the optical system (in the farthest point state), and FIG. 15C shows the close-up observation state of the optical system (in the farthest point state). FIGS. 16A to 16L are aberration diagrams showing spherical aberration, astigmatism, distortion, and chromatic aberration of magnification in the optical system shown in FIGS. 15A-15C. To be specific, FIGS. 16A to 16D show the aberrations in the normal observation state of the optical system (in the farthest point state), FIGS. 16E to 16H show the aberrations in the middle state of the optical system (in the farthest point state), and FIGS. 16I to 16L show the aberrations in the close-up observation state of the optical system (in the farthest point state).

As shown in FIGS. 15A-15C, this observation apparatus includes: an optical system which includes an objective optical system OL and a plano lens PL arranged on the image side of the objective optical system OL and substantially having no refractive power; an aperture stop S arranged in the objective optical system OL; and an image pickup element like CCD for which only its image plane IM is shown in FIGS. 15A-15C. All of these components are arranged on the optical axis Lc.

The objective optical system OL is composed of a first lens group $G_1$ having positive power and being immovable in magnification change and in focusing, a second lens group $G_2$ that is a magnification-changing group having negative power and being moved along the optical axis at least in magnification change, a third lens group $G_3$ having positive power and being immovable in magnification change and in focusing, a fourth lens group $G_4$ that is a focusing group having negative power and being moved along the optical axis at least in focusing, and a fifth lens group $G_5$ having positive power and being immovable in magnification change and in focusing, these lens groups being arranged in that order from the object side. The aperture stop S is arranged between the first lens group $G_1$ and the second lens group $G_2$ in such a way that the aperture stop S moves integrally with the second lens group $G_2$.

The first lens group $G_1$ is composed of: a lens $L_{11}$ that is a plano-concave lens having negative power with the concave surface thereof facing the image side; a lens $L_{12}$ that is a plano lens; a lens $L_{13}$ that is a meniscus lens having negative power with the convex surface thereof facing the image side; and a lens $L_{14}$ that is a biconvex lens having positive power; and a lens $L_{15}$ that is a meniscus lens having negative power with the convex surface thereof facing the image side, these lenses being arranged in that order is from the object side. The lens $L_{14}$ and the lens $L_{15}$ are joined to each other.

The second lens group $G_2$ is composed of: a lens $L_{21}$ that is a plano-concave lens having negative power with the concave surface thereof facing the image side; and a lens $L_{22}$ that is a meniscus lens having positive power with the concave surface thereof facing the image side, these lenses being arranged in that order from the object side. The lens $L_{21}$ and the lens $L_{22}$ are joined to each other.

The third lens group $G_3$ is composed of: a lens $L_{31}$ that is a meniscus lens having positive power with the concave surface thereof facing the image side; and a lens $L_{32}$ that is a plano-convex lens having positive power with the planar surface thereof facing the image side, these lenses being arranged in that order from the object side. The lens $L_{31}$ and the lens $L_{32}$ are joined to each other.

The fourth lens group $G_4$ is composed of a lens $L_{41}$ that is a plano-concave lens having negative power with the planar surface thereof facing the image side.

The fifth lens group $G_5$ is composed of: a lens $L_{51}$ that is a biconvex lens having positive power; a lens $L_{52}$ that is a biconcave lens having negative power; and a lens $L_{53}$ that is a biconvex lens having positive power, these lenses being arranged in that order from the object side. The lens $L_{51}$ and the lens $L_{52}$ are joined to each other.

An amount of variation in magnification per movement of the second lens group $G_2$ is larger than an amount of variation in magnification per movement of the fourth lens group $G_4$ in this objective optical system OL.

This observation apparatus is formed in such a way that movement of the second lens group $G_2$ along the optical axis can change the observation state of the objective optical system reversibly and continuously: from the normal observation state in which a plurality of objects to be imaged exist in an observation area; to the close-up observation state in which the objective optical system is closed to a particular object optionally selected from these objects to be imaged by an observer so as to observe the particular object in detail.

In addition, this observation apparatus is formed in such a way that accurate focusing can be performed in every observation state of the objective optical system by moving not only the second lens group $G_2$ but also the fourth lens group $G_4$ along the optical axis.

Next, numerical data on the optical system provided for this observation apparatus is shown.

Numerical Data 7

Unit: mm

Surface data

| Surface No. s | Radius of curvature r | Surface distance d | Refractive index nd | Abbe's number vd |
|---|---|---|---|---|
| 1 | ∞ | 0.36 | 1.88300 | 40.76 |
| 2 | 1.399 | 0.82 | | |
| 3 | ∞ | 0.31 | 1.51400 | 73.43 |
| 4 | ∞ | 2.35 | | |
| 5 | −2.625 | 2.19 | 1.80518 | 25.42 |
| 6 | −3.543 | 0.45 | | |
| 7 | 4.856 | 0.58 | 1.77250 | 49.60 |
| 8 | −3.173 | 0.31 | 1.92286 | 18.90 |
| 9 | −9.570 | D9 | | |
| 10 (Stop surface) | ∞ | 0.03 | | |
| 11 | ∞ | 0.28 | 1.48749 | 70.23 |
| 12 | 1.604 | 0.50 | 1.59270 | 35.31 |
| 13 | 2.024 | D13 | | |
| 14 | 3.170 | 0.38 | 1.72916 | 54.68 |
| 15 | 3.902 | 0.60 | 1.83481 | 42.71 |
| 16 | ∞ | D16 | | |
| 17 | −11.197 | 0.30 | 1.69680 | 55.53 |
| 18 | ∞ | D18 | | |
| 19 | 3.397 | 1.01 | 1.48749 | 70.23 |
| 20 | −2.500 | 0.40 | 1.92286 | 18.90 |
| 21 | 18.034 | 0.45 | | |
| 22 | 2.784 | 1.00 | 1.51633 | 64.14 |
| 23 | −9.018 | 0.45 | | |
| 24 | ∞ | 0.40 | 1.52300 | 58.50 |
| 25 | ∞ | 0.45 | | |
| 26 (Image plane) | ∞ | | | |

Observation state

| | Normal observation (the farthest point) | Middle observation (the farthest point) | Close-up observation (the farthest point) | Close-up observation (the nearest point) |
|---|---|---|---|---|
| Various data on objective optical system Zoom ratio: 1.21 | | | | |
| Focal length | 0.95 | 1.08 | 1.15 | 1.15 |
| F number | 4.35 | 4.54 | 4.61 | 4.61 |
| Angle of view (2ω) | 144.13 | 111.20 | 99.28 | 99.15 |
| Image height | 0.85 | 0.85 | 0.85 | 0.85 |
| Total length (in air) | 17.31 | 17.11 | 16.96 | 16.91 |
| BF (in air) | 1.11 | 0.91 | 0.76 | 0.71 |
| Surface distance | | | | |
| D9 | 0.45 | 1.04 | 1.37 | 1.37 |
| D13 | 1.84 | 1.24 | 0.91 | 0.91 |
| D16 | 0.80 | 0.80 | 0.80 | 0.95 |
| D18 | 0.80 | 0.80 | 0.80 | 0.65 |

-continued

Unit: mm

Data on lens groups

| Group | The first surface of lens group | Focal length |
|---|---|---|
| 1 | 1 | 1.55 |
| 2 | 11 | −4.51 |
| 3 | 14 | 3.89 |
| 4 | 17 | −16.00 |
| 5 | 19 | 6.26 |

Data on conditions

Condition (10): $3 < (m_{c-d}/m_{u-d})/(m_{c-n}/m_{c-d}) < 11$: 5.915
Condition (11): $|ADT_f| < 2$: 0.1583
Condition (12): $0.2 < |(1 - \beta_f \cdot \beta_f) \times \beta_f' \cdot \beta_r'| < 0.9$: 0.3548
Condition (13): $1 < |m_{c-n}/m_{c-d}| < 2$: 1.134
Condition (14): $0.7 < |F_f/F_v| < 8$: 3.545
Condition (15): $|\gamma| < 11.5$: 8.860
Condition (16): $|DT_{c-n} - DT_{c-d}| < 5$: 1.470
Condition (17): $DT_{u-d} < -50$: −62.34
Condition (18): $2 < |F_f/F_{c-d}| < 15$: 13.90
Condition (19): $0.83 < Fno_u/Fno_c$: 0.943

Embodied Example 10

An observation apparatus provided with an objective optical system according to Embodied Example 10 is explained in detail using FIGS. 17A-17C and 18A-18L, below.

Figure 17A:
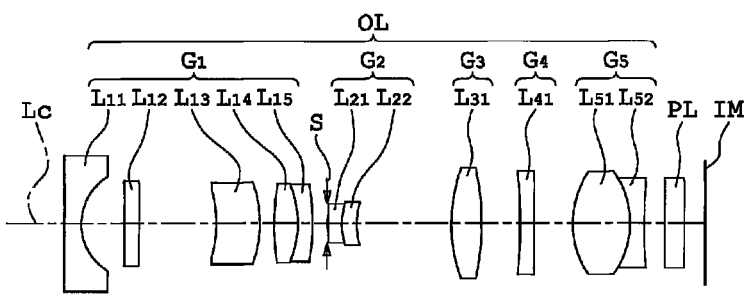
FIGS. 17A to 17C are sectional views taken along the optical axis for showing the configuration of the optical system provided for the observation apparatus according to Embodied Example 10, where
Figure 17B:
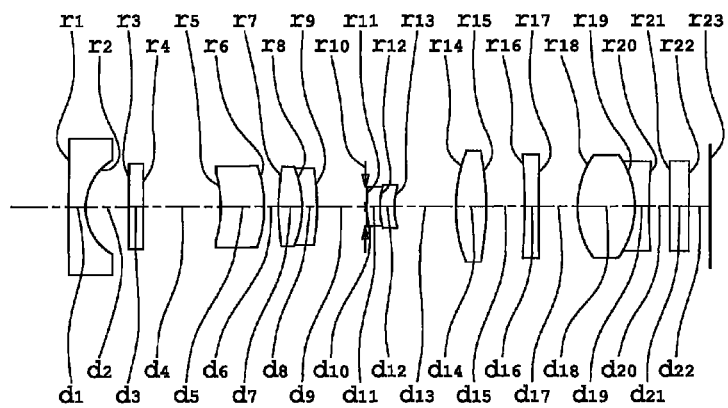
Figure 17C:
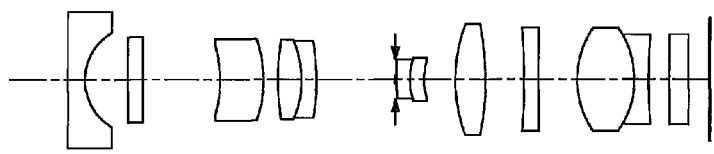
Figure 18A:
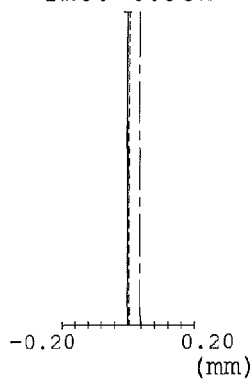
FIGS. 18A to 18L are aberration diagrams showing spherical aberration, astigmatism, distortion, and chromatic aberration of magnification in the optical system shown in FIGS. 17A-17C. To be specific.
Figure 18B:
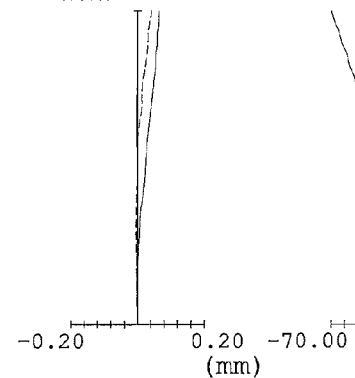
Figure 18C:
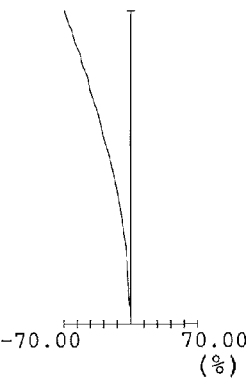
Figure 18D:
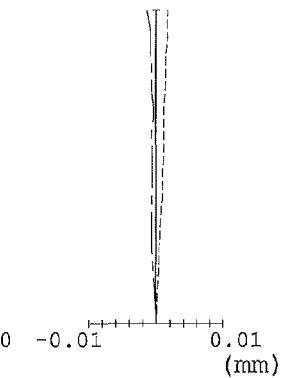
Figure 18E:
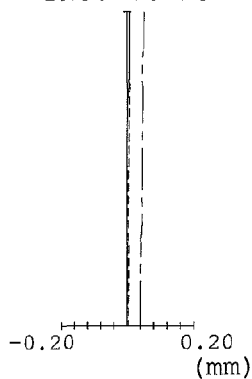
Figure 18F:
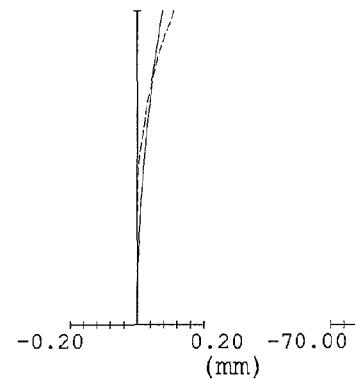
Figure 18G:
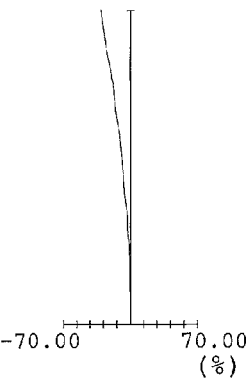
Figure 18H:
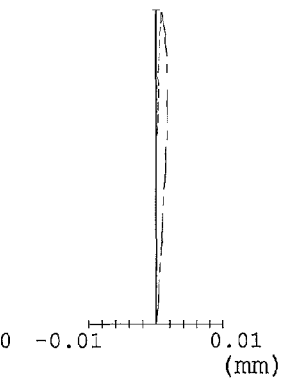
Figure 18I:
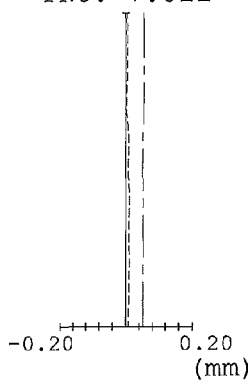
Figure 18J:
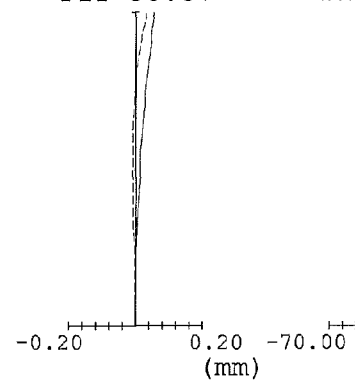
Figure 18K:
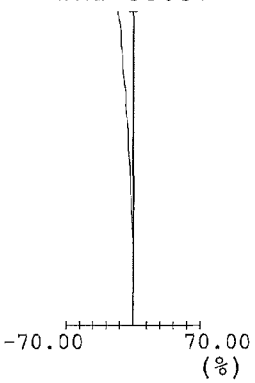
Figure 18L:
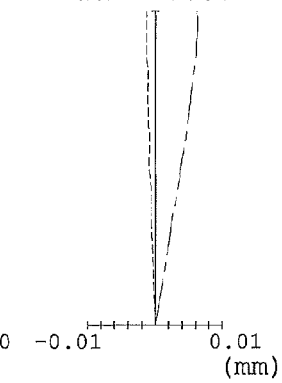

FIGS. 17A to 17C are sectional views taken along the optical axis for showing the configuration of the optical system provided for this observation apparatus, where FIG. 17A shows the normal observation state of the optical system (in the farthest point state), FIG. 17B shows the middle state of the optical system (in the farthest point state), and FIG. 17C shows the close-up observation state of the optical system (in the farthest point state). FIGS. 18A to 18L are aberration diagrams showing spherical aberration, astigmatism, distortion, and chromatic aberration of magnification in the optical system shown in FIGS. 17A-17C. To be specific, FIGS. 18A to 18D show the aberrations in the normal observation state of the optical system (in the farthest point state), FIGS. 18E to 18H show the aberrations in the middle state of the optical system (in the farthest point state), and FIGS. 18I to 18L show the aberrations in the close-up observation state of the optical system (in the farthest point state).

As shown in FIGS. 17A-17C, this observation apparatus includes: an optical system which includes an objective optical system OL and a plano lens PL arranged on the image side of the objective optical system OL and substantially having no refractive power; an aperture stop S arranged in the objective optical system OL; and an image pickup element like CCD for which only its image plane IM is shown in FIGS. 17A-17C. All of these components are arranged on the optical axis Lc.

The objective optical system OL is composed of a first lens group $G_1$ having positive power and being immovable in magnification change and in focusing, a second lens group $G_2$ that is a magnification-changing group having negative power and being moved along the optical axis at least in magnification change, a third lens group $G_3$ having positive power and being immovable in magnification change and in focusing, a fourth lens group $G_4$ that is a focusing group having negative power and being moved along the optical axis at least in focusing, and a fifth lens group $G_5$ having positive power and being immovable in magnification change and in focusing, these lens groups being arranged in that order from the object side. The aperture stop S is arranged between the first lens group $G_1$ and the second lens group $G_2$ in such a way that the aperture stop S moves integrally with the second lens group $G_2$.

The first lens group $G_1$ is composed of: a lens $L_{11}$ that is a plano-concave lens having negative power with the concave surface thereof facing the image side; a lens $L_{12}$ that is a plano lens; a lens $L_{13}$ that is a meniscus lens having negative power with the convex surface thereof facing the image side; a lens $L_{14}$ that is a biconvex lens having positive power; and a lens $L_{15}$ that is a meniscus lens having negative power with the convex surface thereof facing the image side, these lenses being arranged in that order from the object side. The lens $L_{14}$ and the lens $L_{15}$ are joined to each other.

The second lens group $G_2$ is composed of: a lens $L_{21}$ that is a plano-concave lens having negative power with the concave surface thereof facing the image side; and a lens $L_{22}$ that is a meniscus lens having positive power with the concave surface thereof facing the image side, these lenses being arranged in that order from the object side. The lens $L_{21}$ and the lens $L_{22}$ are joined to each other.

The third lens group $G_3$ is composed of a lens $L_{31}$ that is a biconvex lens having positive power.

The fourth lens group $G_4$ is composed of a lens $L_{41}$ that is a plano-concave lens having negative power with the planar surface thereof facing the image side.

The fifth lens group $G_5$ is composed of: a lens $L_{51}$ that is a biconvex lens having positive power; and a lens $L_{52}$ that is a biconcave lens having negative power, these lenses being arranged in that order from the object side. The lens $L_{51}$ and the lens $L_{52}$ are joined to each other.

An amount of variation in magnification per movement of the second lens group $G_2$ is larger than an amount of variation in magnification per movement of the fourth lens group $G_4$ in this objective optical system OL.

This observation apparatus is formed in such a way that movement of the second lens group $G_2$ along the optical axis can change the observation state of the objective optical system reversibly and continuously: from the normal observation state in which a plurality of objects to be imaged exist in an observation area; to the close-up observation state in which the objective optical system is closed to a particular object optionally selected from these objects to be imaged by an observer so as to observe the particular object in detail.

In addition, this observation apparatus is formed in such a way that accurate focusing can be performed in every observation state of the objective optical system by moving not only the second lens group $G_2$ but also the fourth lens group $G_4$ along the optical axis.

Next, numerical data on the optical system provided for this observation apparatus is shown.

Numerical Data 8

Unit: mm

Surface data

| Surface No. s | Radius of curvature r | Surface distance d | Refractive index nd | Abbe's number vd |
|---|---|---|---|---|
| 1 | ∞ | 0.36 | 1.88300 | 40.76 |
| 2 | 1.150 | 0.92 | | |
| 3 | ∞ | 0.31 | 1.51400 | 73.43 |
| 4 | ∞ | 1.61 | | |
| 5 | −2.474 | 0.92 | 2.00330 | 28.27 |

-continued

Unit: mm

| | | | | |
|---|---|---|---|---|
| 6 | −2.550 | 0.30 | | |
| 7 | 5.716 | 0.49 | 1.77250 | 49.60 |
| 8 | −2.164 | 0.31 | 1.92286 | 18.90 |
| 9 | −4.682 | D9 | | |
| 10 (Stop surface) | ∞ | 0.03 | | |
| 11 | ∞ | 0.28 | 1.48749 | 70.23 |
| 12 | 1.563 | 0.31 | 1.59270 | 35.31 |
| 13 | 1.620 | D13 | | |
| 14 | 3.341 | 0.64 | 1.72916 | 54.68 |
| 15 | −5.776 | D15 | | |
| 16 | −12.502 | 0.30 | 1.92286 | 20.88 |
| 17 | ∞ | D17 | | |
| 18 | 1.940 | 1.21 | 1.48749 | 70.23 |
| 19 | −1.866 | 0.30 | 1.92286 | 18.90 |
| 20 | 12.584 | 0.44 | | |
| 21 | ∞ | 0.40 | 1.52300 | 58.50 |
| 22 | ∞ | 0.44 | | |
| 23 (Image plane) | ∞ | | | |

Observation state

| | Normal observation (the farthest point) | Middle observation (the farthest point) | Close-up observation (the farthest point) | Close-up observation (the nearest point) |
|---|---|---|---|---|
| Various data on objective optical system Zoom ratio: 1.30 | | | | |
| Focal length | 0.91 | 1.07 | 1.19 | 1.14 |
| F number | 6.95 | 7.22 | 7.01 | 6.72 |
| Angle of view (2ω) | 145.49 | 99.99 | 76.74 | 76.64 |
| Image height | 0.85 | 0.85 | 0.85 | 0.85 |
| Total length (in air) | 13.30 | 13.09 | 12.77 | 12.63 |
| BF (in air) | 1.08 | 0.87 | 0.56 | 0.42 |
| Surface distance | | | | |
| D9 | 0.30 | 0.99 | 1.65 | 1.65 |
| D13 | 2.03 | 1.33 | 0.68 | 0.68 |
| D15 | 0.80 | 0.80 | 0.80 | 1.28 |
| D17 | 0.80 | 0.80 | 0.80 | 0.32 |

Data on lens groups

| Group | The first surface of lens group | Focal length |
|---|---|---|
| 1 | 1 | 1.52 |
| 2 | 11 | −3.39 |
| 3 | 14 | 2.98 |
| 4 | 16 | −13.40 |
| 5 | 18 | 244.00 |

Data on conditions

Condition (10): $3 < (m_{c\text{-}d}/m_{u\text{-}d})/(m_{c\text{-}n}/m_{c\text{-}d}) < 11$: 5.499
Condition (11): $|ADT_f| < 2$: 1.407
Condition (12): $0.2 < |(1 - \beta_f \cdot \beta_f) \times \beta_f' \cdot \beta_f'| < 0.9$: 0.4301
Condition (13): $1 < |m_{c\text{-}n}/m_{c\text{-}d}| < 2$: 1.28
Condition (14): $0.7 < |F_f/F_v| < 8$: 3.946
Condition (15): $|\gamma| < 11.5$: 9.450
Condition (16): $|DT_{c\text{-}n} - DT_{c\text{-}d}| < 5$: 2.003
Condition (17): $DT_{u\text{-}d} < -50$: −61.39
Condition (18): $2 < |F_f/F_{c\text{-}d}| < 15$: 11.29
Condition (19): $0.83 < Fno_u/Fno_c$: 0.991

Embodied Example 11

An observation apparatus provided with an objective optical system according to Embodied Example 11 is explained in detail using FIGS. 19A-19C and 20A-20L, below.

Figure 19A:
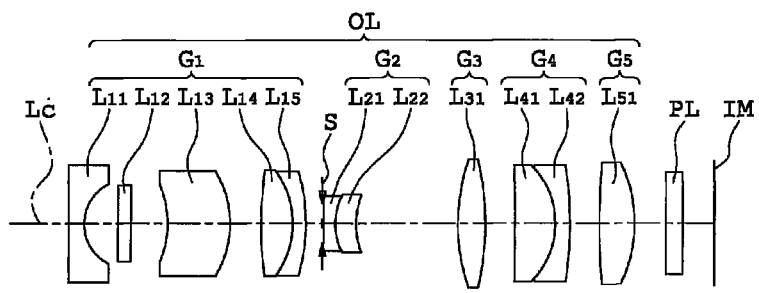
FIGS. 19A to 19C are sectional views taken along the optical axis for showing the configuration of the optical system provided for the observation apparatus according to Embodied Example 11, where
Figure 19B:
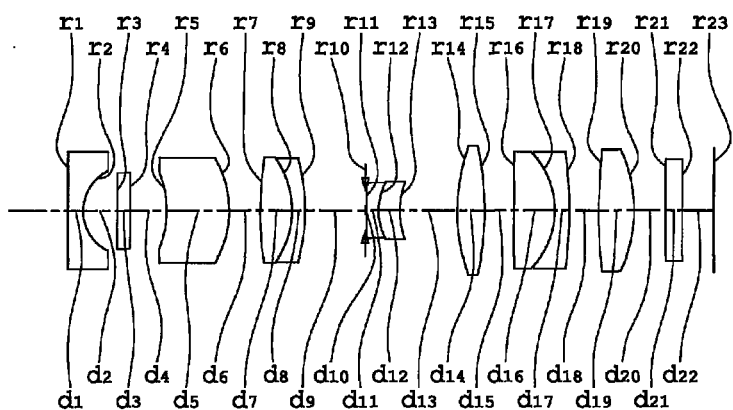
Figure 19C:
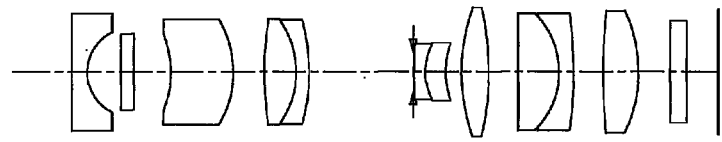

FIGS. 19A to 19C are sectional views taken along the optical axis for showing the configuration of the optical system provided for this observation apparatus, where FIG. 19A shows the normal observation state of the optical system (in the farthest point state), FIG. 19B shows the middle state of the optical system (in the farthest point state), and FIG. 19C shows the close-up observation state of the optical system (in the farthest point state). FIGS. 20A to 20L are aberration diagrams showing spherical aberration, astigmatism, distortion, and chromatic aberration of magnification in the optical system shown in FIGS. 19A-19C. To be specific, FIGS. 20A to 20D show the aberrations in the normal observation state of the optical system (in the farthest point state), FIGS. 20E to 20H show the aberrations in the middle state of the optical system (in the farthest point state), and FIGS. 20I to 20L show the aberrations in the close-up observation state of the optical system (in the farthest point state).

As shown in FIGS. 19A-19C, this observation apparatus includes: an optical system which includes an objective optical system OL and a plano lens PL arranged on the image side of the objective optical system OL and substantially having no refractive power; an aperture stop S arranged in the objective optical system OL; and an image pickup element like CCD for which only its image plane IM is shown in FIGS. 19A-19C. All of these components are arranged on the optical axis Lc.

The objective optical system OL is composed of a first lens group $G_1$ having positive power and being immovable in magnification change and in focusing, a second lens group $G_2$ that is a magnification-changing group having negative power and being moved along the optical axis at least in magnification change, a third lens group $G_3$ having positive power and being immovable in magnification change and in focusing, a fourth lens group $G_4$ that is a focusing group having negative power and being moved along the optical axis at least in focusing, and a fifth lens group $G_5$ having positive power and being immovable in magnification change and in focusing, these lens groups being arranged in that order from the object side. The aperture stop S is arranged between the first lens group $G_1$ and the second lens group $G_2$ in such a way that the aperture stop S moves integrally with the second lens group $G_2$.

The first lens group $G_1$ is composed of: a lens $L_{11}$ that is a plano-concave lens having negative power with the concave surface thereof facing the image side; a lens $L_{12}$ that is a plano lens; a lens $L_{13}$ that is a meniscus lens having negative power with the convex surface thereof facing the image side; a lens $L_{14}$ that is a biconvex lens having positive power; and a lens $L_{15}$ that is a meniscus lens having negative power with the convex surface thereof facing the image side, these lenses being arranged in that order from the object side. The lens $L_{14}$ and the lens $L_{15}$ are joined to each other.

The second lens group $G_2$ is composed of: a lens $L_{21}$ that is a plano-concave lens having negative power with the concave surface thereof facing the image side; and a lens $L_{22}$ that is a meniscus lens having positive power with the concave surface thereof facing the image side, these lenses being arranged in that order from the object side. The lens $L_{21}$ and the lens $L_{22}$ are joined to each other.

The third lens group $G_3$ is composed of a lens $L_{31}$ that is a biconvex lens having positive power.

The fourth lens group $G_4$ is composed of: a lens $L_{41}$ that is a meniscus lens having positive power with the convex surface thereof facing the image side; and a lens $L_{42}$ that is a meniscus lens having negative power with the convex surface thereof facing the image side, these lenses being arranged in that order from the object side. The lens $L_{41}$ and the lens $L_{42}$ are joined to each other.

The fifth lens group $G_5$ is composed of a lens $L_{51}$ that is a biconvex lens having positive power.

An amount of variation in magnification per movement of the second lens group $G_2$ is larger than an amount of variation in magnification per movement of the fourth lens group $G_4$ in this objective optical system OL.

This observation apparatus is formed in such a way that movement of the second lens group $G_2$ along the optical axis can change the observation state of the objective optical system reversibly and continuously: from the normal observation state in which a is plurality of objects to be imaged exist in an observation area; to the close-up observation state in which the objective optical system is closed to a particular object optionally selected from these objects to be imaged by an observer so as to observe the particular object in detail.

In addition, this observation apparatus is formed in such a way that accurate focusing can be performed in every observation state of the objective optical system by moving not only the second lens group $G_2$ but also the fourth lens group $G_4$ along the optical axis.

Next, numerical data on the optical system provided for this observation apparatus is shown.

Numerical Data 9

| | | | | |
|---|---|---|---|---|
| | Unit: mm | | | |
| | Surface data | | | |
| Surface No. s | Radius of curvature r | Surface distance d | Refractive index nd | Abbe's number vd |
| 1 | ∞ | 0.36 | 1.88300 | 40.76 |
| 2 | 1.063 | 0.82 | | |
| 3 | ∞ | 0.31 | 1.51400 | 73.43 |
| 4 | ∞ | 0.89 | | |
| 5 | −2.353 | 1.49 | 1.80518 | 25.42 |
| 6 | −2.463 | 0.74 | | |
| 7 | 8.957 | 0.77 | 1.77250 | 49.60 |
| 8 | −2.138 | 0.31 | 1.92286 | 18.90 |
| 9 | −4.723 | D9 | | |
| 10 (Stop surface) | ∞ | 0.03 | | |
| 11 | ∞ | 0.28 | 1.48749 | 70.23 |
| 12 | 1.463 | 0.50 | 1.59270 | 35.31 |
| 13 | 2.056 | D13 | | |
| 14 | 4.429 | 0.66 | 1.83481 | 42.71 |
| 15 | −6.974 | D15 | | |
| 16 | −162.911 | 0.96 | 1.48749 | 70.23 |
| 17 | −2.000 | 0.35 | 1.92286 | 18.90 |
| 18 | −9.642 | D18 | | |
| 19 | 16.123 | 0.85 | 1.51633 | 64.14 |
| 20 | −3.355 | 0.76 | | |
| 21 | ∞ | 0.40 | 1.52300 | 58.50 |
| 22 | ∞ | 0.76 | | |
| 23 (Image plane) | ∞ | | | |

| | | | | |
|---|---|---|---|---|
| | Observation state | | | |
| | Normal observation (the farthest point) | Middle observation (the farthest point) | Close-up observation (the farthest point) | Close-up observation (the nearest point) |
| Various data on objective optical system Zoom ratio: 1.47 | | | | |
| Focal length | 0.93 | 1.15 | 1.38 | 1.36 |
| F number | 3.93 | 4.24 | 4.32 | 4.25 |
| Angle of view (2ω) | 144.87 | 98.13 | 72.72 | 72.15 |
| Image height | 0.85 | 0.85 | 0.85 | 0.85 |
| Total length (in air) | 15.30 | 15.06 | 14.63 | 14.48 |
| BF (in air) | 1.73 | 1.48 | 1.06 | 0.91 |

-continued

Unit: mm

Surface distance

| | | | | |
|---|---|---|---|---|
| D9 | 0.40 | 1.42 | 2.44 | 2.44 |
| D13 | 2.44 | 1.43 | 0.40 | 0.40 |
| D15 | 0.70 | 0.70 | 0.70 | 1.00 |
| D18 | 0.70 | 0.70 | 0.70 | 0.40 |

Data on lens groups

| Group | The first surface of lens group | Focal length |
|---|---|---|
| 1 | 1 | 1.92 |
| 2 | 11 | −4.76 |
| 3 | 14 | 3.32 |
| 4 | 16 | −8.00 |
| 5 | 19 | 5.44 |

Data on conditions

Condition (10): $3 < (m_{c-d}/m_{u-d})/(m_{c-n}/m_{c-d}) < 11$: 6.441
Condition (11): $|ADT_f| < 2$: 0.3682
Condition (12): $0.2 < |(1 - \beta_f \cdot \beta_f) \times \beta_r' \cdot \beta_r'| < 0.9$: 0.5983
Condition (13): $1 < |m_{c-n}/m_{c-d}| < 2$: 1.227
Condition (14): $0.7 < |F_f/F_v| < 8$: 1.680
Condition (15): $|\gamma| < 11.5$: 11.46
Condition (16): $|DT_{c-n} - DT_{c-d}| < 5$: 1.851
Condition (17): $DT_{u-d} < -50$: −61.54
Condition (18): $2 < |F_f/F_{c-d}| < 15$: 5.812
Condition (19): $0.83 < Fno_u/Fno_c$: 0.9111

Embodied Example 12

An observation apparatus provided with an objective optical system according to Embodied Example 12 is explained in detail using FIGS. 21A-21C and 22A-22L, below.

Figure 21A:
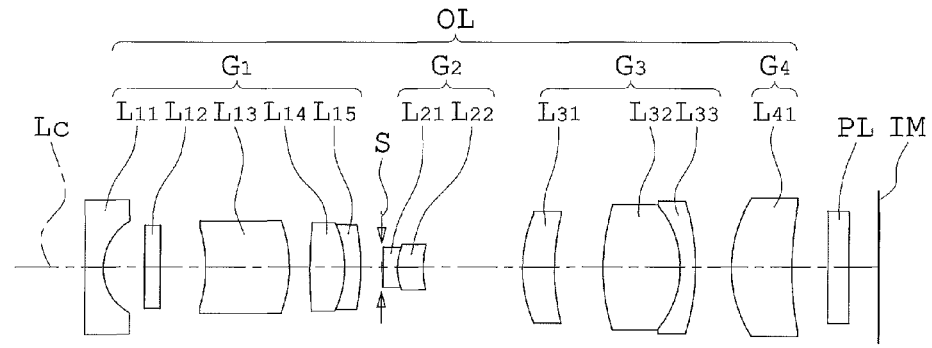
FIGS. 21A to 21C are sectional views taken along the optical axis for showing the configuration of the optical system provided for the observation apparatus according to Embodied Example 12, where
Figure 21B:
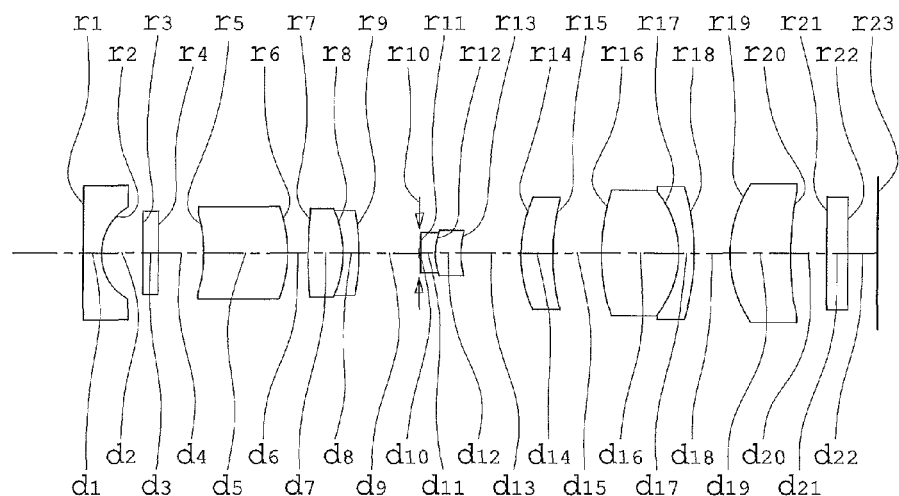
Figure 21C:
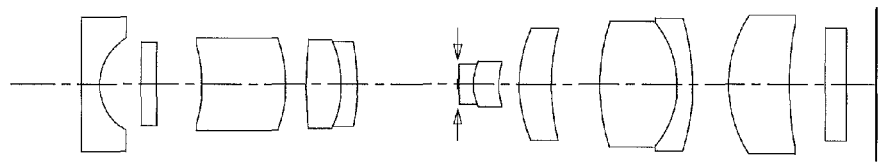

FIGS. 21A to 21C are sectional views taken along the optical axis for showing the configuration of the optical system provided for this observation apparatus, where FIG. 21A shows the normal observation state of the optical system (in the farthest point state), FIG. 21B shows the middle state of the optical system (in the farthest point state), and FIG. 21C shows the close-up observation state of the optical system (in the farthest point state). FIGS. 22A to 22L are aberration diagrams showing spherical aberration, astigmatism, distortion, and chromatic aberration of magnification in the optical system shown in FIGS. 21A-21C. To be specific, FIGS. 22A to 22D show the aberrations in the normal observation state of the optical system (in the farthest point state), FIGS. 22E to 22H show the aberrations in the middle state of the optical system (in the farthest point state), and FIGS. 22I to 22L show the aberrations in the close-up observation state of the optical system (in the farthest point state).

As shown in FIGS. 21A-21C, this observation apparatus includes: an optical system which includes an objective optical system OL and a plano lens PL arranged on the image side of the objective optical system OL and substantially having no refractive power; an aperture stop S arranged in the objective optical system OL; and an image pickup element like CCD for which only its image plane IM is shown in FIGS. 21A-21C. All of these components are arranged on the optical axis Lc.

The objective optical system OL is composed of a first lens group $G_1$ having positive power and being immovable in magnification change and in focusing, a second lens group $G_2$ that is a magnification-changing group having negative power and being moved along the optical axis at least in magnification change, a third lens group $G_3$ having positive power and being immovable in magnification change and in focusing, and a fourth lens group $G_4$ that is a focusing group having positive power and being moved along the optical axis at least in focusing, these lens groups being arranged in that order from the object side. The aperture stop S is arranged between the first lens group $G_1$ and the second lens group $G_2$ in such a way that the aperture stop S moves integrally with the second lens group $G_2$.

The first lens group $G_1$ is composed of: a lens $L_{11}$ that is a plano-concave lens having negative power with the concave surface thereof facing the image side; a lens $L_{12}$ that is a plano lens; a lens $L_{13}$ that is a meniscus lens having positive power with the convex surface thereof facing the image side; a lens $L_{14}$ that is a biconvex lens having positive power; and a lens $L_{15}$ that is a meniscus lens having negative power with the convex surface thereof facing the image side, these lenses being arranged in that order from the object side. The lens $L_{14}$ and the lens $L_{15}$ are joined to each other.

The second lens group $G_2$ is composed of: a lens $L_{21}$ that is a plano-concave lens having negative power with the concave surface thereof facing the image side; and a lens $L_{22}$ that is a meniscus lens having positive power with the concave surface thereof facing the image side, these lenses being arranged in that order from the object side. The lens $L_{21}$ and the lens $L_{22}$ are joined to each other.

The third lens group $G_3$ is composed of: a lens $L_{31}$ that is a meniscus lens having positive power with the concave surface thereof facing the image side; a lens $L_{32}$ that is a biconvex lens having positive power; and a lens $L_{33}$ that is a meniscus lens having negative power with the convex surface thereof facing the image side, these lenses being arranged in that order from the object side. The lens $L_{32}$ and the lens $L_{33}$ are joined to each other.

The fourth lens group $G_4$ is composed of a lens $L_{41}$ that is a meniscus lens having positive power with the concave surface thereof facing the image side.

An amount of variation in magnification per movement of the second lens group $G_2$ is larger than an amount of variation in magnification per movement of the fourth lens group $G_4$ in this objective optical system OL.

This observation apparatus is formed in such a way that movement of the second lens group $G_2$ along the optical axis can change the observation state of the objective optical system reversibly and continuously: from the normal observation state in which a plurality of objects to be imaged exist in an observation area; to the close-up observation state in which the objective optical system is closed to a particular object optionally selected from these objects to be imaged by an observer so as to observe the particular object in detail.

In addition, this observation apparatus is formed in such a way that accurate focusing can be performed in every observation state of the objective optical system by moving not only the second lens group $G_2$ but also the fourth lens group $G_4$ along the optical axis.

Next, numerical data on the optical system provided for this observation apparatus is shown.

Numerical Data 10

Unit: mm

Surface data

| Surface No. s | Radius of curvature r | Surface distance d | Refractive index nd | Abbe's number vd |
|---|---|---|---|---|
| 1 | ∞ | 0.36 | 1.88300 | 40.76 |
| 2 | 1.031 | 0.82 | | |
| 3 | ∞ | 0.31 | 1.51400 | 73.43 |
| 4 | ∞ | 0.89 | | |
| 5 | −2.717 | 1.62 | 1.80518 | 25.42 |
| 6 | −2.629 | 0.40 | | |
| 7 | 9.887 | 0.68 | 1.77250 | 49.60 |
| 8 | −2.020 | 0.31 | 1.92286 | 18.90 |
| 9 | −4.209 | D9 | | |
| 10 (Stop surface) | ∞ | 0.03 | | |
| 11 | ∞ | 0.28 | 1.48749 | 70.23 |
| 12 | 1.211 | 0.50 | 1.59270 | 35.31 |
| 13 | 1.774 | D13 | | |
| 14 | 2.675 | 0.63 | 1.83481 | 42.71 |
| 15 | 4.278 | 0.95 | | |
| 16 | 4.039 | 1.50 | 1.48749 | 70.23 |
| 17 | −1.901 | 0.30 | 1.92286 | 18.90 |
| 18 | −4.356 | D18 | | |
| 19 | 2.465 | 1.18 | 1.51633 | 64.14 |
| 20 | 6.573 | D20 | | |
| 21 | ∞ | 0.40 | 1.52300 | 58.50 |
| 22 | ∞ | 0.58 | | |
| 23 (Image plane) | ∞ | | | |

Observation state

| | Normal observation (the farthest point) | Middle observation (the farthest point) | Close-up observation (the farthest point) | Close-up observation (the nearest point) |
|---|---|---|---|---|
| Various data on objective optical system Zoom ratio: 1.39 | | | | |
| Focal length | 0.95 | 1.13 | 1.32 | 1.28 |
| F number | 8.13 | 8.64 | 8.81 | 8.54 |
| Angle of view (2ω) | 144.27 | 102.98 | 79.09 | 80.80 |
| Image height | 0.85 | 0.85 | 0.85 | 0.85 |
| Total length (in air) | 15.29 | 15.06 | 14.68 | 14.53 |
| BF (in air) | 1.48 | 1.25 | 0.87 | 1.01 |
| Surface distance | | | | |
| D9 | 0.40 | 1.16 | 1.95 | 1.95 |
| D13 | 1.95 | 1.19 | 0.40 | 0.40 |
| D18 | 0.70 | 0.70 | 0.70 | 0.40 |
| D20 | 0.70 | 0.70 | 0.70 | 1.00 |

Data on lens groups

| Group | The first surface of lens group | Focal length |
|---|---|---|
| 1 | 1 | 1.71 |
| 2 | 11 | −4.20 |
| 3 | 14 | 4.61 |
| 4 | 19 | 6.93 |

Data on conditions

Condition (10): $3 < (m_{c\text{-}d}/m_{u\text{-}d})/(m_{c\text{-}n}/m_{c\text{-}d}) < 11$: 5.982
Condition (11): $|\Delta DT_f| < 2$: 0.1553
Condition (12)': $0.2 < (1 - \beta_f \cdot \beta_f) < 0.9$: 0.6234
Condition (13): $1 < |m_{c\text{-}n}/m_{c\text{-}d}| < 2$: 1.262
Condition (14): $0.7 < |F_f/F_v| < 8$: 1.65
Condition (15): $|\gamma| < 11.5$: 2.079
Condition (16): $|DT_{c\text{-}n} - DT_{c\text{-}d}| < 5$: 0.9926
Condition (17): $DT_{u\text{-}d} < -50$: −62.34

Unit: mm

Condition (18): $2 < |F_f/F_{c\text{-}d}| < 15$: 5.253
Condition (19): $0.83 < Fno_u/Fno_c$: 0.9232

Embodied Example 13

An observation apparatus provided with an objective optical system according to Embodied Example 13 is explained in detail using FIGS. 23A-23C and 24A-24L, below.

Figure 23A:
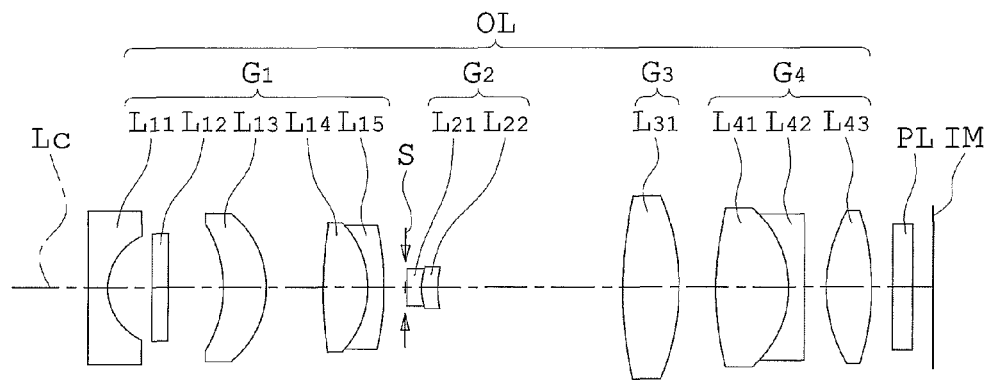
FIGS. 23A to 23C are sectional views taken along the optical axis for showing the configuration of the optical system provided for the observation apparatus according to Embodied Example 13, where
Figure 23B:
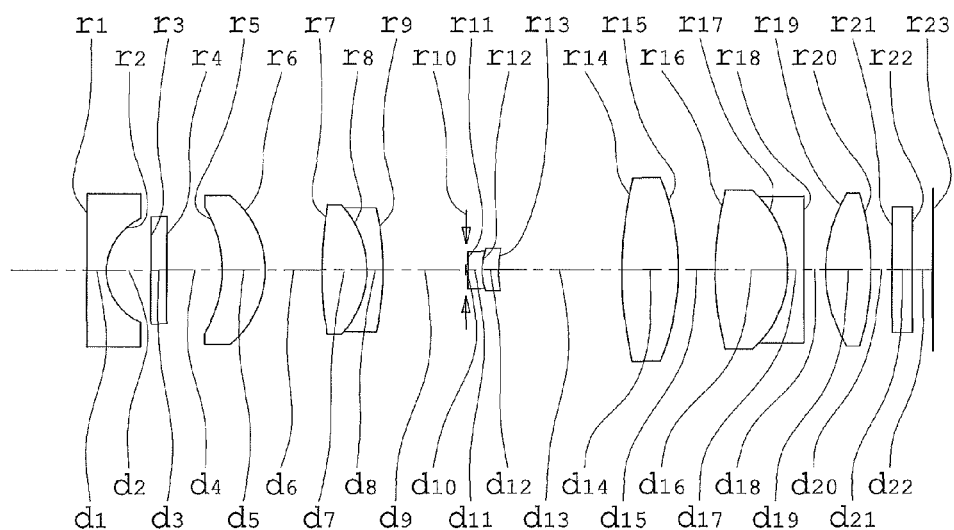
Figure 23C:
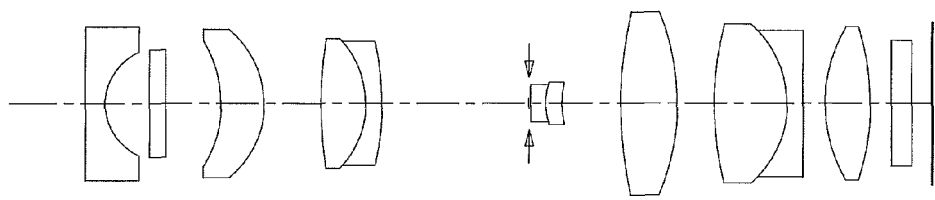

FIGS. 23A to 23C are sectional views taken along the optical axis for showing the configuration of the optical system provided for this observation apparatus, where FIG. 23A shows the normal observation state of the optical system (in the farthest point state), FIG. 23B shows the middle state of the optical system (in the farthest point state), and FIG. 23C shows the close-up observation state of the optical system (in the farthest point state). FIGS. 24A to 24L are aberration diagrams showing spherical aberration, astigmatism, distortion, and chromatic aberration of magnification in the optical system shown in FIGS. 23A-23C. To be specific, FIGS. 24A to 24D show the aberrations in the normal observation state of the optical system (in the farthest point state), FIGS. 24E to 24H show the aberrations in the middle state of the optical system (in the farthest point state), and FIGS. 24I to 24L show the aberrations in the close-up observation state of the optical system (in the farthest point state).

As shown in FIGS. 23A-23C, this observation apparatus includes: an optical system which includes an objective optical system OL and a plano lens PL arranged on the image side of the objective optical system OL and substantially having no refractive power; an aperture stop S arranged in the objective optical system OL; and an image pickup element like CCD for which only its image plane IM is shown in FIGS. 23A-23C. All of these components are arranged on the optical axis Lc.

The objective optical system OL is composed of a first lens group $G_1$ having positive power and being immovable in magnification change and in focusing, a second lens group $G_2$ that is a magnification-changing group having negative power and being moved along the optical axis at least in magnification change, a third lens group $G_3$ that is a focusing group having positive power and being moved along the optical axis at least in focusing, and a fourth lens group $G_4$ having positive power and being immovable in magnification change and in focusing, these lens groups being arranged in that order from the object side. The aperture stop S is arranged between the first lens group $G_1$ and the second lens group $G_2$ in such a way that the aperture stop S moves integrally with the second lens group $G_2$.

The first lens group $G_1$ is composed of: a lens $L_{11}$ that is a plano-concave lens having negative power with the concave surface thereof facing the image side; a lens $L_{12}$ that is is a plano lens; a lens $L_{13}$ that is a meniscus lens having positive power with the convex surface thereof facing the image side; a lens $L_{14}$ that is a biconvex lens having positive power; and a lens $L_{15}$ that is a meniscus lens having negative power with the convex surface thereof facing the image side, these lenses being arranged in that order from the object side. The lens $L_{14}$ and the lens $L_{15}$ are joined to each other.

The second lens group $G_2$ is composed of: a lens $L_{21}$ that is a plano-concave lens having negative power with the concave surface thereof facing the image side; and a lens $L_{22}$ that is a meniscus lens having positive power with the concave surface thereof facing the image side, these lenses being arranged in that order from the object side. The lens $L_{21}$ and the lens $L_{22}$ are joined to each other.

The third lens group $G_3$ is composed of a lens $L_{31}$ that is a biconvex lens having positive power.

The fourth lens group $G_4$ is composed of: a lens $L_{41}$ that is a biconvex lens having positive power; a lens $L_{42}$ that is a meniscus lens having negative power with the convex surface thereof facing the image side; and a lens $L_{43}$ that is a biconvex lens having positive power, these lenses being arranged in that order from the object side. The lens $L_{41}$ and the lens $L_{42}$ are joined to each other.

An amount of variation in magnification per movement of the second lens group $G_2$ is larger than an amount of variation in magnification per movement of the third lens group $G_3$ in this objective optical system OL.

This observation apparatus is formed in such a way that movement of the second lens group $G_2$ along the optical axis can change the observation state of the objective optical system reversibly and continuously: from the normal observation state in which a plurality of objects to be imaged exist in an observation area; to the close-up observation state in which the objective optical system is closed to a particular object optionally selected from these objects to be imaged by an observer so as to observe the particular object in detail.

In addition, this observation apparatus is formed in such a way that accurate focusing can be performed in every observation state of the objective optical system by moving not only the second lens group $G_2$ but also the third lens group $G_3$ along the optical axis.

Next, numerical data on the optical system provided for this observation apparatus is shown.

Numerical Data 11

Unit: mm

Surface data

| Surface No. s | Radius of curvature r | Surface distance d | Refractive index nd | Abbe's number vd |
|---|---|---|---|---|
| 1 | ∞ | 0.36 | 1.88300 | 40.76 |
| 2 | 1.084 | 0.82 | | |
| 3 | ∞ | 0.31 | 1.51400 | 73.43 |
| 4 | ∞ | 1.04 | | |
| 5 | −2.279 | 0.82 | 1.80518 | 25.42 |
| 6 | −1.799 | 1.08 | | |
| 7 | 7.901 | 0.84 | 1.77250 | 49.60 |
| 8 | −1.793 | 0.30 | 1.92286 | 18.90 |
| 9 | −5.424 | D9 | | |
| 10 (Stop surface) | ∞ | 0.03 | | |
| 11 | ∞ | 0.28 | 1.48749 | 70.23 |
| 12 | 1.231 | 0.31 | 1.59270 | 35.31 |
| 13 | 1.896 | D13 | | |
| 14 | 7.797 | 1.06 | 1.83481 | 42.71 |
| 15 | −4.517 | D15 | | |
| 16 | 5.862 | 1.38 | 1.48749 | 70.23 |
| 17 | −2.000 | 0.30 | 1.92286 | 18.90 |
| 18 | −354.222 | 0.40 | | |
| 19 | 2.857 | 0.85 | 1.51633 | 64.14 |
| 20 | −4.852 | 0.40 | | |
| 21 | ∞ | 0.40 | 1.52300 | 58.50 |
| 22 | ∞ | 0.40 | | |
| 23 (Image plane) | ∞ | | | |

-continued

Unit: mm

| | Observation state | | | |
|---|---|---|---|---|
| | Nomnal observation (the farthest point) | Middle observation (the farthest point) | Close-up observation (the farthest point) | Close-up observation (the nearest point) |
| Various data on objective optical system Zoom ratio: 1.79 | | | | |
| Focal length | 0.85 | 1.15 | 1.52 | 1.59 |
| F number | 7.39 | 8.33 | 8.85 | 9.23 |
| Angle of view (2ω) | 148.30 | 95.45 | 66.49 | 62.47 |
| Image height | 0.85 | 0.85 | 0.85 | 0.85 |
| Total length (in air) | 15.81 | 15.58 | 15.09 | 14.83 |
| BF (in air) | 1.01 | 0.78 | 0.29 | 0.03 |
| Surface distance | | | | |
| D9 | 0.40 | 1.58 | 2.80 | 2.80 |
| D13 | 3.50 | 2.33 | 1.10 | 0.80 |
| D15 | 0.70 | 0.70 | 0.70 | 1.00 |

Data on lens groups

| Group | The first surface of lens group | Focal length |
|---|---|---|
| 1 | 1 | 2.09 |
| 2 | 11 | −4.50 |
| 3 | 14 | 3.55 |
| 4 | 16 | 6.17 |

Data on conditions

Condition (10): $3 < (m_{c-d}/m_{u-d})/(m_{c-n}/m_{c-d}) < 11$: 6.618
Condition (11): $|ADT_f| < 2$: 0.5482
Condition (12): $0.2 < |(1 - \beta_f \cdot \beta_f) \times \beta_f' \cdot \beta_f'| < 0.9$: 0.5652
Condition (13): $1 < |m_{c-n}/m_{c-d}| < 2$: 1.278
Condition (14): $0.7 < |F_f/F_v| < 8$: 0.7875
Condition (15): $|\gamma| < 11.5$: 7.211
Condition (16): $|DT_{c-n} - DT_{c-d}| < 5$: 1871
Condition (17): $DT_{u-d} < -50$: −58.16
Condition (18): $2 < |F_f/F_{c-d}| < 15$: 2.327
Condition (19): $0.83 < Fno_u/Fno_c$: 0.8356

Embodied Example 14

An observation apparatus provided with an objective optical system according to Embodied Example 14 is explained in detail using FIGS. 25A-25C and 26A-26L, below.

Figure 25A:
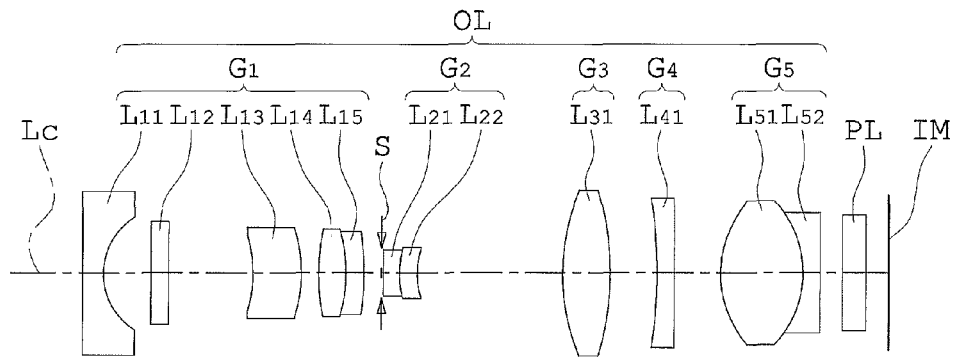
FIGS. 25A to 25C are sectional views taken along the optical axis for showing the configuration of the optical system provided for the observation apparatus according to Embodied Example 14, where
Figure 25B:
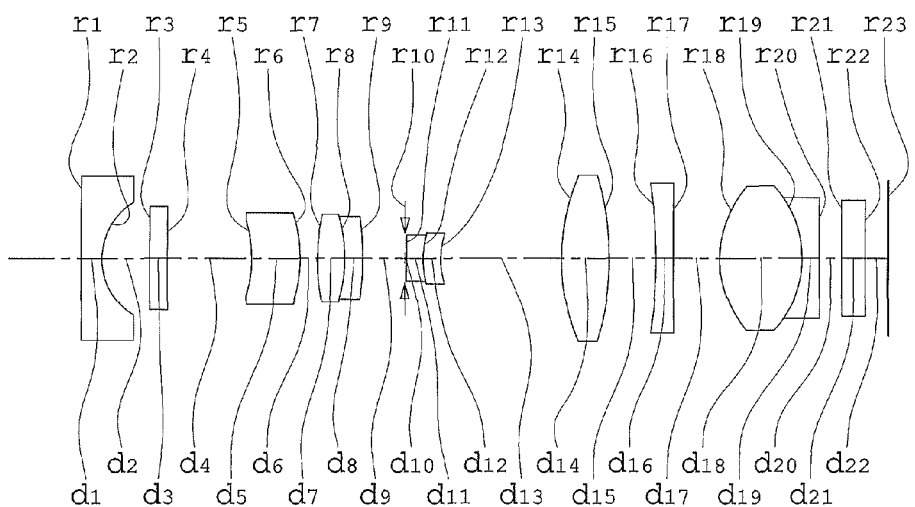
Figure 25C:
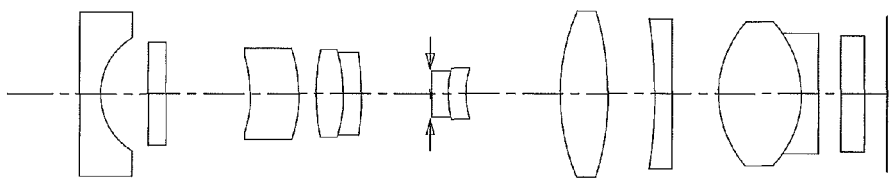
Figure 26A:
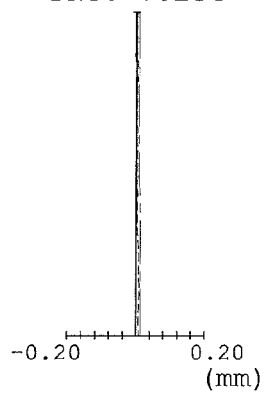
FIGS. 26A to 26L are aberration diagrams showing spherical aberration, astigmatism, distortion, and chromatic aberration of magnification in the optical system shown in FIGS. 25A-25C. To be specific.
Figure 26B:
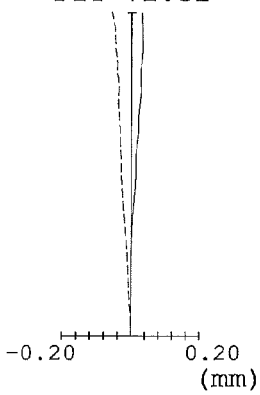
Figure 26C:
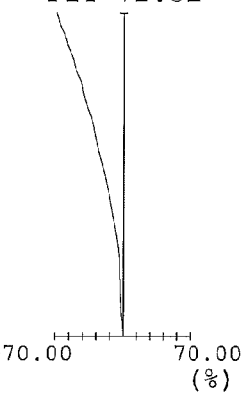
Figure 26D:
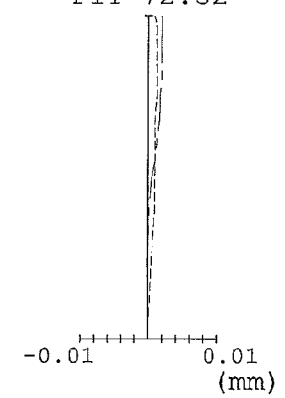
Figure 26E:
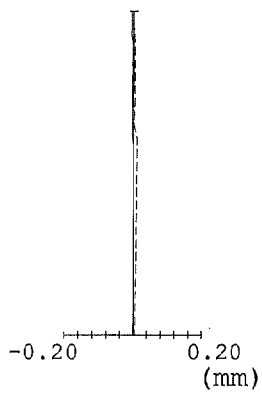
Figure 26F:
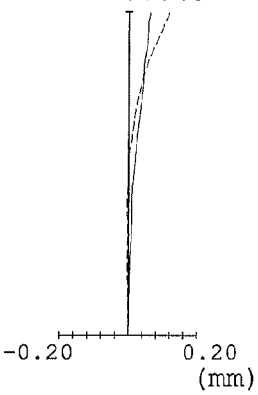
Figure 26G:
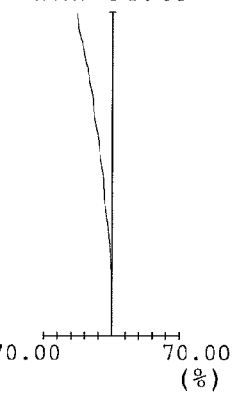
Figure 26H:
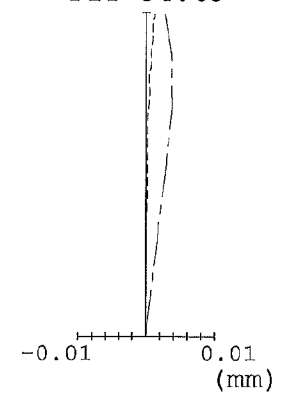
Figure 26I:
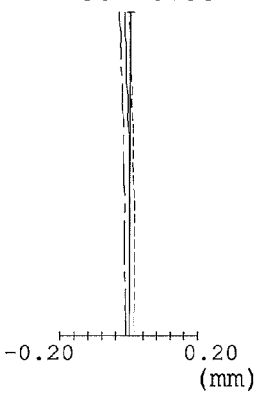
Figure 26J:
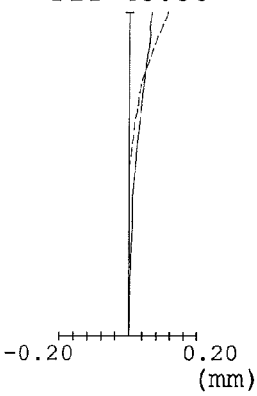
Figure 26K:
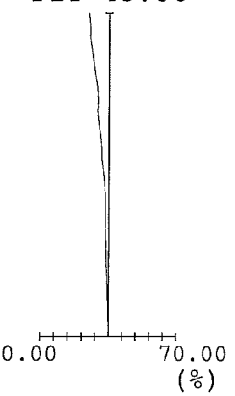
Figure 26L:
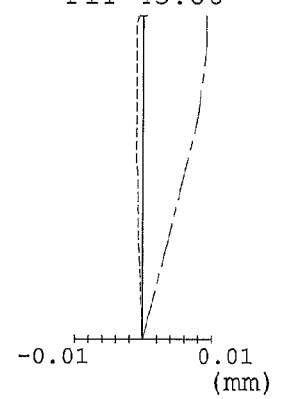

FIGS. 25A to 25C are sectional views taken along the optical axis for showing the configuration of the optical system provided for this observation apparatus, where FIG. 25A shows the normal observation state of the optical system (in the farthest point state), FIG. 25B shows the middle state of the optical system (in the farthest point state), and FIG. 25C shows the close-up observation state of the optical system (in the farthest point state). FIGS. 26A to 26L are aberration diagrams showing spherical aberration, astigmatism, distortion, and chromatic aberration of magnification in the optical system shown in FIGS. 25A-25C. To be specific, FIGS. 26A to 26D show the aberrations in the normal observation state of the optical system (in the farthest point state), FIGS. 26E to 26H show the aberrations in the middle state of the optical system (in the farthest point state), and FIGS. 26I to 26L show the aberrations in the close-up observation state of the optical system (in the farthest point state).

As shown in FIGS. 25A-25C, this observation apparatus includes: an optical system which includes an objective optical system OL and a plano lens PL arranged on the image side of the objective optical system OL and substantially having no refractive power; an aperture stop S arranged in the objective optical system OL; and an image pickup element like CCD for which only its image plane IM is shown in FIGS. 25A-25C. All of these components are arranged on the optical axis Lc.

The objective optical system OL is composed of a first lens group $G_1$ having positive power and being immovable in magnification change and in focusing, a second lens group $G_2$ that is a magnification-changing group having negative power and being moved along the optical axis at least in magnification change, a third lens group $G_3$ having positive power and being immovable in magnification change and in focusing, a fourth lens group $G_4$ that is a focusing group having negative power and being moved along the optical axis at least in focusing, and a fifth lens group $G_5$ having positive power and being immovable in magnification change and in focusing, these lens groups being arranged in that order from the object side. The aperture stop S is arranged between the first lens group $G_1$ and the second lens group $G_2$ in such a way that the aperture stop S moves integrally with the second lens group $G_2$.

The first lens group $G_1$ is composed of: a lens $L_{11}$ that is a plano-concave lens having negative power with the concave surface thereof facing the image side; a lens $L_{12}$ that is a plano lens; a lens $L_{13}$ that is a meniscus lens having negative power with the convex surface thereof facing the image side; a lens $L_{14}$ that is a biconvex lens having positive power; and a lens $L_{15}$ that is a meniscus lens having negative power with the convex surface thereof facing the image side, these lenses being arranged in that order from the is object side. The lens $L_{14}$ and the lens $L_{15}$ are joined to each other.

The second lens group $G_2$ is composed of: a lens $L_{21}$ that is a plano-concave lens having negative power with the concave surface thereof facing the image side; and a lens $L_{22}$ that is a meniscus lens having negative power with the concave surface thereof facing the image side, these lenses being arranged in that order from the object side. The lens $L_{21}$ and the lens $L_{22}$ are joined to each other.

The third lens group $G_3$ is composed of a lens $L_{31}$ that is a biconvex lens having positive power.

The fourth lens group $G_4$ is composed of a lens $L_{41}$ that is a plano-concave lens having negative power with the planar surface thereof facing the image side.

The fifth lens group $G_5$ is composed of: a lens $L_{51}$ that is a biconvex lens having positive power; and a lens $L_{52}$ that is a biconcave lens having negative power, these lenses being arranged in that order from the object side. The lens $L_{51}$ and the lens $L_{52}$ are joined to each other.

An amount of variation in magnification per movement of the second lens group $G_2$ is larger than an amount of variation in magnification per movement of the fourth lens group $G_4$ in this objective optical system OL.

This observation apparatus is formed in such a way that movement of the second lens group $G_2$ along the optical axis can change the observation state of the objective optical system reversibly and continuously: from the normal observation state in which a plurality of objects to be imaged exist in an observation area; to the close-up observation state in which the objective optical system is closed to a particular object optionally selected from these objects to be imaged by an observer so as to observe the particular object in detail.

In addition, this observation apparatus is formed in such a way that accurate focusing can be performed in every observation state of the objective optical system by moving not only the second lens group $G_2$ but also the fourth lens group $G_4$ along the optical axis.

Next, numerical data on the optical system provided for this observation apparatus is shown.

Numerical Data 12

| | Unit: mm | | | |
|---|---|---|---|---|
| | Surface data | | | |
| Surface No. s | Radius of curvature r | Surface distance d | Refractive index nd | Abbe's number vd |
| 1 | ∞ | 0.36 | 1.88300 | 40.76 |
| 2 | 1.150 | 0.83 | | |
| 3 | ∞ | 0.31 | 1.51400 | 73.43 |
| 4 | ∞ | 1.45 | | |
| 5 | −2.223 | 0.86 | 2.00330 | 28.27 |
| 6 | −2.503 | 0.30 | | |
| 7 | 3.728 | 0.48 | 1.77250 | 49.60 |
| 8 | −2.655 | 0.31 | 1.92286 | 18.90 |
| 9 | −5.062 | D9 | | |
| 10 (Stop surface) | ∞ | 0.03 | | |
| 11 | ∞ | 0.28 | 1.48749 | 70.23 |
| 12 | 1.792 | 0.30 | 1.59270 | 35.31 |
| 13 | 1.456 | D13 | | |
| 14 | 3.716 | 0.83 | 1.72916 | 54.68 |
| 15 | −5.008 | D15 | | |
| 16 | −9.011 | 0.30 | 1.92286 | 20.88 |
| 17 | ∞ | D17 | | |
| 18 | 1.892 | 1.45 | 1.48749 | 70.23 |
| 19 | −1.800 | 0.30 | 1.92286 | 18.90 |
| 20 | 727.658 | 0.39 | | |
| 21 | ∞ | 0.40 | 1.52300 | 58.50 |
| 22 | ∞ | 0.39 | | |
| 23 (Image plane) | ∞ | | | |

| | Observation state | | | |
|---|---|---|---|---|
| | Normal observation (the farthest point) | Middle observation (the farthest point) | Close-up observation (the farthest point) | Close-up observation (the nearest point) |
| Various data on objective optical system Zoom ratio: 1.26 | | | | |
| Focal length | 0.92 | 1.05 | 1.17 | 1.11 |
| F number | 7.25 | 7.49 | 7.50 | 7.14 |
| Angle of view (2ω) | 145.39 | 109.46 | 87.76 | 90.49 |
| Image height | 0.85 | 0.85 | 0.85 | 0.85 |
| Total length (in air) | 13.79 | 13.61 | 13.33 | 13.14 |
| BF (in air) | 0.98 | 0.79 | 0.50 | 0.32 |
| Surface distance | | | | |
| D9 | 0.30 | 0.72 | 1.16 | 1.16 |
| D13 | 2.52 | 2.10 | 1.67 | 1.67 |
| D15 | 0.80 | 0.80 | 0.80 | 1.30 |
| D17 | 0.80 | 0.80 | 0.80 | 0.30 |

| Data on lens groups | | |
|---|---|---|
| Group | The first surface of lens group | Focal length |
| 1 | 1 | 1.32 |
| 2 | 11 | −2.90 |
| 3 | 14 | 3.03 |
| 4 | 16 | −9.66 |
| 5 | 18 | 13.79 |

Data on conditions

Condition (10): $3 < (m_{c\text{-}d}/m_{u\text{-}d})/(m_{c\text{-}n}/m_{c\text{-}d}) < 11$: 4.192
Condition (11): $|ADT_f| < 2$: 0.2520

-continued

Unit: mm

Condition (12): $0.2 < |(1 - \beta_f \cdot \beta_f) \times \beta_f' \cdot \beta_f'| < 0.9$: 0.5257
Condition (13): $1 < |m_{c-n}/m_{c-d}| < 2$: 1.413
Condition (14): $0.7 < |F_v/F_v| < 8$: 3.332
Condition (15): $|\gamma| < 11.5$: 7.232
Condition (16): $|DT_{c-n} - DT_{c-d}| < 5$: 2.384
Condition (17): $DT_{u-d} < -50$: -61.30
Condition (18): $2 < |F_v/F_{c-d}| < 15$: 8.285
Condition (19): $0.83 < Fno_u/Fno_c$: 0.9672

Embodied Example 15

An observation apparatus provided with an objective optical system according to Embodied Example 15 is explained in detail using FIGS. 27A-27C and 28A-28L, below.

Figure 27A:
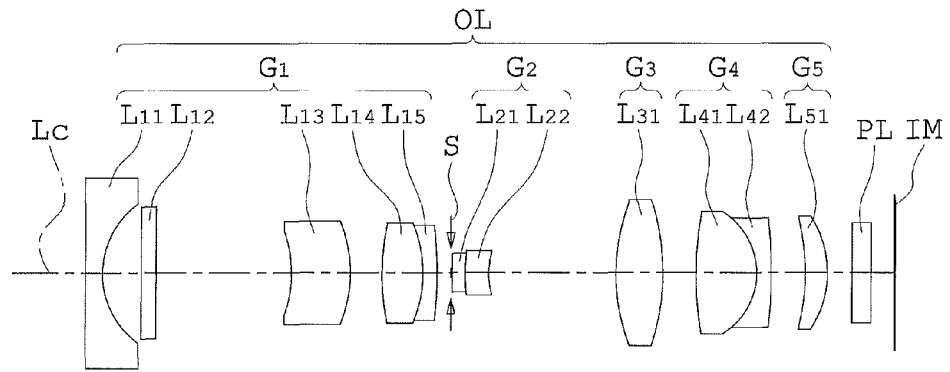
FIGS. 27A to 27C are sectional views taken along the optical axis for showing the configuration of the optical system provided for the observation apparatus according to Embodied Example 15, where
Figure 27B:
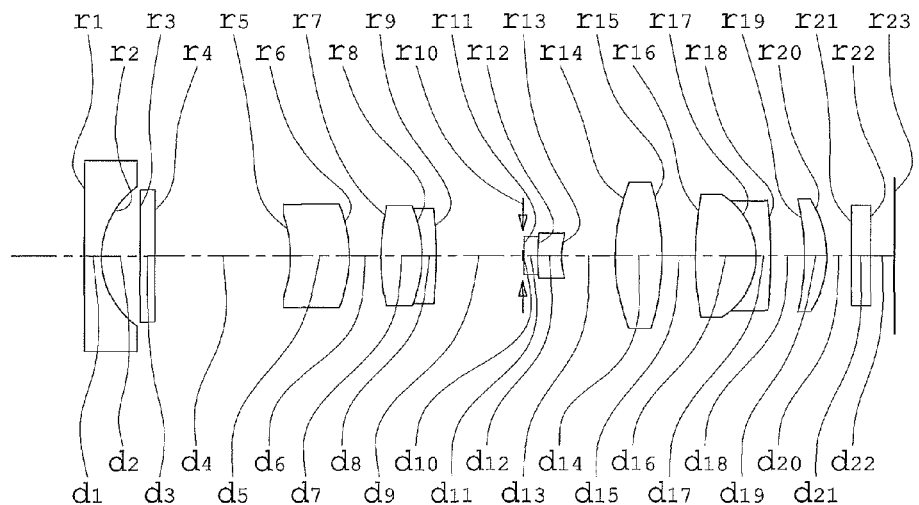
Figure 27C:
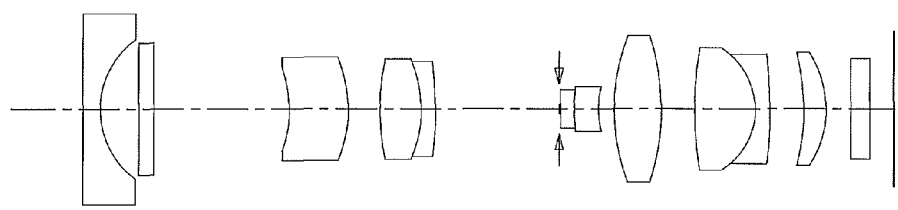

FIGS. 27A to 27C are sectional views taken along the optical axis for showing the configuration of the optical system provided for this observation apparatus, where FIG. 27A shows the normal observation state of the optical system (in the farthest point state), FIG. 27B shows the middle state of the optical system (in the farthest point state), and FIG. 27C shows the close-up observation state of the optical system (in the farthest point state). FIGS. 28A to 28L are aberration diagrams showing spherical aberration, astigmatism, distortion, and chromatic aberration of magnification in the optical system shown in FIGS. 27A-27C. To be specific, FIGS. 28A to 28D show the aberrations in the normal observation state of the optical system (in the farthest point state), FIGS. 28E to 28H show the aberrations in the middle state of the optical system (in the farthest point state), and FIGS. 28I to 28L show the aberrations in the close-up observation state of the optical system (in the farthest point state).

As shown in FIGS. 27A-27C, this observation apparatus includes: an optical system which includes an objective optical system OL and a plano lens PL arranged on the image side of the objective optical system OL and substantially having no refractive power; an aperture stop S arranged in the objective optical system OL; and an image pickup element like CCD for which only its image plane IM is shown in FIGS. 27A-27C. All of these components are arranged on the optical axis Lc.

The objective optical system OL is composed of a first lens group $G_1$ having positive power and being immovable in magnification change and in focusing, a second lens group $G_2$ that is a magnification-changing group having negative power and being moved along the optical axis at least in magnification change, a third lens group $G_3$ having positive power and being immovable in magnification change and in focusing, a fourth lens group $G_4$ that is a focusing group having negative power and being moved along the optical axis at least in focusing, and a fifth lens group $G_5$ having positive power and being immovable in magnification change and in focusing, these lens groups being arranged in that order from the object side. The aperture stop S is arranged between the first lens group $G_1$ and the second lens group $G_2$ in such a way that the aperture stop S moves integrally with the second lens group $G_2$.

The first lens group $G_1$ is composed of: a lens $L_{11}$ that is a plano-concave lens having negative power with the concave surface thereof facing the image side; a lens $L_{12}$ that is a plano lens; a lens $L_{13}$ that is a meniscus lens having negative power with the convex surface thereof facing the image side; a lens $L_{14}$ that is a biconvex lens having positive power; and a lens $L_{15}$ that is a meniscus lens having negative power with the convex surface thereof facing the image side, these lenses being arranged in that order from the is object side. The lens $L_{14}$ and the lens $L_{15}$ are joined to each other.

The second lens group $G_2$ is composed of: a lens $L_{21}$ that is a plano-concave lens having negative power with the concave surface thereof facing the image side; and a lens $L_{22}$ that is a meniscus lens having negative power with the concave surface thereof facing the image side, these lenses being arranged in that order from the object side. The lens $L_{21}$ and the lens $L_{22}$ are joined to each other.

The third lens group $G_3$ is composed of a lens $L_{31}$ that is a biconvex lens having positive power.

The fourth lens group $G_4$ is composed of: a lens $L_{41}$ that is a biconvex lens having positive power; and a lens $L_{42}$ that is a meniscus lens having negative power with the convex surface thereof facing the image side, these lenses being arranged in that order from the object side. The lens $L_{41}$ and the lens $L_{42}$ are joined to each other.

The fifth lens group $G_5$ is composed of a lens $L_{51}$ that is a meniscus lens having positive power with the convex surface thereof facing the image side.

An amount of variation in magnification per movement of the second lens group $G_2$ is larger than an amount of variation in magnification per movement of the fourth lens group $G_4$ in this objective optical system OL.

This observation apparatus is formed in such a way that movement of the second lens group $G_2$ along the optical axis can change the observation state of the objective optical system reversibly and continuously: from the normal observation state in which a plurality of objects to be imaged exist in an observation area; to the close-up observation state in which the objective optical system is closed to a particular object optionally selected from these objects to be imaged by an observer so as to observe the particular object in detail.

In addition, this observation apparatus is formed in such a way that accurate focusing can be performed in every observation state of the objective optical system by moving not only the second lens group $G_2$ but also the fourth lens group $G_4$ along the optical axis.

Next, numerical data on the optical system provided for this observation apparatus is shown.

Numerical Data 13

| | Unit: mm | | | |
|---|---|---|---|---|
| | Surface data | | | |
| Surface No. s | Radius of curvature r | Surface distance d | Refractive index nd | Abbe's number vd |
| 1 | ∞ | 0.36 | 1.88300 | 40.76 |
| 2 | 1.798 | 0.82 | | |
| 3 | ∞ | 0.31 | 1.51400 | 73.43 |
| 4 | ∞ | 2.83 | | |
| 5 | -2.658 | 1.23 | 1.80518 | 25.42 |
| 6 | -2.876 | 0.65 | | |
| 7 | 5.191 | 0.86 | 1.77250 | 49.60 |
| 8 | -2.644 | 0.31 | 1.92286 | 18.90 |
| 9 | -7.720 | D9 | | |
| 10 (Stop surface) | ∞ | 0.03 | | |
| 11 | ∞ | 0.28 | 1.48749 | 70.23 |
| 12 | 4.217 | 0.50 | 1.59270 | 35.31 |
| 13 | 1.824 | D13 | | |
| 14 | 4.265 | 0.99 | 1.83481 | 42.71 |
| 15 | -4.935 | D15 | | |
| 16 | 7.318 | 1.27 | 1.48749 | 70.23 |
| 17 | -1.509 | 0.30 | 1.92286 | 18.90 |
| 18 | -10.568 | D18 | | |
| 19 | -4.882 | 0.46 | 1.51633 | 64.14 |

-continued

Unit: mm

| | | | | |
|---|---|---|---|---|
| 20 | −2.190 | 0.51 | | |
| 21 | ∞ | 0.40 | 1.52300 | 58.50 |
| 22 | ∞ | 0.51 | | |
| 23 (Image plane) | ∞ | | | |

Observation state

| | Normal observation (the farthest point) | Middle observation (the farthest point) | Close-up observation (the farthest point) | Close-up observation (the nearest point) |
|---|---|---|---|---|
| Various data on objective optical system Zoom ratio: 1.82 | | | | |
| Focal length | 0.92 | 1.42 | 1.68 | 1.61 |
| F number | 6.67 | 8.00 | 8.04 | 7.70 |
| Angle of view (2ω) | 145.42 | 71.84 | 53.88 | 54.40 |
| Image height | 0.85 | 0.85 | 0.85 | 0.85 |
| Total length (in air) | 16.82 | 16.45 | 15.95 | 15.85 |
| BF (in air) | 1.25 | 0.88 | 0.38 | 0.28 |
| Surface distance | | | | |
| D9 | 0.30 | 1.83 | 2.61 | 2.61 |
| D13 | 2.66 | 1.13 | 0.35 | 0.35 |
| D15 | 0.70 | 0.70 | 0.70 | 1.11 |
| D18 | 0.70 | 0.70 | 0.70 | 0.29 |

Data on lens groups

| Group | The first surface of lens group | Focal length |
|---|---|---|
| 1 | 1 | 1.84 |
| 2 | 11 | −3.34 |
| 3 | 14 | 2.87 |
| 4 | 16 | −8.00 |
| 5 | 19 | 7.24 |

Data on conditions

Condition (10): $3 < (m_{c\text{-}d}/m_{u\text{-}d})/(m_{c\text{-}n}/m_{c\text{-}d}) < 11$: 10.59
Condition (11): $|\Delta DT_f| < 2$: 1.146
Condition (12): $0.2 < |(1 - \beta_f \cdot \beta_f) \times \beta_r' \cdot \beta_r'| < 0.9$: 0.4717
Condition (13): $1 < |m_{c\text{-}n}/m_{c\text{-}d}| < 2$: 1.153
Condition (14): $0.7 < |F_f/F_v| < 8$: 2.392
Condition (15): $|\gamma| < 11.5$: 11.63
Condition (16): $|DT_{c\text{-}n} - DT_{c\text{-}d}| < 5$: 1.251
Condition (17): $DT_{u\text{-}d} < -50$: −61.02
Condition (18): $2 < |F_f/F_{c\text{-}d}| < 15$: 4.772
Condition (19): $0.83 < Fno_u/Fno_c$: 0.8289

Embodied Example 16

An observation apparatus provided with an objective optical system according to Embodied Example 16 is explained in detail using FIGS. 29A-29C and 30A-30L, below.

Figure 29A:
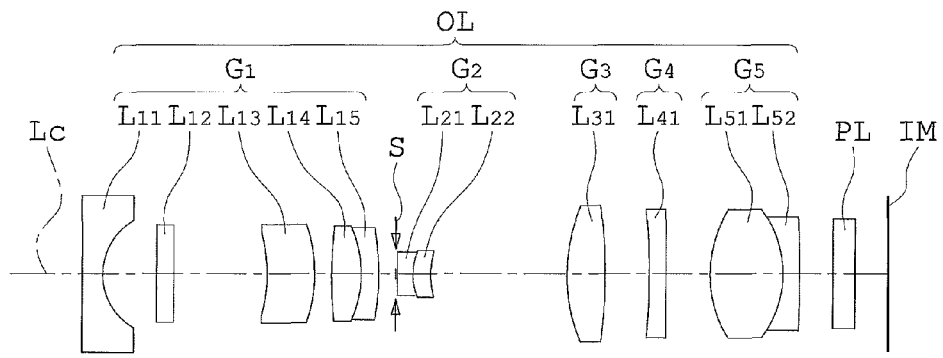
FIGS. 29A to 29C are sectional views taken along the optical axis for showing the configuration of the optical system provided for the observation apparatus according to Embodied Example 16, where
Figure 29B:
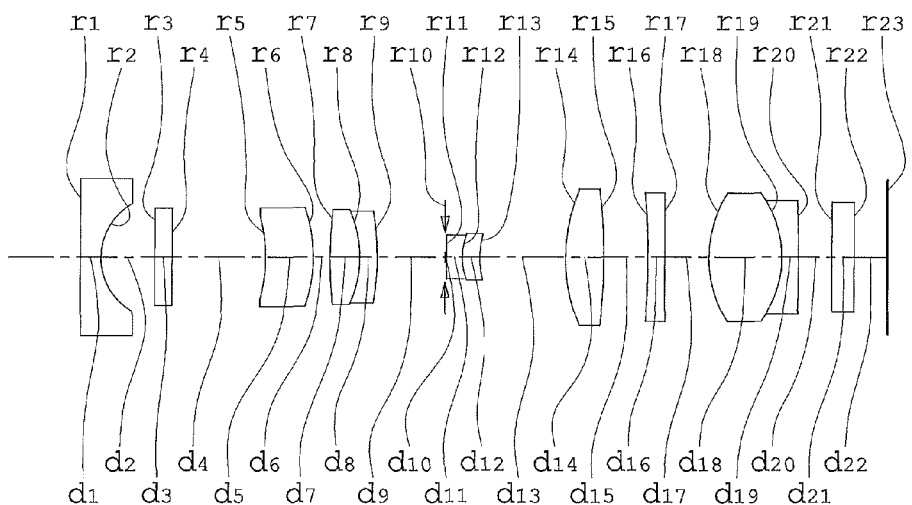
Figure 29C:
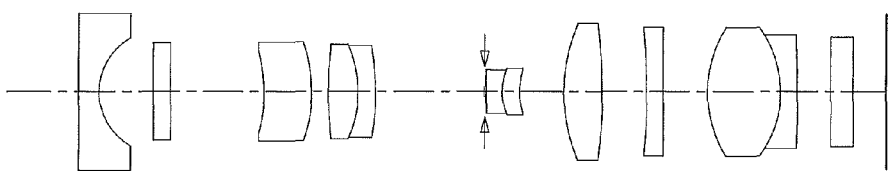
Figures 30A, 30B, 30C, 30D, 30E, 30F, 30G, 30H, 30I, 30J, 30K, 30L:
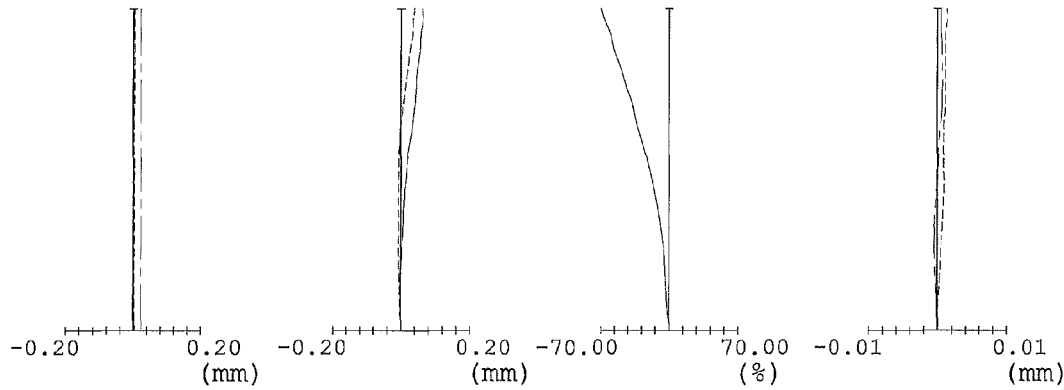
FIGS. 30A to 30L are aberration diagrams showing spherical aberration, astigmatism, distortion, and chromatic aberration of magnification in the optical system shown in FIGS. 29A-29C. To be specific.

FIGS. 29A to 29C are sectional views taken along the optical axis for showing the configuration of the optical system provided for this observation apparatus, where FIG. 29A shows the normal observation state of the optical system (in the farthest point state), FIG. 29B shows the middle state of the optical system (in the farthest point state), and FIG. 29C shows the close-up observation state of the optical system (in the farthest point state). FIGS. 30A to 30L are aberration diagrams showing spherical aberration, astigmatism, distortion, and chromatic aberration of magnification in the optical system shown in FIGS. 29A-29C. To be specific, FIGS. 30A to 30D show the aberrations in the normal observation state of the optical system (in the farthest point state), FIGS. 30E to 30H show the aberrations in the middle state of the optical system (in the farthest point state), and FIGS. 30I to 30L show the aberrations in the close-up observation state of the optical system (in the farthest point state).

As shown in FIGS. 29A-29C, this observation apparatus includes: an optical system including an objective optical system OL and a plano lens PL arranged on the image side of the objective optical system OL and substantially having no refractive power; an aperture stop S arranged in the objective optical system OL; and an image pickup element like CCD for which only its image plane IM is shown in FIGS. 29A-29C. All of these components are arranged on the optical axis Lc.

The objective optical system OL is composed of a first lens group $G_1$ having positive power and being immovable in magnification change and in focusing, a second lens group $G_2$ that is a magnification-changing group having negative power and being moved along the optical axis at least in magnification change, a third lens group $G_3$ having positive power and being immovable in magnification change and in focusing, a fourth lens group $G_4$ that is a focusing group having negative power and being moved along the optical axis at least in focusing, and a fifth lens group $G_5$ having positive power and being immovable in magnification change and in focusing, these lens groups being arranged in that order from the object side. The aperture stop S is arranged between the first lens group $G_1$ and the second lens group $G_2$ in such a way that the aperture stop S moves integrally with the second lens group $G_2$.

The first lens group $G_1$ is composed of: a lens $L_{11}$ that is a plano-concave lens having negative power with the concave surface thereof facing the image side; a lens $L_{12}$ that is a plano lens; a lens $L_{13}$ that is a meniscus lens having positive power with the convex surface thereof facing the image side; a lens $L_{14}$ that is a biconvex lens having positive power; and a lens $L_{15}$ that is a meniscus lens having negative power with the convex surface thereof facing the image side, these lenses being arranged in that order from the is object side. The lens $L_{14}$ and the lens $L_{15}$ are joined to each other.

The second lens group $G_2$ is composed of: a lens $L_{21}$ that is a plano-concave lens having negative power with the concave surface thereof facing the image side; and a lens $L_{22}$ that is a meniscus lens having positive power with the concave surface thereof facing the image side, these lenses being arranged in that order from the object side. The lens $L_{21}$ and the lens $L_{22}$ are joined to each other.

The third lens group $G_3$ is composed of a lens $L_{31}$ that is a biconvex lens having positive power.

The fourth lens group $G_4$ is composed of a lens $L_{41}$ that is a plano-concave lens having negative power with the planar surface thereof facing the image side.

The fifth lens group $G_5$ is composed of: a lens $L_{51}$ that is a biconvex lens having positive power; and a lens $L_{52}$ that is a meniscus lens having negative power with the convex surface thereof facing the image side, these lenses being arranged in that order from the object side. The lens $L_{51}$ and the lens $L_{52}$ are joined to each other.

An amount of variation in magnification per movement of the second lens group $G_2$ is larger than an amount of variation in magnification per movement of the fourth lens group $G_4$ in this objective optical system OL.

This observation apparatus is formed in such a way that movement of the second lens group $G_2$ along the optical axis can change the observation state of the objective optical system reversibly and continuously: from the normal observation state in which a plurality of objects to be imaged exist in an observation area; to the close-up observation state in which the objective optical system is closed to a particular object optionally selected from these objects to be imaged by an observer so as to observe the particular object in detail.

In addition, this observation apparatus is formed in such a way that accurate focusing can be performed in every observation state of the objective optical system by moving not only the second lens group $G_2$ but also the fourth lens group $G_4$ along the optical axis.

Next, numerical data on the optical system provided for this observation apparatus is shown.

Numerical Data 14

Unit: mm

Surface data

| Surface No. s | Radius of curvature r | Surface distance d | Refractive index nd | Abbe's number vd |
|---|---|---|---|---|
| 1 | ∞ | 0.36 | 1.88300 | 40.76 |
| 2 | 1.120 | 0.96 | | |
| 3 | ∞ | 0.31 | 1.51400 | 73.43 |
| 4 | ∞ | 1.7 | | |
| 5 | −2.793 | 0.87 | 2.00330 | 28.27 |
| 6 | −2.573 | 0.30 | | |
| 7 | 7.502 | 0.53 | 1.77250 | 49.60 |
| 8 | −2.054 | 0.31 | 1.92286 | 18.90 |
| 9 | −4.690 | D9 | | |
| 10 (Stop surface) | ∞ | 0.03 | | |
| 11 | ∞ | 0.28 | 1.48749 | 70.23 |
| 12 | 1.094 | 0.32 | 1.59270 | 35.31 |
| 13 | 1.630 | D13 | | |
| 14 | 3.215 | 0.68 | 1.72916 | 54.68 |
| 15 | −9.862 | D15 | | |
| 16 | −12.003 | 0.30 | 1.92286 | 20.88 |
| 17 | ∞ | D17 | | |
| 18 | 2.178 | 1.31 | 1.48749 | 70.23 |
| 19 | −1.957 | 0.30 | 1.92286 | 18.90 |
| 20 | −21.190 | 0.60 | | |
| 21 | ∞ | 0.40 | 1.52300 | 58.50 |
| 22 | ∞ | 0.60 | | |
| 23 (Image plane) | ∞ | | | |

Observation state

| | Normal observation (the farthest point) | Middle observation (the farthest point) | Close-up observation (the farthest point) | Close-up observation (the nearest point) |
|---|---|---|---|---|
| Various data on objective optical system Zoom ratio: 1.38 | | | | |
| Focal length | 0.94 | 1.15 | 1.29 | 1.28 |
| F number | 7.69 | 8.14 | 8.01 | 7.92 |
| Angle of view (2ω) | 143.94 | 95.04 | 72.96 | 72.79 |
| Image height | 0.85 | 0.85 | 0.85 | 0.85 |
| Total length (in air) | 14.32 | 14.05 | 13.68 | 13.62 |
| BF (in air) | 1.43 | 1.16 | 0.79 | 0.73 |
| Surface distance | | | | |
| D9 | 0.30 | 1.19 | 1.94 | 1.94 |
| D13 | 2.44 | 1.55 | 0.80 | 0.80 |
| D15 | 0.80 | 0.80 | 0.80 | 0.99 |
| D17 | 0.80 | 0.80 | 0.80 | 0.61 |

Data on lens groups

| Group | The first surface of lens group | Focal length |
|---|---|---|
| 1 | 1 | 1.66 |
| 2 | 11 | −3.84 |
| 3 | 14 | 3.38 |
| 4 | 16 | −12.86 |
| 5 | 18 | 12.97 |

-continued

Unit: mm

Data on conditions

Condition (10): $3 < (m_{c-d}/m_{u-d})/(m_{c-n}/m_{c-d}) < 11$: 10.42
Condition (11): $|\Delta DT_f| < 2$: 1.140
Condition (12): $0.2 < |(1 - \beta_f \cdot \beta_f) \times \beta_f' \cdot \beta_f'| < 0.9$: 0.4324
Condition (13): $1 < |m_{c-n}/m_{c-d}| < 2$: 1.104
Condition (14): $0.7 < |F_f/F_v| < 8$: 3.351
Condition (15): $|\gamma| < 11.5$: 9.450
Condition (16): $|DT_{c-n} - DT_{c-d}| < 5$: 0.7172
Condition (17): $DT_{u-d} < -50$: −62.59
Condition (18): $2 < |F_f/F_{c-d}| < 15$: 9.948
Condition (19): $0.83 < Fno_u/Fno_c$: 0.9603

Embodied Example 17

An observation apparatus provided with an objective optical system according to Embodied Example 17 is explained in detail using FIGS. 31A-31C and 32A-32L, below.

Figure 31A:
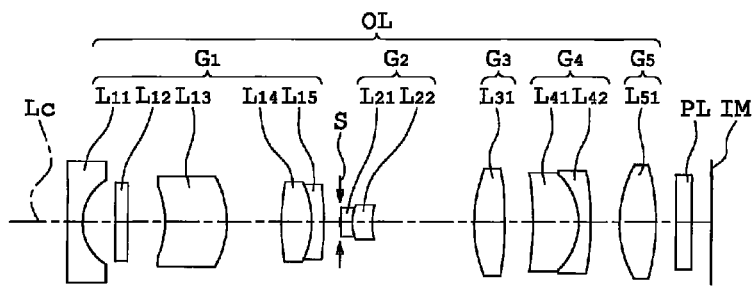
FIGS. 31A to 31C are sectional views taken along the optical axis for showing the configuration of the optical system provided for the observation apparatus according to Embodied Example 17, where
Figure 31B:
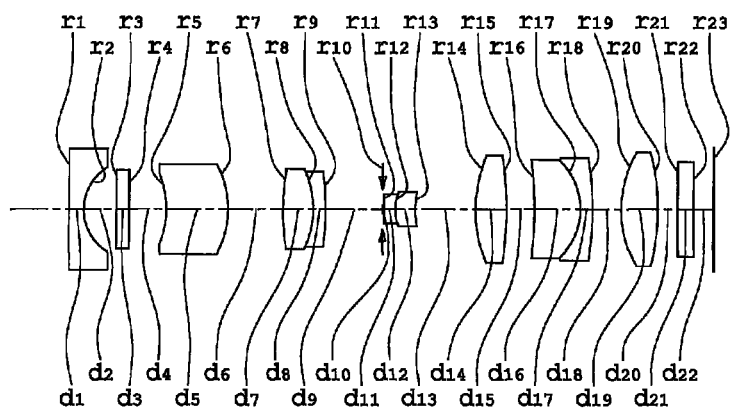
Figure 31C:
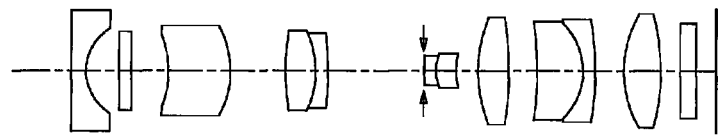
Figure 32A:
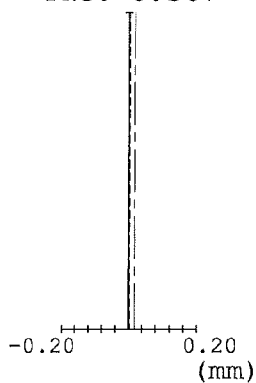
FIGS. 32A to 32L are aberration diagrams showing spherical aberration, astigmatism, distortion, and chromatic aberration of magnification in the optical system shown in FIGS. 31A-31C. To be specific.
Figure 32B:
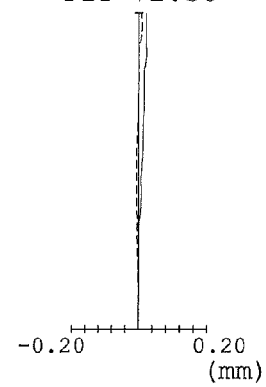
Figure 32C:
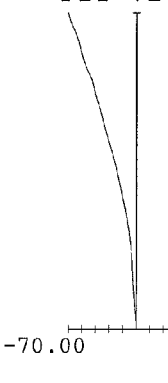
Figure 32D:
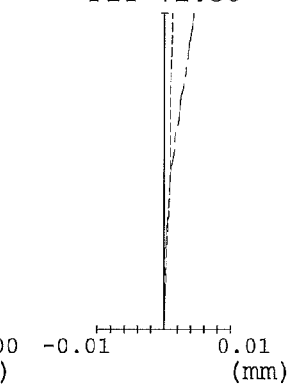
Figure 32E:
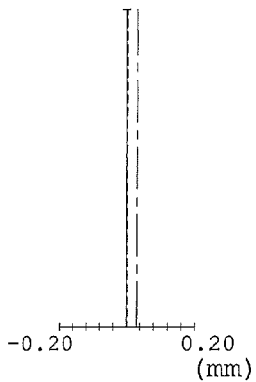
Figure 32F:
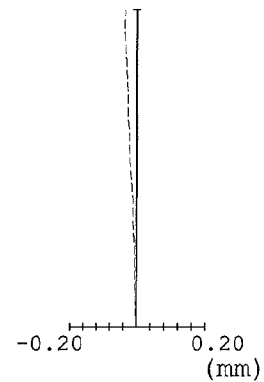
Figure 32G:
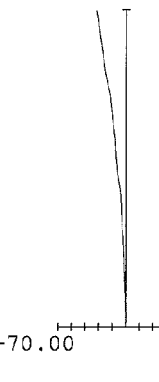
Figure 32H:
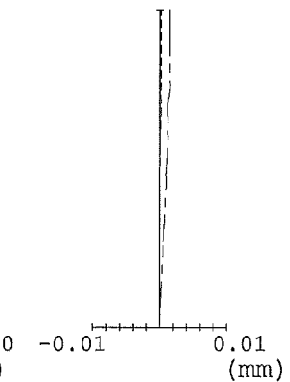
Figure 32I:
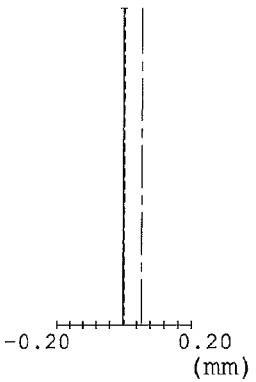
Figure 32J:
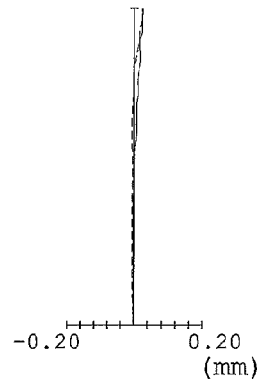
Figure 32K:
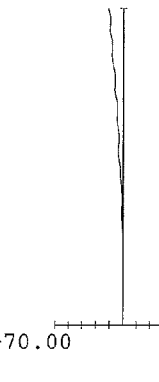
Figure 32L:
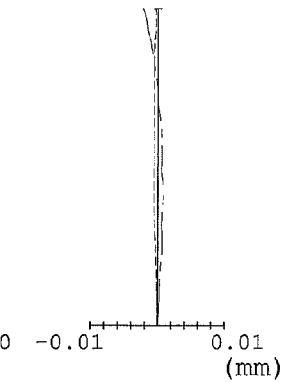

FIGS. 31A to 31C are sectional views taken along the optical axis for showing the structure of the optical system provided for this observation apparatus, where FIG. 31A shows the normal observation state of the optical system (in the farthest point state), FIG. 31B shows the middle state of the optical system (in the farthest point state), and FIG. 31C shows the close-up observation state of the optical system (in the farthest point state). FIGS. 32A to 32L are aberration diagrams showing spherical aberration, astigmatism, distortion, and chromatic aberration of magnification in the optical system shown in FIGS. 31A-31C. To be specific, FIGS. 32A to 32D show the aberrations in the normal observation state of the optical system (in the farthest point state), FIGS. 32E to 32H show the aberrations in the middle state of the optical system (in the farthest point state), and FIGS. 32I to 32L show the aberrations in the close-up observation state of the optical system (in the farthest point state).

As shown in FIGS. 31A-31C, this observation apparatus includes: an optical system which includes an objective optical system OL and a plano lens PL arranged on the image side of the objective optical system OL and substantially having no refractive power; an aperture stop S arranged in the objective optical system OL; and an image pickup element like CCD for which only its image plane IM is shown in FIGS. 31A-31C. All of these components are arranged on the optical axis Lc.

The objective optical system OL is composed of a first lens group $G_1$ having positive power and being immovable in magnification change and in focusing, a second lens group $G_2$ that is a magnification-changing group having negative power and being moved along the optical axis at least in magnification change, a third lens group $G_3$ having positive power and being immovable in magnification change and in focusing, a fourth lens group $G_4$ that is a focusing group having negative power and being moved along the optical axis at least in focusing, and a fifth lens group $G_5$ having positive power and being immovable in magnification change and in focusing, these lens groups being arranged in that order from the object side. The aperture stop S is arranged between the first lens group $G_1$ and the second lens group $G_2$ in such a way that the aperture stop S moves integrally with the second lens group $G_2$.

The first lens group $G_1$ is composed of: a lens $L_{11}$ that is a plano-concave lens having negative power with the concave surface thereof facing the image side; a lens $L_{12}$ that is a plano lens; a lens $L_{13}$ that is a meniscus lens having negative power with the convex surface thereof facing the image side; a lens $L_{14}$ that is a biconvex lens having positive power; and a lens $L_{15}$ that is a meniscus lens having negative power with the convex surface thereof facing the image side, these lenses being arranged in that order from the is object side. The lens $L_{14}$ and the lens $L_{15}$ are joined to each other.

The second lens group $G_2$ is composed of: a lens $L_{21}$ that is a plano-concave lens having negative power with the concave surface thereof facing the image side; and a lens $L_{22}$ that is a meniscus lens having positive power with the concave surface thereof facing the image side, these lenses being arranged in that order from the object side. The lens $L_{21}$ and the lens $L_{22}$ are joined to each other.

The third lens group $G_3$ is composed of a lens $L_{31}$ that is a biconvex lens having positive power.

The fourth lens group $G_4$ is composed of: a lens $L_{41}$ that is a meniscus lens having positive power with the convex surface thereof facing the image side; and a lens $L_{42}$ that is a meniscus lens having negative power with the convex surface thereof facing the image side, these lenses being arranged in that order from the object side. The lens $L_{41}$ and the lens $L_{42}$ are joined to each other.

The fifth lens group $G_5$ is composed of a lens $L_{51}$ that is a biconvex lens having positive power.

An amount of variation in magnification per movement of the second lens group $G_2$ is larger than an amount of variation in magnification per movement of the fourth lens group $G_4$ in this objective optical system OL.

This observation apparatus is formed in such a way that movement of the second lens group $G_2$ along the optical axis can change the observation state of the objective optical system reversibly and continuously: from the normal observation state in which a plurality of objects to be imaged exist in an observation area; to the close-up observation state in which the objective optical system is closed to a particular object optionally selected from these objects to be imaged by an observer so as to observe the particular object in detail.

In addition, this observation apparatus is formed in such a way that accurate focusing can be performed in every observation state of the objective optical system by moving not only the second lens group $G_2$ but also the fourth lens group $G_4$ along the optical axis.

Next, numerical data on the optical system provided for this observation apparatus is shown.

Numerical Data 15

| Unit: mm | | | | |
|---|---|---|---|---|
| Surface data | | | | |
| Surface No. s | Radius of curvature r | Surface distance d | Refractive index nd | Abbe's number vd |
| 1 | ∞ | 0.36 | 1.88300 | 40.76 |
| 2 | 1.236 | 0.82 | | |
| 3 | ∞ | 0.31 | 1.51400 | 73.43 |
| 4 | ∞ | 0.93 | | |
| 5 | −2.303 | 1.52 | 1.80518 | 25.42 |
| 6 | −2.341 | 1.35 | | |
| 7 | 5.873 | 0.76 | 1.77250 | 49.60 |
| 8 | −2.294 | 0.31 | 1.92286 | 18.90 |
| 9 | −7.147 | D9 | | |
| 10 (Stop surface) | ∞ | 0.03 | | |
| 11 | ∞ | 0.28 | 1.48749 | 70.23 |
| 12 | 1.133 | 0.50 | 1.59270 | 35.31 |
| 13 | 1.832 | D13 | | |
| 14 | 3.484 | 0.77 | 1.83481 | 42.71 |
| 15 | −8.955 | D15 | | |
| 16 | −8.878 | 1.12 | 1.48749 | 70.23 |
| 17 | −1.700 | 0.30 | 1.92286 | 18.90 |
| 18 | −7.337 | D18 | | |
| 19 | 2.774 | 0.94 | 1.51633 | 64.14 |
| 20 | −5.223 | 0.49 | | |
| 21 | ∞ | 0.40 | 1.52300 | 58.50 |
| 22 | ∞ | 0.49 | | |
| 23 (Image plane) | ∞ | | | |

| Observation state | | | | |
|---|---|---|---|---|
| | Normal observation (the farthest point) | Middle observation (the farthest point) | Close-up observation (the farthest point) | Close-up observation (the nearest point) |
| Various data on objective optical system Zoom ratio: 1.55 | | | | |
| Focal length | 0.94 | 1.20 | 1.47 | 1.45 |
| F number | 8.37 | 9.17 | 9.52 | 9.40 |
| Angle of view (2ω) | 144.50 | 96.52 | 71.88 | 71.29 |
| Image height | 0.85 | 0.85 | 0.85 | 0.85 |
| Total length (in air) | 15.81 | 15.55 | 15.12 | 14.94 |
| BF (in air) | 1.19 | 0.93 | 0.50 | 0.31 |
| Surface distance | | | | |
| D9 | 0.40 | 1.43 | 2.39 | 2.39 |
| D13 | 2.54 | 1.51 | 0.55 | 0.55 |
| D15 | 0.70 | 0.70 | 0.70 | 0.99 |
| D18 | 0.70 | 0.70 | 0.70 | 0.41 |

| Data on lens groups | | |
|---|---|---|
| Group | The first surface of lens group | Focal length |
| 1 | 1 | 1.97 |
| 2 | 11 | −4.52 |
| 3 | 14 | 3.07 |
| 4 | 16 | −5.30 |
| 5 | 19 | 3.64 |

Data on conditions

Condition (10): $3 < (m_{c-d}/m_{u-d})/(m_{c-n}/m_{c-d}) < 11$: 7.267
Condition (11): $|\Delta DT_f| < 2$: 0.4171
Condition (12): $0.2 < |(1 - \beta_f \cdot \beta_f) \times \beta_f \cdot \beta_f'| < 0.9$: 0.7089
Condition (13): $1 < |m_{c-n}/m_{c-d}| < 2$: 1.266
Condition (14): $0.7 < |F_f/F_v| < 8$: 1.171
Condition (15): $|\gamma| < 11.5$: 14.14
Condition (16): $|DT_{c-n} - DT_{c-d}| < 5$: 2.176
Condition (17): $DT_{u-d} < -50$: −61.95
Condition (18): $2 < |F_f/F_{c-d}| < 15$: 3.616
Condition (19): $0.83 < Fno_u/Fno_c$: 0.8791

Embodied Example 18

An observation apparatus provided with an objective optical system according to Embodied Example 18 is explained in detail using FIGS. 33A-33C and 34A-34L, below.

Figure 33A:
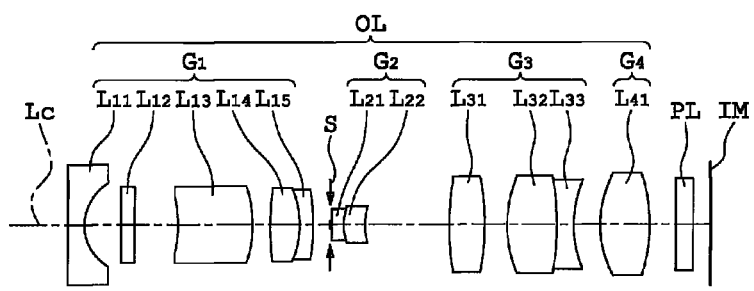
FIGS. 33A to 33C are sectional views taken along the optical axis for showing the configuration of the optical system provided for the observation apparatus according to Embodied Example 18, where
Figure 33B:
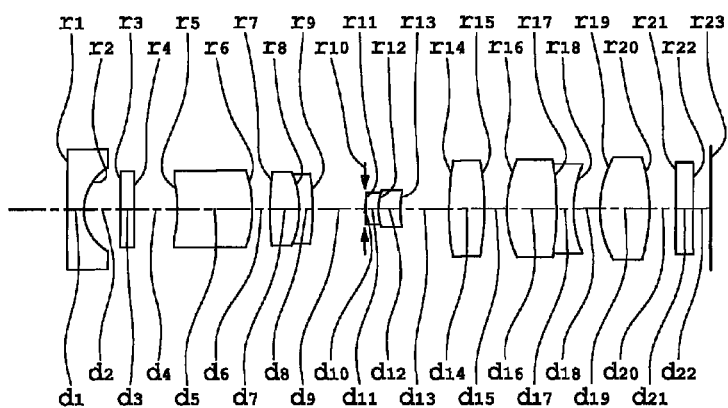
Figure 33C:
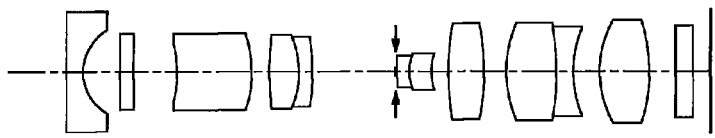

FIGS. 33A to 33C are sectional views taken along the optical axis for showing the configuration of the optical system provided for this observation apparatus, where FIG. 33A shows the normal observation state of the optical system (in the farthest point state), FIG. 33B shows the middle state of the optical system (in the farthest point state), and FIG. 33C shows the close-up observation state of the optical system (in the farthest point state). FIGS. 34A to 34L are aberration diagrams showing spherical aberration, astigmatism, distortion, and chromatic aberration of magnification in the optical system shown in FIGS. 33A-33C. To be specific, FIGS. 34A to 34D show the aberrations in the normal observation state of the optical system (in the farthest point state), FIGS. 34E to 34H show the aberrations in the middle state of the optical system (in the farthest point state), and FIGS. 34I to 34L show the aberrations in the close-up observation state of the optical system (in the farthest point state).

As shown in FIGS. 33A-33C, this observation apparatus includes: an optical system which includes an objective optical system OL and a plano lens PL arranged on the image side of the objective optical system OL and substantially having no refractive power; an aperture stop S arranged in the objective optical system OL; and an image pickup element like CCD for which only its image plane IM is shown in FIGS. 33A-33C. All of these components are arranged on the optical axis Lc.

The objective optical system OL is composed of a first lens group $G_1$ having positive power and being immovable in magnification change and in focusing, a second lens group $G_2$ that is a magnification-changing group having negative power and being moved along the optical axis at least in magnification change, a third lens group $G_3$ having positive power and being immovable in magnification change and in focusing, and a fourth lens group $G_4$ that is a focusing group having positive power and being moved along the optical axis at least in focusing, these lens groups being arranged in that order from the object side. The aperture stop S is arranged between the first lens group $G_1$ and the second lens group $G_2$ in such a way that the aperture stop S moves integrally with the second lens group $G_2$.

The first lens group $G_1$ is composed of: a lens $L_{11}$ that is a plano-concave lens having negative power with the concave surface thereof facing the image side; a lens $L_{12}$ that is a plano lens; a lens $L_{13}$ that is a meniscus lens having negative power with the convex surface thereof facing the image side; a lens $L_{14}$ that is a biconvex lens having positive power; and a lens $L_{15}$ that is a meniscus lens having negative power with the convex surface thereof facing the image side, these lenses being arranged in that order from the is object side. The lens $L_{14}$ and the lens $L_{15}$ are joined to each other.

The second lens group $G_2$ is composed of: a lens $L_{21}$ that is a plano-concave lens having negative power with the concave surface thereof facing the image side; and a lens $L_{22}$ that is a meniscus lens having positive power with the concave surface thereof facing the image side, these lenses being arranged in that order from the object side. The lens $L_{21}$ and the lens $L_{22}$ are joined to each other.

The third lens group $G_3$ is composed of: a lens $L_{31}$ that is a biconvex lens having positive power; a lens $L_{32}$ that is a biconvex lens having positive power; and a lens $L_{33}$ that is a biconcave lens having negative power, these lenses being arranged in that order from the object side. The lens $L_{32}$ and the lens $L_{33}$ are joined to each other.

The fourth lens group $G_4$ is composed of a lens $L_{41}$ that is a biconvex lens having positive power.

An amount of variation in magnification per movement of the second lens group $G_2$ is larger than an amount of variation in magnification per movement of the fourth lens group $G_4$ in this objective optical system OL.

This observation apparatus is formed in such a way that movement of the second lens group $G_2$ along the optical axis can change the observation state of the objective optical system reversibly and continuously: from the normal observation state in which a plurality of objects to be imaged exist in an observation area; to the close-up observation state in which the objective optical system is closed to a particular object optionally selected from these objects to be imaged by an observer so as to observe the particular object in detail.

In addition, this observation apparatus is formed in such a way that accurate focusing can be performed in every observation state of the objective optical system by moving not only the second lens group $G_2$ but also the fourth lens group $G_4$ along the optical axis.

Next, numerical data on the optical system provided for this observation apparatus is shown.

Numerical Data 16

Unit: mm

Surface data

| Surface No. s | Radius of curvature r | Surface distance d | Refractive index nd | Abbe's number vd |
|---|---|---|---|---|
| 1 | ∞ | 0.36 | 1.88300 | 40.76 |
| 2 | 1.119 | 0.82 | | |
| 3 | ∞ | 0.31 | 1.51400 | 73.43 |
| 4 | ∞ | 1.01 | | |
| 5 | −2.766 | 1.70 | 1.80518 | 25.42 |
| 6 | −2.774 | 0.40 | | |
| 7 | 6.976 | 0.68 | 1.77250 | 49.60 |
| 8 | −2.077 | 0.31 | 1.92286 | 18.90 |
| 9 | −4.877 | D9 | | |
| 10 (Stop surface) | ∞ | 0.03 | | |
| 11 | ∞ | 0.28 | 1.48749 | 70.23 |
| 12 | 1.186 | 0.50 | 1.59270 | 35.31 |
| 13 | 1.702 | D13 | | |
| 14 | 6.544 | 0.80 | 1.83481 | 42.71 |
| 15 | −5.645 | 0.50 | | |
| 16 | 2.820 | 1.15 | 1.48749 | 70.23 |
| 17 | −7.053 | 0.39 | 1.92286 | 18.90 |
| 18 | 2.554 | D18 | | |
| 19 | 2.451 | 1.13 | 1.51633 | 64.14 |
| 20 | −3.932 | D20 | | |
| 21 | ∞ | 0.40 | 1.52300 | 58.50 |
| 22 | ∞ | 0.40 | | |
| 23 (Image plane) | ∞ | | | |

Observation state

| | Normal observation the farthest point) | Middle observation (the farthest point) | Close-up observation (the farthest point) | Close-up observation (the nearest point) |
|---|---|---|---|---|
| Various data on objective optical system Zoom ratio: 1.39 | | | | |
| Focal length | 0.94 | 1.14 | 1.31 | 1.28 |
| F number | 8.79 | 9.37 | 9.52 | 9.31 |
| Angle of view (2ω) | 144.10 | 100.51 | 78.22 | 78.83 |
| Image height | 0.85 | 0.85 | 0.85 | 0.85 |
| Total length (in air) | 14.49 | 14.24 | 13.88 | 13.81 |
| BF (in air) | 1.22 | 0.97 | 0.61 | 0.65 |
| Surface distance | | | | |
| D9 | 0.40 | 1.19 | 1.90 | 1.90 |
| D13 | 1.90 | 1.12 | 0.40 | 0.40 |
| D18 | 0.60 | 0.60 | 0.60 | 0.49 |
| D20 | 0.60 | 0.60 | 0.60 | 0.71 |

Data on lens groups

| Group | The first surface of lens group | Focal length |
|---|---|---|
| 1 | 1 | 1.68 |
| 2 | 11 | −4.00 |
| 3 | 14 | 4.44 |
| 4 | 19 | 3.10 |

Data on conditions

Condition (10): $3 < (m_{c-d}/m_{u-d})/(m_{c-n}/m_{c-d}) < 11$: 9.000
Condition (11): $|\Delta DT_j| < 2$: 0.6486

-continued

Unit: mm

Condition (12)': $0.2 < (1 - \beta_f \cdot \beta_f) < 0.9$: 0.8099
Condition (13): $1 < |m_{c-n}/m_{c-d}| < 2$: 1.120
Condition (14): $0.7 < |F_f/F_v| < 8$: 0.7750
Condition (15): $|\gamma| < 11.5$: 2.359
Condition (16): $|DT_{c-n} - DT_{c-d}| < 5$: 0.8418
Condition (17): $DT_{u-d} < -50$: -62.19
Condition (18): $2 < |F_f/F_{c-d}| < 15$: 2.360
Condition (19): $0.83 < Fno_u/Fno_c$: 0.9233

Embodied Example 19

An observation apparatus provided with an objective optical system according to Embodied Example 19 is explained in detail using FIGS. 35A-35C and 36A-36L, below.

Figure 35A:
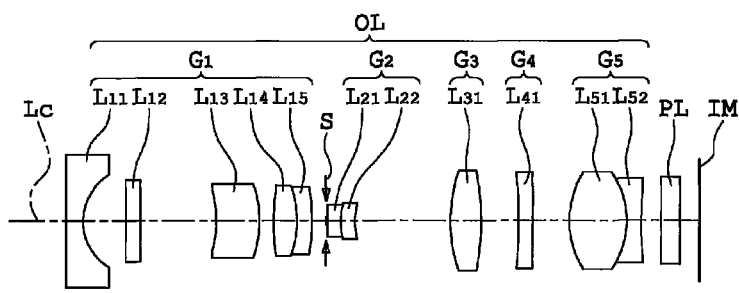
FIGS. 35A to 35C are sectional views taken along the optical axis for showing the configuration of the optical system provided for the observation apparatus according to Embodied Example 19, where
Figure 35B:
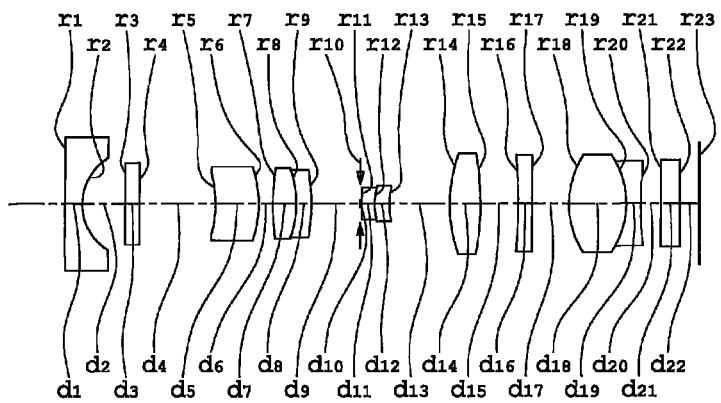
Figure 35C:
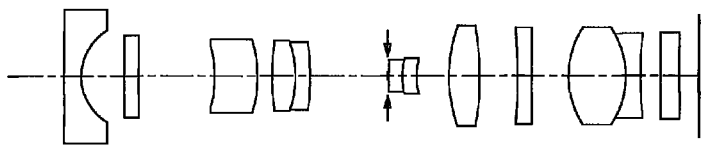

FIGS. 35A to 35C are sectional views taken along the optical axis for showing the configuration of the optical system provided for this observation apparatus, where FIG. 35A shows the normal observation state of the optical system (in the farthest point state), FIG. 35B shows the middle state of the optical system (in the farthest point state), and FIG. 35C shows the close-up observation state of the optical system (in the farthest point state). FIGS. 36A to 36L are aberration diagrams showing spherical aberration, astigmatism, distortion, and chromatic aberration of magnification in the optical system shown in FIGS. 35A-35C. To be specific, FIGS. 36A to 36D show the aberrations in the normal observation state of the optical system (in the farthest point state), FIGS. 36E to 36H show the aberrations in the middle state of the optical system (in the farthest point state), and FIGS. 36I to 36L show the aberrations in the close-up observation state of the optical system (in the farthest point state).

As shown in FIGS. 35A-35C, this observation apparatus includes: an optical system which includes an objective optical system OL and a plano lens PL arranged on the image side of the objective optical system OL and substantially having no refractive power; an aperture stop S arranged in the objective optical system OL; and an image pickup element like CCD for which only its image plane IM is shown in FIGS. 35A-35C. All of these components are arranged on the optical axis Lc.

The objective optical system OL is composed of a first lens group $G_1$ having positive power and being immovable in magnification change and in focusing, a second lens group $G_2$ that is a magnification-changing group having negative power and being moved along the optical axis at least in magnification change, a third lens group $G_3$ having positive power and being immovable in magnification change and in focusing, a fourth lens group $G_4$ that is a focusing group having negative power and being moved along the optical axis at least in focusing, and a fifth lens group $G_5$ having negative power and being immovable in magnification change and in focusing, these lens groups being arranged in that order from the object side. The aperture stop S is arranged between the first lens group $G_1$ and the second lens group $G_2$ in such a way that the aperture stop S moves integrally with the second lens group $G_2$.

The first lens group $G_1$ is composed of: a lens $L_{11}$ that is a plano-concave lens having negative power with the concave surface thereof facing the image side; a lens $L_{12}$ that is a plano lens; a lens $L_{13}$ that is a meniscus lens having negative power with the convex surface thereof facing the image side; a lens $L_{14}$ that is a biconvex lens having positive power; and a lens $L_{15}$ that is a meniscus lens having negative power with the convex surface thereof facing the image side, these lenses being arranged in that order from the object side. The lens $L_{14}$ and the lens $L_{15}$ are joined to each other.

The second lens group $G_2$ is composed of: a lens $L_{21}$ that is a plano-concave lens having negative power with the concave surface thereof facing the image side; and a lens is $L_{22}$ that is a meniscus lens having positive power with the concave surface thereof facing the image side, these lenses being arranged in that order from the object side. The lens $L_{21}$ and the lens $L_{22}$ are joined to each other.

The third lens group $G_3$ is composed of a lens $L_{31}$ that is a biconvex lens having positive power.

The fourth lens group $G_4$ is composed of a lens $L_{41}$ that is a plano-concave lens having negative power with the planar surface thereof facing the image side.

The fifth lens group $G_5$ is composed of: a lens $L_{51}$ that is a biconvex lens having positive power; and a lens $L_{52}$ that is a biconcave lens having negative power, these lenses being arranged in that order from the object side. The lens $L_{51}$ and the lens $L_{52}$ are joined to each other.

An amount of variation in magnification per movement of the second lens group $G_2$ is larger than an amount of variation in magnification per movement of the fourth lens group $G_4$ in this objective optical system OL.

This observation apparatus is formed in such a way that movement of the second lens group $G_2$ along the optical axis can change the observation state of the objective optical system reversibly and continuously: from the normal observation state in which a plurality of objects to be imaged exist in an observation area; to the close-up observation state in which the objective optical system is closed to a particular object optionally selected from these objects to be imaged by an observer so as to observe the particular object in detail.

In addition, this observation apparatus is formed in such a way that accurate focusing can be performed in every observation state of the objective optical system by moving not only the second lens group $G_2$ but also the fourth lens group $G_4$ along the optical axis.

Next, numerical data on the optical system provided for this observation apparatus is shown.
Numerical Data 17

Unit: mm

Surface data

| Surface No. s | Radius of curvature r | Surface distance d | Refractive index nd | Abbe's number vd |
|---|---|---|---|---|
| 1 | ∞ | 0.36 | 1.88300 | 40.76 |
| 2 | 1.150 | 0.92 | | |
| 3 | ∞ | 0.31 | 1.51400 | 73.43 |
| 4 | ∞ | 1.63 | | |
| 5 | -2.471 | 0.92 | 2.00330 | 28.27 |
| 6 | -2.548 | 0.30 | | |
| 7 | 5.479 | 0.49 | 1.77250 | 49.60 |
| 8 | -2.177 | 0.31 | 1.92286 | 18.90 |
| 9 | -4.829 | D9 | | |
| 10 (Stop surface) | ∞ | 0.03 | | |
| 11 | ∞ | 0.28 | 1.48749 | 70.23 |
| 12 | 1.541 | 0.31 | 1.59270 | 35.31 |
| 13 | 1.619 | D13 | | |
| 14 | 3.255 | 0.65 | 1.72916 | 54.68 |
| 15 | -6.145 | D15 | | |
| 16 | -12.528 | 0.30 | 1.92286 | 20.88 |
| 17 | ∞ | D17 | | |
| 18 | 1.904 | 1.22 | 1.48749 | 70.23 |
| 19 | -1.857 | 0.30 | 1.92286 | 18.90 |
| 20 | 9.862 | 0.42 | | |

-continued

Unit: mm

| | | | | |
|---|---|---|---|---|
| 21 | ∞ | 0.40 | 1.52300 | 58.50 |
| 22 | ∞ | 0.42 | | |
| 23 (Image plane) | ∞ | | | |

Observation state

| | Normal observation (the farthest point) | Middle observation (the farthest point) | Close-up observation (the farthest point) | Close-up observation (the nearest point) |
|---|---|---|---|---|
| Various data on objective optical system Zoom ratio: 1.28 | | | | |
| Focal length | 0.92 | 1.08 | 1.18 | 1.13 |
| F number | 9.07 | 9.35 | 9.01 | 8.62 |
| Angle of view (2ω) | 144.60 | 98.33 | 76.86 | 76.78 |
| Image height | 0.85 | 0.85 | 0.85 | 0.85 |
| Total length (in air) | 13.32 | 13.08 | 12.77 | 12.64 |
| BF (in air) | 1.06 | 0.82 | 0.51 | 0.38 |
| Surface distance | | | | |
| D9 | 0.30 | 1.03 | 1.64 | 1.64 |
| D13 | 2.03 | 1.30 | 0.69 | 0.69 |
| D15 | 0.80 | 0.80 | 0.80 | 1.28 |
| D17 | 0.80 | 0.80 | 0.80 | 0.32 |

Data on lens groups

| Group | The first surface of lens group | Focal length |
|---|---|---|
| 1 | 1 | 1.51 |
| 2 | 11 | −3.40 |
| 3 | 14 | 2.99 |
| 4 | 16 | −13.42 |
| 5 | 18 | −166.02 |

Data on conditions

Condition (10): $3 < (m_{c-d}/m_{u-d})/(m_{c-n}/m_{c-d}) < 11$: 7.998
Condition (11): $|ADT_f| < 2$: 1.829
Condition (12): $0.2 < |(1 - \beta_f \cdot \beta_f) \times \beta_f' \cdot \beta_f'| < 0.9$: 0.4281
Condition (13): $1 < |m_{c-n}/m_{c-d}| < 2$: 1.280
Condition (14): $0.7 < |F_f/F_v| < 8$: 3.944
Condition (15): $|\gamma| < 11.5$: 9.450
Condition (16): $|DT_{c-n} - DT_{c-d}| < 5$: 2.003
Condition (17): $DT_{u-d} < -50$: −61.82
Condition (18): $2 < |F_f/F_{c-d}| < 15$: 11.39
Condition (19): $0.83 < Fno_u/Fno_c$: 1.005

Embodied Example 20

An observation apparatus provided with an objective optical system according to Embodied Example 20 is explained in detail using FIGS. 37A-37C and 38A-38L, below.

Figure 37A:
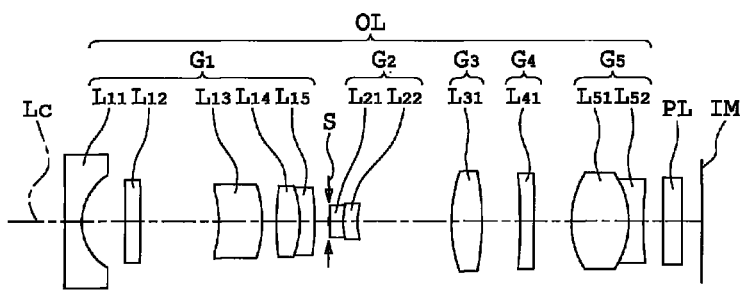
FIGS. 37A to 37C are sectional views taken along the optical axis for showing the configuration of the optical system provided for the observation apparatus according to Embodied Example 20, where
Figure 37B:
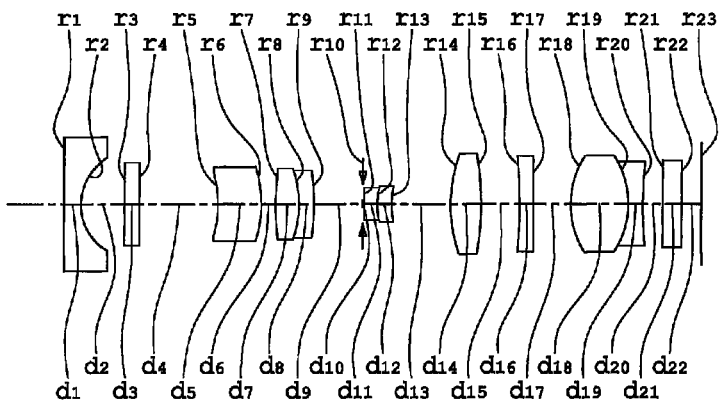
Figure 37C:
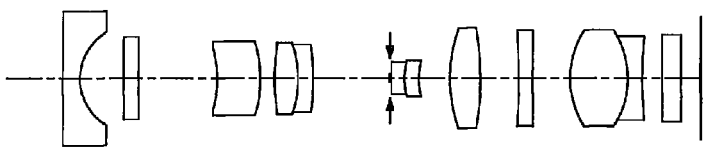
Figures 38A, 38B, 38C, 38D, 38E, 38F, 38G, 38H, 38I, 38J, 38K, 38L:
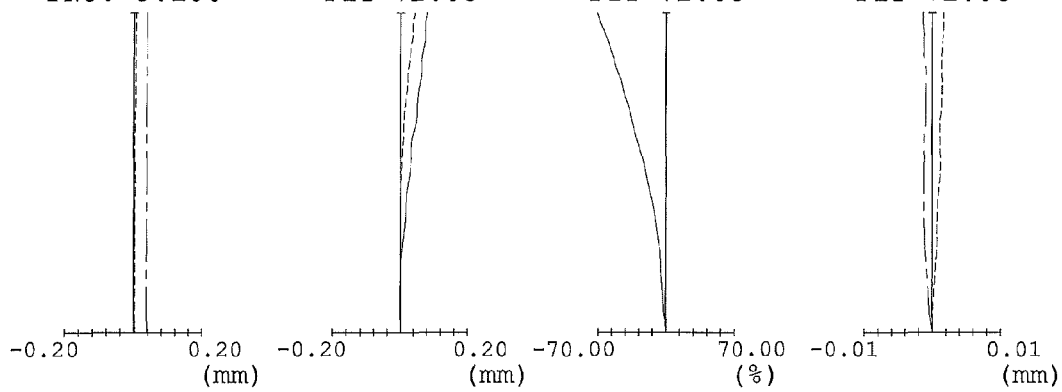
FIGS. 38A to 38L are aberration diagrams showing spherical aberration, astigmatism, distortion, and chromatic aberration of magnification in the optical system shown in FIGS. 37A-37C. To be specific.

FIGS. 37A to 37C are sectional views taken along the optical axis for showing the configuration of the optical system provided for this observation apparatus, where FIG. 37A shows the normal observation state of the optical system (in the farthest point state), FIG. 37B shows the middle state of the optical system (in the farthest point state), and FIG. 37C shows the close-up observation state of the optical system (in the farthest point state). FIGS. 38A to 38L are aberration diagrams showing spherical aberration, astigmatism, distortion, and chromatic aberration of magnification in the optical system shown in FIGS. 37A-37C. To be specific, FIGS. 38A to 38D show the aberrations in the normal observation state of the optical system (in the farthest point state), FIGS. 38E to 38H show the aberrations in the middle state of the optical system (in the farthest point state), and FIGS. 38I to 38L show the aberrations in the close-up observation state of the optical system (in the farthest point state).

As shown in FIGS. 37A-37C, this observation apparatus includes: an optical system which includes an objective optical system OL and a plano lens PL arranged on the image side of the objective optical system OL and substantially having no refractive power; an aperture stop S arranged in the objective optical system OL; and an image pickup element like CCD for which only its image plane IM is shown in FIGS. 37A-37C. All of these components are arranged on the optical axis Lc.

The objective optical system OL is composed of a first lens group $G_1$ having positive power and being immovable in magnification change and in focusing, a second lens group $G_2$ that is a magnification-changing group having negative power and being moved along the optical axis at least in magnification change, a third lens group $G_3$ having positive power and being immovable in magnification change and in focusing, a fourth lens group $G_4$ that is a focusing group having negative power and being moved along the optical axis at least in focusing, and a fifth lens group $G_5$ having negative power and being immovable in magnification change and in focusing, these lens groups being arranged in that order from the object side. The aperture stop S is arranged between the first lens group $G_1$ and the second lens group $G_2$ in such a way that the aperture stop S moves integrally with the second lens group $G_2$.

The first lens group $G_1$ is composed of: a lens $L_{11}$ that is a plano-concave lens having negative power with the concave surface thereof facing the image side; a lens $L_{12}$ that is a plano lens; a lens $L_{13}$ that is a meniscus lens having negative power with the convex surface thereof facing the image side; a lens $L_{14}$ that is a biconvex lens having positive power; and a lens $L_{15}$ that is a meniscus lens having negative power with the convex surface thereof facing the image side, these lenses being arranged in that order from the object side. The lens $L_{14}$ and the lens $L_{15}$ are joined to each other.

The second lens group $G_2$ is composed of: a lens $L_{21}$ that is a plano-concave lens having negative power with the concave surface thereof facing the image side; and a lens is $L_{22}$ that is a meniscus lens having positive power with the concave surface thereof facing the image side, these lenses being arranged in that order from the object side. The lens $L_{21}$ and the lens $L_{22}$ are joined to each other.

The third lens group $G_3$ is composed of a lens $L_{31}$ that is a biconvex lens having positive power.

The fourth lens group $G_4$ is composed of a lens $L_{41}$ that is a plano-concave lens having negative power with the planar surface thereof facing the image side.

The fifth lens group $G_5$ is composed of: a lens $L_{51}$ that is a biconvex lens having positive power; and a lens $L_{52}$ that is a biconcave lens having negative power, these lenses being arranged in that order from the object side. The lens $L_{51}$ and the lens $L_{52}$ are joined to each other.

An amount of variation in magnification per movement of the second lens group $G_2$ is larger than an amount of variation in magnification per movement of the fourth lens group $G_4$ in this objective optical system OL.

This observation apparatus is formed in such a way that movement of the second lens group $G_2$ along the optical axis can change the observation state of the objective optical system reversibly and continuously: from the normal observation state in which a plurality of objects to be imaged exist in an observation area; to the close-up observation state in which the objective optical system is closed to a particular object optionally selected from these objects to be imaged by an observer so as to observe the particular object in detail.

In addition, this observation apparatus is formed in such a way that accurate focusing can be performed in every observation state of the objective optical system by moving not only the second lens group $G_2$ but also the fourth lens group $G_4$ along the optical axis.

Next, numerical data on the optical system provided for this observation apparatus is shown.

Numerical Data 18

Unit: mm

Surface data

| Surface No. s | Radius of curvature r | Surface distance d | Refractive index nd | Abbe's number vd |
|---|---|---|---|---|
| 1 | ∞ | 0.36 | 1.88300 | 40.76 |
| 2 | 1.150 | 0.93 | | |
| 3 | ∞ | 0.31 | 1.51400 | 73.43 |
| 4 | ∞ | 1.65 | | |
| 5 | −2.477 | 0.92 | 2.00330 | 28.27 |
| 6 | −2.561 | 0.30 | | |
| 7 | 5.396 | 0.50 | 1.77250 | 49.60 |
| 8 | −2.185 | 0.31 | 1.92286 | 18.90 |
| 9 | −4.886 | D9 | | |
| 10 (Stop surface) | ∞ | 0.03 | | |
| 11 | ∞ | 0.28 | 1.48749 | 70.23 |
| 12 | 1.526 | 0.31 | 1.59270 | 35.31 |
| 13 | 1.622 | D13 | | |
| 14 | 3.214 | 0.64 | 1.72916 | 54.68 |
| 15 | −6.436 | D15 | | |
| 16 | −13.052 | 0.30 | 1.92286 | 20.88 |
| 17 | ∞ | D17 | | |
| 18 | 1.900 | 1.22 | 1.48749 | 70.23 |
| 19 | −1.871 | 0.30 | 1.92286 | 18.90 |
| 20 | 9.099 | 0.42 | | |
| 21 | ∞ | 0.40 | 1.52300 | 58.50 |
| 22 | ∞ | 0.42 | | |
| 23 (Image plane) | ∞ | | | |

Observation state

| | Normal observation (the farthest point) | Middle observation (the farthest point) | Close-up observation (the farthest point) | Close-up observation (the nearest point) |
|---|---|---|---|---|
| Various data on objective optical system Zoom ratio: 1.27 | | | | |
| Focal length | 0.92 | 1.08 | 1.18 | 1.13 |
| F number | 9.11 | 9.37 | 9.01 | 8.67 |
| Angle of view (2ω) | 144.38 | 98.04 | 76.93 | 76.82 |
| Image height | 0.85 | 0.85 | 0.85 | 0.85 |
| Total length (in air) | 13.32 | 13.08 | 12.77 | 12.66 |
| BF (in air) | 1.06 | 0.82 | 0.52 | 0.40 |
| Surface distance | | | | |
| D9 | 0.30 | 1.04 | 1.64 | 1.64 |
| D13 | 2.01 | 1.28 | 0.68 | 0.68 |
| D15 | 0.80 | 0.80 | 0.80 | 1.23 |
| D17 | 0.80 | 0.80 | 0.80 | 0.37 |

Data on lens groups

| Group | The first surface of lens group | Focal length |
|---|---|---|
| 1 | 1 | 1.51 |
| 2 | 11 | −3.42 |
| 3 | 14 | 3.01 |
| 4 | 16 | −13.99 |
| 5 | 18 | −96.86 |

Unit: mm

Data on conditions

Condition (10): $3 < (m_{c-d}/m_{u-d})/(m_{c-n}/m_{c-d}) < 11$: 9.073
Condition (11): $|\Delta DT_f| < 2$: 1.927
Condition (12): $0.2 < |(1 - \beta_f \cdot \beta_f) \times \beta_f' \cdot \beta_r'| < 0.9$: 0.4123
Condition (13): $1 < |m_{c-n}/m_{c-d}| < 2$: 1.244
Condition (14): $0.7 < |F_f/F_v| < 8$: 4.087
Condition (15): $|\gamma| < 11.5$: 9.450
Condition (16): $|DT_{c-n} - DT_{c-d}| < 5$: 1.767
Condition (17): $DT_{u-d} < -50$: −62.09
Condition (18): $2 < |F_f/F_{c-d}| < 15$: 11.89
Condition (19): $0.83 < Fno_u/Fno_c$: 1.010

Embodied Example 21

An observation apparatus provided with an objective optical system according to Embodied Example 21 is explained in detail using FIGS. 39A-39C and 40A-40L, below.

Figure 39A:
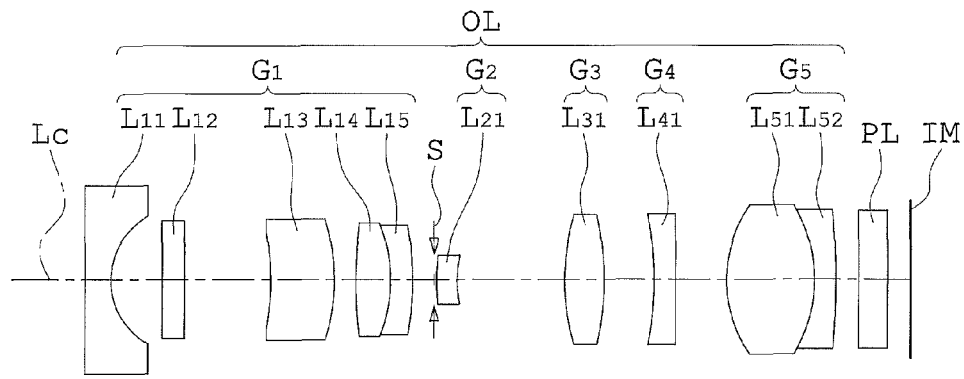
FIGS. 39A to 39C are sectional view taken along the optical axis for showings the configuration of the optical system provided for the observation apparatus according to Embodied Example 21, where
Figure 39B:
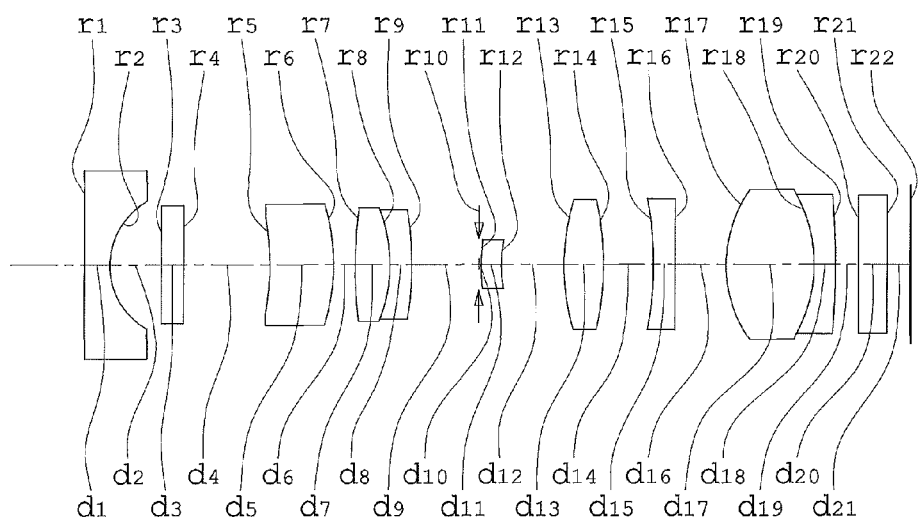
Figure 39C:
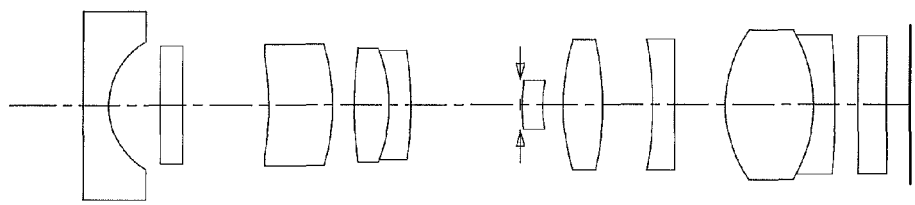

FIGS. 39A to 39C are sectional views taken along the optical axis for showing the configuration of the optical system provided for this observation apparatus, where FIG. 39A shows the normal observation state of the optical system (in the farthest point state), FIG. 39B shows the middle state of the optical system (in the farthest point state), and FIG. 39C shows the close-up observation state of the optical system (in the farthest point state). FIGS. 40A to 40L are aberration diagrams showing spherical aberration, astigmatism, distortion, and chromatic aberration of magnification in the optical system shown in FIGS. 39A-39C. To be specific, FIGS. 40A to 40D show the aberrations in the normal observation state of the optical system (in the farthest point state), FIGS. 40E to 40H show the aberrations in the middle state of the optical system (in the farthest point state), and FIGS. 40I to 40L show the aberrations in the close-up observation state of the optical system (in the farthest point state).

As shown in FIGS. 39A-39C, this observation apparatus includes: an optical system which includes an objective optical system OL and a plano lens PL arranged on the image side of the objective optical system OL and substantially having no refractive power; an aperture stop S arranged in the objective optical system OL; and an image pickup element like CCD for which only its image plane IM is shown in FIGS. 39A-39C. All of these components are arranged on the optical axis Lc.

The objective optical system OL is composed of a first lens group $G_1$ having positive power and being immovable in magnification change and in focusing, a second lens group $G_2$ that is a magnification-changing group having negative power and being moved along the optical axis at least in magnification change, a third lens group $G_3$ having positive power and being immovable in magnification change and in focusing, a fourth lens group $G_4$ that is a focusing group having negative power and being moved along the optical axis at least in focusing, and a fifth lens group $G_5$ having positive power and being immovable in magnification change and in focusing, these lens groups being arranged in that order from the object side. The aperture stop S is arranged between the first lens group $G_1$ and the second lens group $G_2$ in such a way that the aperture stop S moves integrally with the second lens group $G_2$.

The first lens group $G_1$ is composed of: a lens $L_{11}$ that is a plano-concave lens having negative power with the concave surface thereof facing the image side; a lens $L_{12}$ that is a plano lens; a lens $L_{13}$ that is a meniscus lens having positive power with the convex surface thereof facing the image side; a lens $L_{14}$ that is a biconvex lens having positive power; and a lens $L_{15}$ that is a meniscus lens having negative power with the convex surface thereof facing the image side, these lenses being arranged in that order from the object side. The lens $L_{14}$ and the lens $L_{15}$ are joined to each other.

The second lens group $G_2$ is composed of a lens $L_{21}$ that is a meniscus lens having negative power with the concave surface thereof facing the image side.

The third lens group $G_3$ is composed of a lens $L_{31}$ that is a biconvex lens having positive power.

The fourth lens group $G_4$ is composed of a lens $L_{41}$ that is a biconcave lens having negative power.

The fifth lens group $G_5$ is composed of: a lens $L_{51}$ that is a biconvex lens having positive power; and a lens $L_{52}$ that is a meniscus lens having negative power with the convex surface thereof facing the image side, these lenses being arranged in that order from the object side. The lens $L_{51}$ and the lens $L_{52}$ are joined to each other.

An amount of variation in magnification per movement of the second lens group $G_2$ is larger than an amount of variation in magnification per movement of the fourth lens group $G_4$ in this objective optical system OL.

This observation apparatus is formed in such a way that movement of the second lens group $G_2$ along the optical axis can change the observation state of the objective optical system reversibly and continuously: from the normal observation state in which a plurality of objects to be imaged exist in an observation area; to the close-up observation state in which the objective optical system is closed to a particular object optionally selected from these objects to be imaged by an observer so as to observe the particular object in detail.

In addition, this observation apparatus is formed in such a way that accurate focusing can be performed in every observation state of the objective optical system by moving not only the second lens group $G_2$ but also the fourth lens group $G_4$ along the optical axis.

Next, numerical data on the optical system provided for this observation apparatus is shown.

Numerical Data 19

Unit: mm

Surface data

| Surface No. s | Radius of curvature r | Surface distance d | Refractive index nd | Abbe's number vd |
|---|---|---|---|---|
| 1 | ∞ | 0.36 | 1.88300 | 40.76 |
| 2 | 1.026 | 0.71 | | |
| 3 | ∞ | 0.31 | 1.51400 | 73.43 |
| 4 | ∞ | 1.19 | | |
| 5 | −3.836 | 0.90 | 2.00330 | 28.27 |
| 6 | −2.771 | 0.30 | | |
| 7 | 5.840 | 0.49 | 1.77250 | 49.60 |
| 8 | −2.120 | 0.31 | 1.92286 | 18.90 |
| 9 | −4.469 | D9 | | |
| 10 (Stop surface) | ∞ | 0.03 | | |
| 11 | 33.913 | 0.28 | 1.48749 | 70.23 |
| 12 | 1.621 | D12 | | |
| 13 | 3.131 | 0.55 | 1.72916 | 54.68 |
| 14 | −4.154 | D14 | | |
| 15 | −4.729 | 0.30 | 1.92286 | 20.88 |
| 16 | 2485.252 | D16 | | |
| 17 | 1.824 | 1.23 | 1.48749 | 70.23 |
| 18 | −2.033 | 0.30 | 1.92286 | 18.90 |
| 19 | −11.079 | 0.32 | | |
| 20 | ∞ | 0.40 | 1.52300 | 58.50 |
| 21 | ∞ | 0.32 | | |
| 22 (Image plane) | ∞ | | | |

Observation state

| | Normal observation (the farthest point) | Middle observation (the farthest point) | Close-up observation (the farthest point) | Close-up observation (the nearest point) |
|---|---|---|---|---|
| Various data on objective optical system Zoom ratio: 1.26 | | | | |
| Focal length | 0.93 | 1.07 | 1.17 | 1.14 |
| F number | 8.26 | 8.35 | 8.00 | 7.78 |
| Angle of view (2ω) | 144.18 | 104.39 | 81.32 | 80.29 |
| Image height | 0.85 | 0.85 | 0.85 | 0.85 |
| Total length (in air) | 11.32 | 11.09 | 10.78 | 10.66 |
| BF (in air) | 0.85 | 0.62 | 0.31 | 0.19 |
| Surface distance | | | | |
| D9 | 0.30 | 0.90 | 1.50 | 1.50 |
| D12 | 1.50 | 0.89 | 0.30 | 0.30 |
| D14 | 0.70 | 0.70 | 0.70 | 0.88 |
| D16 | 0.70 | 0.70 | 0.70 | 0.52 |

Data on lens groups

| Group | The first surface of lens group | Focal length |
|---|---|---|
| 1 | 1 | 1.53 |
| 2 | 11 | −3.49 |
| 3 | 13 | 2.52 |
| 4 | 15 | −5.06 |
| 5 | 17 | 6.17 |

Data on conditions

Condition (10): $3 < (m_{c-d}/m_{u-d})/(m_{c-n}/m_{c-d}) < 11$: 8.128
Condition (11): $|ADT_f| < 2$: 1.635
Condition (12): $0.2 < |(1 - \beta_f \cdot \beta_f) \times \beta_f' \cdot \beta_f'| < 0.9$: 0.8636
Condition (13): $1 < |m_{c-n}/m_{c-d}| < 2$: 1.240
Condition (14): $0.7 < |F_f/F_v| < 8$: 1448
Condition (15): $|\gamma| < 11.5$: 14.97
Condition (16): $|DT_{c-n} - DT_{c-d}| < 5$: 2.171
Condition (17): $DT_{u-d} < -50$: −62.28
Condition (18): $2 < |F_f/F_{c-d}| < 15$: 4.319
Condition (19): $0.83 < Fno_u/Fno_c$: 1.031

Embodied Example 22

An observation apparatus provided with an objective optical system according to Embodied Example 22 is explained in detail using FIGS. 41A-41C and 42A-42L, below.

Figure 41A:
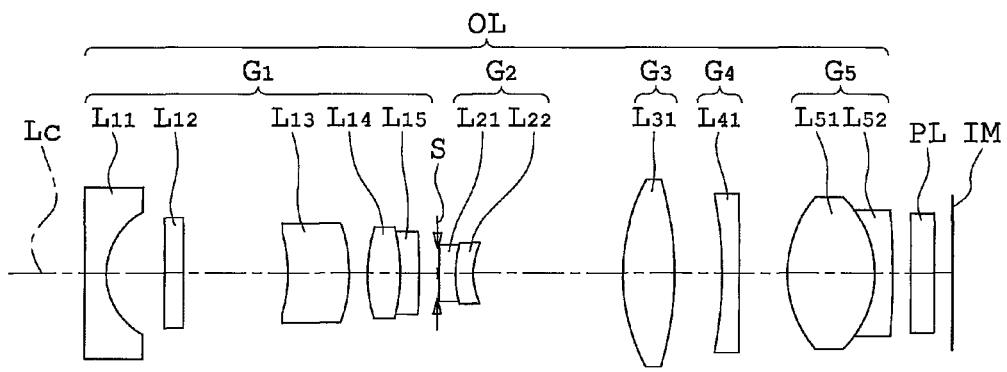
FIGS. 41A to 41C are sectional views taken along the optical axis for showing the configuration of the optical system provided for the observation apparatus according to Embodied Example 22, where
Figure 41B:
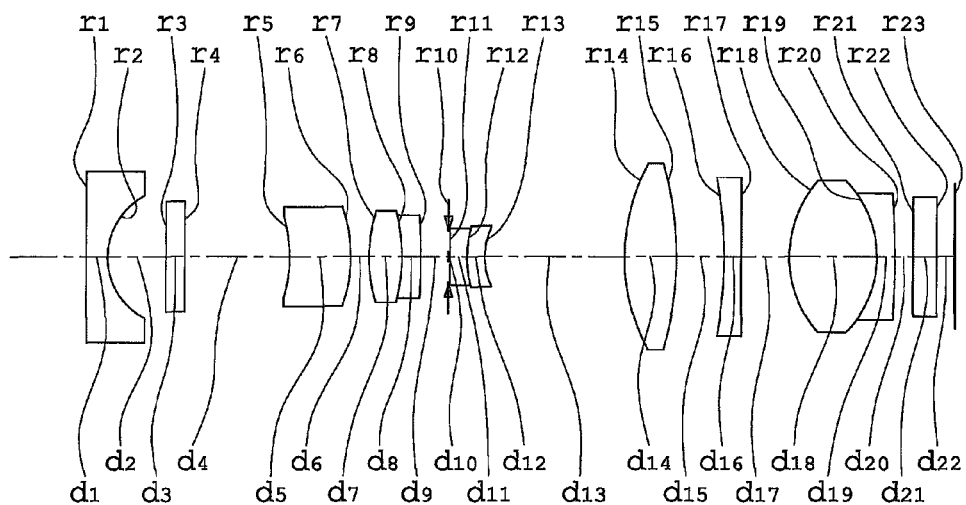
Figure 41C:
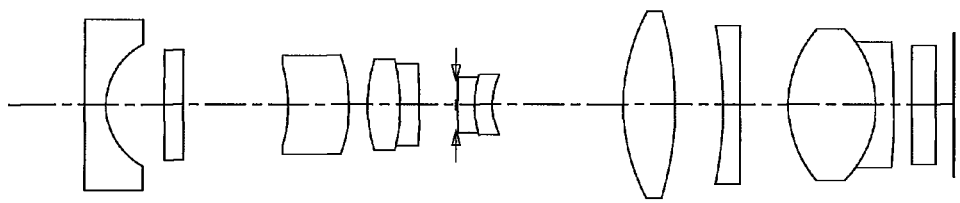
Figure 42A:
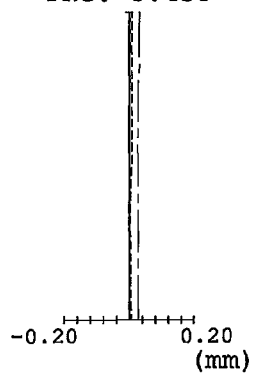
FIGS. 42A to 42L are aberration diagrams showing spherical aberration, astigmatism, distortion, and chromatic aberration of magnification in the optical system shown in FIGS. 41A-41C. To be specific.
Figure 42B:
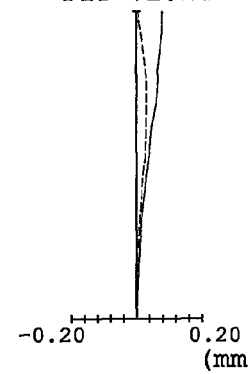
Figure 42C:
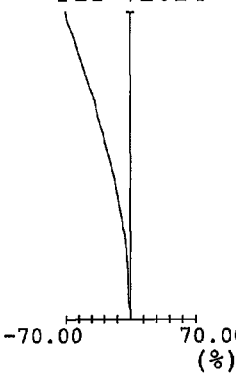
Figure 42D:
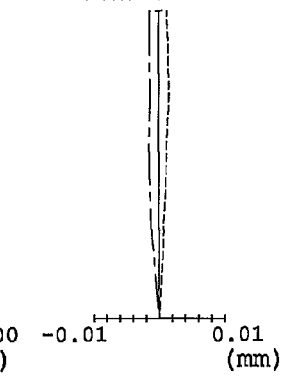
Figure 42E:
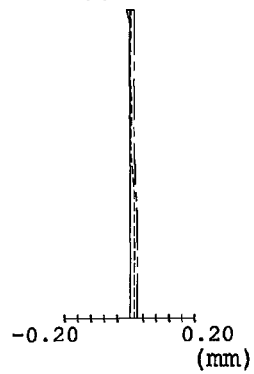
Figure 42F:
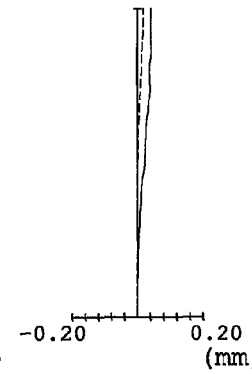
Figure 42G:
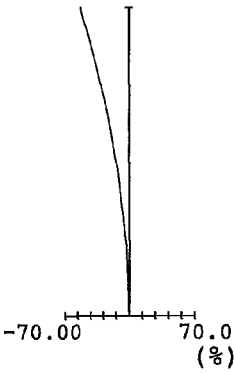
Figure 42H:
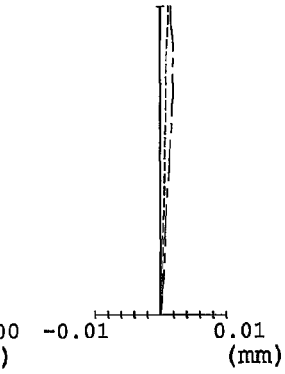
Figure 42I:
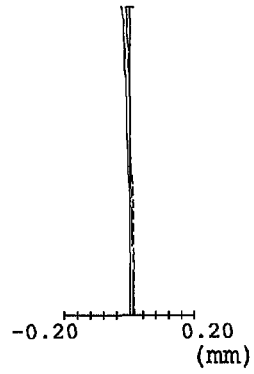
Figure 42J:
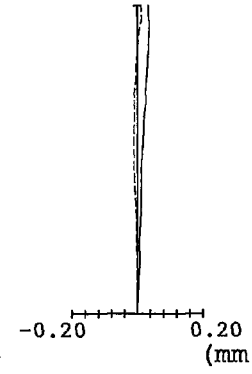
Figure 42K:
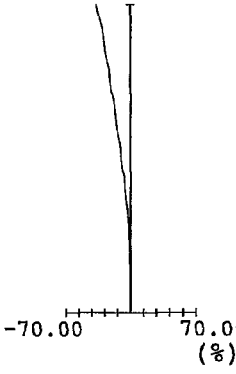
Figure 42L:
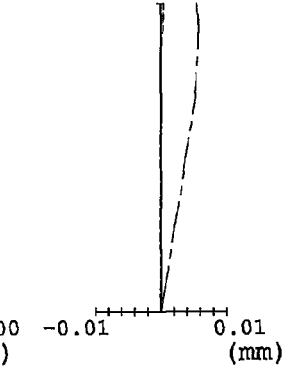

FIGS. 41A to 41C are sectional views taken along the optical axis for showing the configuration of the optical system provided for this observation apparatus, where FIG. 41A shows the normal observation state of the optical system (in the farthest point state), FIG. 41B shows the middle state of the optical system (in the farthest point state), and FIG. 41C shows the close-up observation state of the optical system (in the farthest point state). FIGS. 42A to 42L are aberration diagrams showing spherical aberration, astigmatism, distortion, and chromatic aberration of magnification in the optical system shown in FIGS. 41A-41C. To be specific, FIGS. 42A to 42D show the aberrations in the normal observation state of the optical system (in the farthest point state), FIGS. 42E to 42H show the aberrations in the middle state of the optical system (in the farthest point state), and FIGS. 42I to 42L show the aberrations in the close-up observation state of the optical system (in the farthest point state).

As shown in FIGS. 41A-41C, this observation apparatus includes: an optical system which includes an objective optical system OL and a plano lens PL arranged on the image side of the objective optical system OL and substantially having no refractive power; an aperture stop S arranged in the objective optical system OL; and an image pickup element like CCD for which only its image plane IM is shown in FIGS. 41A-41C. All of these components are arranged on the optical axis Lc.

The objective optical system OL is composed of a first lens group $G_1$ having positive power and being immovable in magnification change and in focusing, a second lens group $G_2$ that is a magnification-changing group having negative power and being moved along the optical axis at least in magnification change, a third lens group $G_3$ having positive power and being immovable in magnification change and in focusing, a fourth lens group $G_4$ that is a focusing group having negative power and being moved along the optical axis at least in focusing, and a fifth lens group $G_5$ having positive power and being immovable in magnification change and in focusing, these lens groups being arranged in that order from the object side. The aperture stop S is arranged between the first lens group $G_1$ and the second lens group $G_2$ in such a way that the aperture stop S moves integrally with the second lens group $G_2$.

The first lens group $G_1$ is composed of: a lens $L_{11}$ that is a plano-concave lens having negative power with the concave surface thereof facing the image side; a lens $L_{12}$ that is a plano lens; a lens $L_{13}$ that is a meniscus lens having negative power with the convex surface thereof facing the image side; a lens $L_{14}$ that is a biconvex lens having positive power; and a lens $L_{15}$ that is a meniscus lens having negative power with the convex surface thereof facing the image side, these lenses being arranged in that order from the object side. The lens $L_{14}$ and the lens $L_{15}$ are joined to each other.

The second lens group $G_2$ is composed of: a lens $L_{21}$ that is a plano-concave lens having negative power with the concave surface thereof facing the image side; and a lens $L_{22}$ that is a meniscus lens having negative power with the concave surface thereof facing the image side, these lenses being arranged in that order from the object side. The lens $L_{21}$ and the lens $L_{22}$ are joined to each other.

The third lens group $G_3$ is composed of a lens $L_{31}$ that is a biconvex lens having positive power.

The fourth lens group $G_4$ is composed of a lens $L_{41}$ that is a plano-concave lens having negative power with the planar surface thereof facing the image side.

The fifth lens group $G_5$ is composed of: a lens $L_{51}$ that is a biconvex lens having positive power; and a lens $L_{52}$ that is a meniscus lens having negative power with the convex surface thereof facing the image side, these lenses being arranged in that order from the object side. The lens $L_{51}$ and the lens $L_{52}$ are joined to each other.

An amount of variation in magnification per movement of the second lens group $G_2$ is larger than an amount of variation in magnification per movement of the fourth lens group $G_4$ in this objective optical system OL.

This observation apparatus is formed in such a way that movement of the second lens group $G_2$ along the optical axis can change the observation state of the objective optical system reversibly and continuously: from the normal observation state in which a plurality of objects to be imaged exist in an observation area; to the close-up observation state in which the objective optical system is closed to a particular object optionally selected from these objects to be imaged by an observer so as to observe the particular object in detail.

In addition, this observation apparatus is formed in such a way that accurate focusing can be performed in every observation state of the objective optical system by moving not only the second lens group $G_2$ but also the fourth lens group $G_4$ along the optical axis.

Next, numerical data on the optical system provided for this observation apparatus is shown.

Numerical Data 20

| Unit: mm | | | | |
|---|---|---|---|---|
| Surface data | | | | |
| Surface No. s | Radius of curvature r | Surface distance d | Refractive index nd | Abbe's number vd |
| 1 | ∞ | 0.36 | 1.88300 | 40.76 |
| 2 | 1.150 | 0.99 | | |
| 3 | ∞ | 0.31 | 1.51400 | 73.43 |
| 4 | ∞ | 1.75 | | |
| 5 | −2.409 | 1.02 | 2.00330 | 28.27 |
| 6 | −2.530 | 0.30 | | |
| 7 | 2.609 | 0.54 | 1.77250 | 49.60 |
| 8 | −3.116 | 0.31 | 1.92286 | 18.90 |
| 9 | −9.579 | D9 | | |
| 10 (Stop surface) | ∞ | 0.03 | | |
| 11 | ∞ | 0.28 | 1.48749 | 70.23 |
| 12 | 1.837 | 0.30 | 1.59270 | 35.31 |
| 13 | 1.202 | D13 | | |
| 14 | 3.296 | 0.86 | 1.72916 | 54.68 |
| 15 | −5.680 | D15 | | |
| 16 | −6.950 | 0.30 | 1.92286 | 20.88 |
| 17 | ∞ | D17 | | |
| 18 | 1.950 | 1.44 | 1.48749 | 70.23 |
| 19 | −1.800 | 0.30 | 1.92286 | 18.90 |
| 20 | −13.069 | 0.30 | | |
| 21 | ∞ | 0.40 | 1.52300 | 58.50 |
| 22 | ∞ | 0.30 | | |
| 23 (Image plane) | ∞ | | | |

| Observation state | | | |
|---|---|---|---|
| Normal observation (the farthest point) | Middle observation (the farthest point) | Close-up observation (the farthest point) | Close-up observation (the nearest point) |
| Various data on objective optical system Zoom ratio: 1.26 | | | |

| | Normal | Middle | Close-up farthest | Close-up nearest |
|---|---|---|---|---|
| Focal length | 0.95 | 1.00 | 1.05 | 0.99 |
| F number | 5.43 | 5.47 | 5.47 | 5.17 |
| Angle of view (2ω) | 144.58 | 126.63 | 113.19 | 126.97 |
| Image height | 0.85 | 0.85 | 0.85 | 0.85 |
| Total length (in air) | 14.29 | 14.13 | 13.95 | 13.72 |
| BF (in air) | 0.79 | 0.63 | 0.45 | 0.22 |
| Surface distance | | | | |
| D9 | 0.30 | 0.44 | 0.58 | 0.58 |
| D13 | 2.50 | 2.36 | 2.22 | 2.22 |
| D15 | 0.80 | 0.80 | 0.80 | 1.30 |
| D17 | 0.80 | 0.80 | 0.80 | 0.30 |

| Data on lens groups | | |
|---|---|---|
| Group | The first surface of lens group | Focal length |
| 1 | 1 | 0.89 |
| 2 | 11 | −2.31 |
| 3 | 14 | 2.97 |
| 4 | 16 | −7.45 |
| 5 | 18 | 8.55 |

-continued

Unit: mm

Data on conditions

Condition (10): $3 < (m_{c-d}/m_{u-d})/(m_{c-n}/m_{c-d}) < 11$: 3.011
Condition (11): $|\Delta DT_f| < 2$: 1.783
Condition (12): $0.2 < |(1 - \beta_f \cdot \beta_f) \times \beta_f' \cdot \beta_f'| < 0.9$: 0.6204
Condition (13): $1 < |m_{c-n}/m_{c-d}| < 2$: 1.649
Condition (14): $0.7 < |F_f/F_v| < 8$: 3.219
Condition (15): $|\gamma| < 11.5$: 5.698
Condition (16): $|DT_{c-n} - DT_{c-d}| < 5$: 2.846
Condition (17): $DT_{u-d} < -50$: $-62.30$
Condition (18): $2 < |F_f/F_{c-d}| < 15$: 7.114
Condition (19): $0.83 < Fno_u/Fno_c$: 0.992

Besides, lenses constituting objective optical systems according to the present invention are limited to the shapes of or the number of the lenses shown in each of the above-described Embodied Examples. For example, lenses which substantially have no refractive power are arranged in or outside lens groups respectively in each of the above-described Embodied Examples (the lens $L_{12}$ which is arranged in the first lens group $G_1$ in the Embodied Example 3 and the plano lens PL which is arranged on the image side of the objective optical system OL). However, these lenses are not always arranged in objective apparatuses according to the present invention. Also, conversely, a lens which is not shown in the drawings of the respective above-described Embodied Examples and substantially has no refractive power may be arranged in or outside a lens group.

Also, with respect to lenses constituting objective optical systems according to the present invention, there is no necessity that the first movable lens group, the second movable lens group, the magnification-changing group, and the focusing group have to be composed of a single lens component, and the first movable lens group, the second movable lens group, the magnification-changing group, and the focusing group may be composed of a plurality of lens components.

Figure 43:
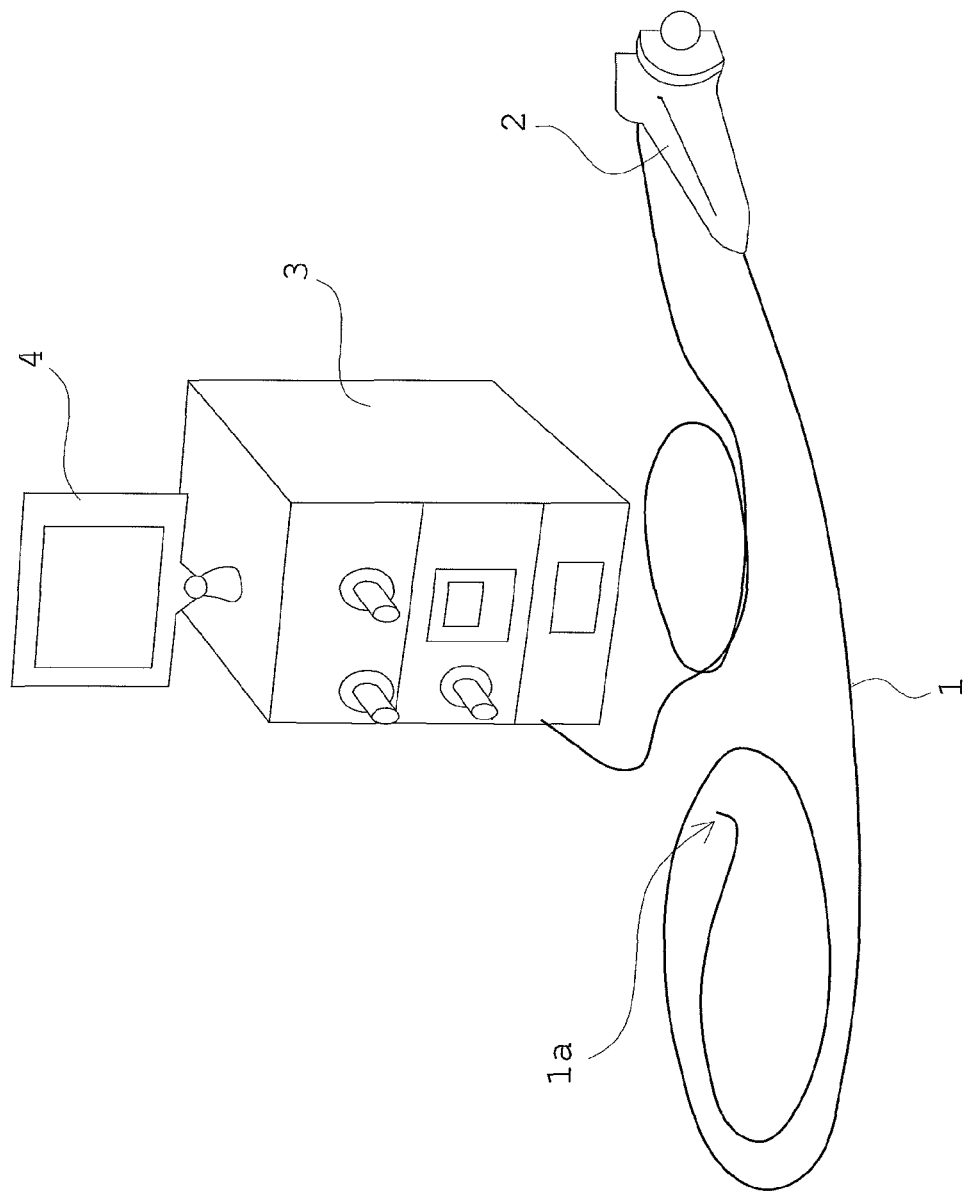
FIG. 43 is a view showing the whole of an endoscope provided with an objective optical system according to the present invention.

Next, one example of endoscopes which are provided with an objective optical systems according to the present invention respectively is explained. FIG. 43 is a view is showing the whole of an endoscope which is provided with an objective optical system according to the present invention. Besides, the endoscopes shown in FIG. 43 includes: an insertion unit 1 which is inserted into the body of a patient; an endoscope-operation unit 2; a control unit 3 which is provided with a light source unit and an image-processing unit inside; and a monitor 4 which displays images outputted from the control unit 3. And, an objective optical system according to the present invention is provided in the front end 1a of the insertion unit 1.

What is claimed is:

1. An objective optical system comprising:
an immovable lens group arranged nearest to an object side, the immovable lens group being fixedly positioned in a focusing operation; and
a first movable lens group and a second movable lens group, at least one of which moves along an optical axis in a focusing operation,
wherein the immovable lens group has, at a position nearest to the object side, a lens component having a negative power,
wherein an amount of variation in magnification per unit movement of the first movable lens group is different from an amount of variation in magnification per unit movement of the second movable lens group, and
wherein the objective optical system is configured: to allow the first movable lens group to move alone along the optical axis while the second movable lens group is fixedly positioned; and to allow the second movable lens group to move alone along the optical axis while the first movable lens group is fixedly positioned.

2. The objective optical system according to claim 1, wherein the first movable lens group is arranged nearer to the object side than the second movable lens group is arranged, and the amount of variation in magnification per unit movement of the first movable lens group is larger than the amount of variation in magnification per unit movement of the second movable lens group.

3. The objective optical system according to claim 1, wherein the first movable lens group is arranged nearer to the object side than the second movable lens group is arranged, and the amount of variation in magnification per unit movement of the first movable lens group is smaller than the amount of variation in magnification per unit movement of the second movable lens group.

4. An objective optical system with reversibly and continuously changeable observation state from a normal observation state to a close-up observation state achieved by movement of a predetermined lens group, comprising:
an immovable lens group which is arranged nearest to an object side and having a negative power, the immovable lens group being fixedly positioned in a focusing operation and being fixedly positioned in an observation-state changing operation; and
a first movable lens group and a second movable lens group, at least one of which moves along an optical axis in a focusing operation,
wherein the first movable lens group is arranged nearer to the object side than the second movable lens group is arranged,
wherein an amount of variation in magnification per unit movement of the first movable lens group is smaller than an amount of variation in magnification per unit movement of the second movable lens group,
wherein an observation-state changing operation is made by movement of the second movable lens group, and
wherein the objective optical system is configured: to allow, in an observation-state changing operation in a range from the normal observation state to the close-up observation state, the second movable lens group to move alone along the optical axis while the first movable lens group is fixedly positioned; and to allow, in a focusing operation, the first movable lens group to move alone along the optical axis while the second movable lens group is fixedly positioned.

5. The objective optical system according to claim 4, wherein the following condition is satisfied:

$$3 < (m_{c-d}/m_{u-d})/(m_{c-n}/m_{c-d}) < 10$$

where, $m_{c-d}$ denotes a transverse magnification of the objective optical system as a whole in a farthest point state in the close-up observation state, $m_{u-d}$ denotes a transverse magnification of the whole of the objective optical system as a whole in a farthest point state in the normal observation state, and $m_{c-n}$ denotes a transverse magnification of the objective optical system as a whole in a nearest point state in the close-up observation state.

6. The objective optical system according to claim 4, wherein the following condition is satisfied:

$$1 < m_{c-n}/m_{c-d} < 1.55$$

where, $m_{c-n}$ denotes a transverse magnification of the objective optical system as a whole in a nearest point state in the close-up observation state, and $m_{c-d}$ denotes a transverse magnification of the objective optical system as a whole in a farthest point state in the close-up observation state.

7. The objective optical system according to claim 4, wherein the objective optical system comprises a lens group that is located nearer to an image side than the first movable lens group is located, and the following condition is satisfied:

$$0.2 < |(1-\beta_1 \cdot \beta_1) \times \beta_1' \cdot \beta_1'| < 3$$

where, $\beta_1$ denotes a transverse magnification of the first movable lens group and $\beta_1'$ denotes a transverse magnification of the lens group which that is located nearer to the image side than the first movable lens group is.

8. The objective optical system according to claim 4, wherein the following condition is satisfied:

$$2 < |F_1/F_{c-d}| < 8$$

where, $F_1$ denotes a focal length of the first movable lens group and $F_{c-d}$ denotes a focal length of the whole of the objective optical system as a whole in a farthest point state in the close-up observation state.

9. The objective optical system according to claim 4, wherein the following condition is satisfied:

$$1.8 < |F_2/F_{c-d}| < 5$$

where, $F_2$ denotes a focal length of the second movable lens group and $F_{c-d}$ denotes a focal length of the objective optical system as a whole in a farthest point state in the close-up observation state.

10. The objective optical system according to claim 4, wherein the following condition is satisfied:

$$0.02 < D_1/L < 0.12$$

where, $D_1$ denotes a sum of an air spacing from a lens group located on the object side of the first movable lens group to the first movable lens group and an air spacing from the first movable lens group to a lens group located on an image side of the first movable lens group, and L denotes a total length of the objective optical system as a whole.

11. The objective optical system according to claim 4, wherein the following condition is satisfied:

$$|DT_{c-n} - DT_{c-d}| < 5$$

where, $DT_{c-n}$ denotes a distortion of an image at an image height ratio of 1.0 in a nearest point state in the close-up observation state and $D_{c-d}$ denotes a distortion of an image at an image height ratio of 1.0 in a farthest point state in the close-up observation state.

12. The objective optical system according to claim 4, wherein the following condition is satisfied:

$$DT_{u-d} < -50$$

where, $DT_{u-d}$ denotes a distortion of an image at an image height ratio of 1.0 in a farthest point state in the normal observation state.

13. The objective optical system according to claim 4, wherein the following condition is satisfied:

$$Fno_u/Fno_c > 0.94$$

where, $Fno_u$ denotes an F number of the objective optical system as a whole in the normal observation state and $Fno_c$ denotes an F number of the objective optical system as a whole in the close-up observation state.

14. The objective optical system according to claim 4, wherein lenses included in the objective optical system are divided into five lens groups, of which a lens group arranged second nearest to the object side is the first movable lens group and a lens group arranged fourth nearest to the object side is the second movable lens group.

15. An observation apparatus comprising the objective optical system according to claim 4 and an autofocus mechanism for moving the first movable lens group.

16. An objective optical system which reversibly and continuously variable magnification from a normal observation state to a close-up observation state achieved by movement of a predetermined lens group, comprising:
  an immovable lens group arranged nearest to an object side, the immovable lens group being fixedly positioned in a magnification changing operation and being fixedly positioned in a focusing operation;
  a magnification-changing group which moves along an optical axis at least in a magnification-changing operation; and
  a focusing group which moves along the optical axis at least in a focusing operation,
  wherein a lens arranged nearest to the object side in the immovable lens group has a negative power,
  wherein the magnification-changing group is arranged nearer to the object side than the focusing group is arranged,
  wherein an amount of variation in magnification per unit movement of the magnification-changing group is larger than an amount of variation in magnification per unit movement of the focusing group,
  wherein a change in magnification is made by movement of the magnification-changing group, and
  wherein the objective optical system is configured: to allow, in a magnification changing operation in a range from the normal observation state to the close-up observation state, the magnification-changing group to move alone along the optical axis while the focusing group is fixedly positioned; and to allow, in a focusing operation, the focusing group to move alone along the optical axis while the magnification-changing group is fixedly positioned.

17. The objective optical system according to claim 16, wherein the following condition is satisfied:

$$3 < (m_{c-d}/m_{u-d})/(m_{c-n}/m_{c-d}) < 11$$

where, $m_{c-d}$ denotes a transverse magnification of the objective optical system as a whole in a farthest point state in the close-up observation state, $m_{u-d}$ denotes a transverse magnification of the objective optical system as a whole in a farthest point state in the normal observation state, and $m_{c-n}$ denotes a transverse magnification of the objective optical system as a whole in a nearest point state in the close-up observation state.

18. The objective optical system according to claim 16, wherein the following condition is satisfied when the focusing group moves in such a way as to shift an image plane by ±(F number×0.005) mm within a region from a farthest point to a nearest point in the close-up observation state:

$$|\Delta DT_f| < 2$$

where, $\Delta DT_f$ denotes a variation in distortion when the focusing group moves.

19. The objective optical system according to claim 16, wherein the objective optical system comprises a lens group that is located nearer to an image side than the focusing group is located, and the following condition is satisfied:

$$0.2 < |(1-\beta_f/\beta_f') \times \beta_f' \cdot \beta_f'| < 0.9$$

where, $\beta_f$ denotes a transverse magnification of the focusing group in a farthest point state in the close-up observation state and $\beta_f'$ denotes a transverse magnification of a lens group that is located nearer to the image side than the focusing group is in the farthest point state in the close-up observation state.

20. The objective optical system according to claim 16, wherein the focusing group is arranged nearest to an image side, and the following condition is satisfied:

$$0.2 < (1-\beta_f/\beta_f') < 0.9$$

where, $\beta_f$ denotes a transverse magnification of the focusing group in a farthest point state in the close-up observation state.

21. The objective optical system according to claim 16, wherein the following condition is satisfied:

$$1 < |m_{c-n}/m_{c-d}| < 2$$

where, $m_{c-n}$ denotes a transverse magnification of the objective optical system as a whole in a nearest point state in the close-up observation state and $m_{c-d}$ denotes a transverse magnification of the objective optical system as a whole in a farthest point state in the close-up observation state.

22. The objective optical system according to claim 16, wherein the following condition is satisfied:

$$0.7 < F_f/F_v | < 8$$

where, $F_f$ denotes a focal length of the focusing group and $F_v$ denotes a focal length of the magnification-changing group.

23. The objective optical system according to claim 16, wherein the following condition is satisfied:

$$|\gamma| < 11.5$$

where, $\gamma$ denotes an angle formed between an optical axis and a principal ray of light that is emergent from a lens nearest to an image side in the focusing group to form an image with an image height ratio of 1.0 in a nearest point state in the close-up observation state.

24. The objective optical system according to claim 16, wherein the following condition is satisfied:

$$|DT_{c-n} - DT_{c-d}| < 5$$

where, $DT_{c-n}$ denotes a distortion of an image at an image height ratio of 1.0 in a nearest point state in the close-up observation state and $DT_{c-d}$ denotes a distortion of an image at an image height ratio of 1.0 in a farthest point state in the close-up observation state.

25. The objective optical system according to claim 16, wherein the following condition is satisfied:

$$DT_{135} < -50$$

where, $DT_{135}$ denotes a distortion at an angle of view of 135 degrees.

26. The objective optical system according to claim 16, wherein at least one of the magnification-changing group and the focusing group consists of a single lens component.

27. The objective optical system according to claim 16, wherein the objective optical system further comprises a stop and the focusing group is arranged nearer to an image side than the stop is arranged.

28. An observation apparatus comprising the objective optical system according to claim 16 and an autofocus mechanism for moving the focusing group.

29. An objective optical system comprising:
an immovable lens group arranged nearest to an object side, the immovable lens group being fixedly positioned in a focusing operation; and
a first movable lens group and a second movable lens group, at least one of which moves along an optical axis in a focusing operation,
wherein the immovable lens group has, at a position nearest to the object side, a lens component having a negative power,
wherein an amount of variation in magnification per unit movement of the first movable lens group is different from an amount of variation in magnification per unit movement of the second movable lens group, and
wherein the optical system further comprises a second immovable lens group arranged between the first movable lens group and the second movable lens group, the second immovable lens group being fixedly positioned in a focusing operation.

30. The objective optical system according to claim 29, wherein the first movable lens group is arranged nearer to the object side than the second movable lens group is arranged, and the amount of variation in magnification per unit movement of the first movable lens group is larger than the amount of variation in magnification per unit movement of the second movable lens group.

31. The objective optical system according to claim 29, wherein the first movable lens group is arranged nearer to the object side than the second movable lens group is arranged, and the amount of variation in magnification per unit movement of the first movable lens group is smaller than the amount of variation in magnification per unit movement of the second movable lens group.

32. The objective optical system according to claim 1, wherein, of all lens groups included in the objective optical system as a whole, a number of lens groups movable along an optical axis is two.

33. The objective optical system according to claim 4, wherein, of all lens groups included in the objective optical system as a whole, a number of lens groups movable along an optical axis is two.

34. The objective optical system according to claim 16, wherein, of all lens groups included in the objective optical system as a whole, a number of lens groups movable along an optical axis is two.

35. The objective optical system according to claim 29, wherein, of all lens groups included in the objective optical system as a whole, a number of lens groups movable along an optical axis is two.

36. An objective optical system with reversibly and continuously changeable observation state from a normal observation state to a close-up observation state achieved by movement of a predetermined lens group, comprising:
an immovable lens group arranged nearest to an object side and having a negative power, the immovable lens group being fixedly positioned in a focusing operation and being fixedly positioned in an observation-state changing operation; and
a first movable lens group and a second movable lens group, at least one of which moves along an optical axis in a focusing operation,
wherein the first movable lens group is arranged nearer to the object side than the second movable lens group is arranged, wherein an amount of variation in magnification per unit movement of the first movable lens group is smaller than an amount of variation in magnification per unit movement of the second movable lens group, wherein an observation-state changing operation is made by movement of the second movable lens group, and wherein the following condition is satisfied:

$$3<(m_{c-d}/m_{u-d})/(m_{c-n}/m_{c-d})<10$$

where, $m_{c-d}$ denotes a transverse magnification of the objective optical system as a whole in a farthest point state in the close-up observation state, $m_{u-d}$ denotes a transverse magnification of the objective optical system as a whole in a farthest point state in the normal observation state, and $m_{c-n}$ denotes a transverse magnification of the objective optical system as a whole in a nearest point state in the close-up observation state.

37. An objective optical system with reversibly and continuously changeable observation state from a normal observation state to a close-up observation state achieved by movement of a predetermined lens group, comprising:

an immovable lens group arranged nearest to an object side and having a negative power, the immovable lens group being fixedly positioned in a focusing operation and being fixedly positioned in an observation-state changing operation; and a first movable lens group and a second movable lens group, at least one of which moves along an optical axis in a focusing operation, wherein the first movable lens group is arranged nearer to the object side than the second movable lens group is arranged, wherein an amount of variation in magnification per unit movement of the first movable lens group is smaller than an amount of variation in magnification per unit movement of the second movable lens group, wherein an observation-state changing operation is made by movement of the second movable lens group, and wherein the objective optical system comprises a lens group that is located nearer to an image side than the first movable lens group is located, and the following condition is satisfied:

$$0.2<|(1-\beta_1\cdot\beta_1)\times\beta_1'\cdot\beta_1'\infty|<3$$

where, $\beta_1$ denotes a transverse magnification of the first movable lens group and $\beta_1'$ denotes a transverse magnification of the lens group that is located nearer to the image side than the first movable lens group is.

38. An objective optical system with reversibly and continuously changeable observation state from a normal observation state to a close-up observation state achieved by movement of a predetermined lens group, comprising:

an immovable lens group arranged nearest to an object side and having a negative power, the immovable lens group being fixedly positioned in a focusing operation and being fixedly positioned in an observation-state changing operation; and a first movable lens group and a second movable lens group, at least one of which moves along an optical axis in a focusing operation, wherein the first movable lens group is arranged nearer to the object side than the second movable lens group is arranged, wherein an amount of variation in magnification per unit movement of the first movable lens group is smaller than an amount of variation in magnification per unit movement of the second movable lens group, wherein an observation-state changing operation is made by movement of the second movable lens group, and wherein the following condition is satisfied:

$$DT_{u-d}<-50$$

where, $DT_{u-d}$ denotes a distortion of an image at an image height ratio of 1.0 in a farthest point state in the normal observation state.

39. An objective optical system with reversibly and continuously changeable observation state from a normal observation state to a close-up observation state achieved by movement of a predetermined lens group, comprising:

an immovable lens group arranged nearest to an object side and having a negative power, the immovable lens group being fixedly positioned in a focusing operation and being fixedly positioned in an observation-state changing operation; and a first movable lens group and a second movable lens group, at least one of which moves along an optical axis in a focusing operation, wherein the first movable lens group is arranged nearer to the object side than the second movable lens group is arranged, wherein an amount of variation in magnification per unit movement of the first movable lens group is smaller than an amount of variation in magnification per unit movement of the second movable lens group, wherein an observation-state changing operation is made by movement of the second movable lens group, and wherein lenses included in the objective optical system are divided into five lens groups, of which a lens group arranged second nearest to the object side is the first movable lens group and a lens group arranged fourth nearest to the object side is the second movable lens group.

40. An objective optical system with reversibly and continuously variable magnification from a normal observation state to a close-up observation state achieved by movement of a predetermined lens group, comprising:

an immovable lens group arranged nearest to an object side, the immovable lens group being fixedly positioned in a magnification changing operation and being fixedly positioned in a focusing operation;

a magnification-changing group which moves along an optical axis at least in a magnification changing operation; and a focusing group which moves along the optical axis at least in a focusing operation, wherein a lens arranged nearest to the object side in the immovable lens group has a negative power, wherein the magnification-changing group is arranged nearer to the object side than the focusing group is arranged, wherein an amount of variation in magnification per unit movement of the magnification-changing group is larger than an amount of variation in magnification per unit movement of the focusing group, wherein a change in magnification is made by movement of the magnification-changing group, and wherein the following condition is satisfied:

$$3<(m_{c-d}/m_{u-d})/(m_{c-n}/m_{c-d})<11$$

where, $m_{c-d}$ denotes a transverse magnification of the objective optical system as a whole in a farthest point state in the close-up observation state, $m_{u-d}$ denotes a transverse magnification of the objective optical system as a whole in a farthest point state in the normal observation state, and $m_{c-n}$ denotes a transverse magnification of the objective optical system as a whole in a nearest point state in the close-up observation state.

41. An objective optical system with reversibly and continuously variable magnification from a normal observation state to a close-up observation state achieved by movement of a predetermined lens group, comprising:
- an immovable lens group arranged nearest to an object side, the immovable lens group being fixedly positioned in a magnification changing operation and being fixedly positioned in a focusing operation;
- a magnification-changing group which moves along an optical axis at least in a magnification changing operation; and
- a focusing group which moves along the optical axis at least in a focusing operation,
- wherein a lens arranged nearest to the object side in the immovable lens group has a negative power,
- wherein the magnification-changing group is arranged nearer to the object side than the focusing group is arranged,
- wherein an amount of variation in magnification per unit movement of the magnification-changing group is larger than an amount of variation in magnification per unit movement of the focusing group,
- wherein a change in magnification is made by movement of the magnification-changing group, and
- wherein the following condition is satisfied:

$$|\gamma| < 11.5$$

where, $\gamma$ denotes an angle formed between an optical axis and a principal ray of light that is emergent from a lens nearest to an image side in the focusing group to form an image with an image height ratio of 1.0 in a nearest point state in the close-up observation state.

42. An objective optical system with reversibly and continuously variable magnification from a normal observation state to a close-up observation state achieved by movement of a predetermined lens group, comprising:
- an immovable lens group arranged nearest to an object side, the immovable lens group being fixedly positioned in a magnification changing operation and being fixedly positioned in a focusing operation;
- a magnification-changing group which moves along an optical axis at least in a magnification changing operation; and
- a focusing group which moves along the optical axis at least in a focusing operation,
- wherein a lens arranged nearest to the object side in the immovable lens group has a negative power,
- wherein the magnification-changing group is arranged nearer to the object side than the focusing group is arranged,
- wherein an amount of variation in magnification per unit movement of the magnification-changing group is larger than an amount of variation in magnification per unit movement of the focusing group,
- wherein a change in magnification is made by movement of the magnification-changing group, and
- wherein the following condition is satisfied:

$$DT_{135} < 50$$

where, $DT_{135}$ denotes a distortion at an angle of view of 135 degrees.

* * * * *

UNITED STATES PATENT AND TRADEMARK OFFICE
CERTIFICATE OF CORRECTION

PATENT NO. : 9,019,621 B2
APPLICATION NO. : 13/673258
DATED : April 28, 2015
INVENTOR(S) : Keisuke Takada et al.

It is certified that error appears in the above-identified patent and that said Letters Patent is hereby corrected as shown below:

In the Claims

Column 74, line 26, claim 4, change "an immovable lens group which is arranged nearest" to --an immovable lens group arranged nearest--; and Column 74, line 59, claim 5, change "magnification of the whole of the objective optical system" to --magnification of the objective optical system--; and Column 75, line 11, claim 7, change "$0.2 < |(1-\beta_1 \cdot \beta_1) \times \beta_1' \cdot \beta_1 \infty| < 3$" to --$0.2 < |(1-\beta_1 \cdot \beta_1) \times \beta_1' \cdot \beta_1'| < 3$--; and Column 75, line 15, claim 7, change "the lens group which that is located nearer" to --the lens group that is located nearer--; and Column 75, line 22, claim 8, change "focal length of the whole of the objective" to --focal length of the objective--; and Column 76, line 10, claim 16, change "An objective optical system which reversibly" to --An objective optical system with reversibly--; and Column 77, line 47, claim 24, change "$|DT_{c-n} - DT_{c-d} < 5$" to --$|DT_{c-n} - DT_{c-d}| < 5$--; and Column 79, line 44, claim 37, change "$0.2 < |(1-\beta_1 \cdot \beta_1) \times \beta_1' \cdot \beta_1 \infty| < 3$" to --$0.2 < |(1-\beta_1 \cdot \beta_1) \times \beta_1' \cdot \beta_1'| < 3$--; and Column 82, line 29, claim 42, change "$DT_{135} < 50$" to --$DT_{135} < -50$--.

Signed and Sealed this
Twenty-ninth Day of September, 2015

Michelle K. Lee
*Director of the United States Patent and Trademark Office*